(12) United States Patent
Campos et al.

(10) Patent No.: US 9,923,621 B2
(45) Date of Patent: *Mar. 20, 2018

(54) MULTIPLE-INPUT MULTIPLE-OUTPUT (MIMO) COMMUNICATION SYSTEM

(71) Applicant: Cable Television Laboratories, Inc., Louisville, CO (US)

(72) Inventors: Luis Alberto Campos, Superior, CO (US); Jennifer Andreoli-Fang, Boulder, CO (US); Joey Padden, Boulder, CO (US); Ian MacMillan, Superior, CO (US)

(73) Assignee: CABLE TELEVISION LABORATORIES, INC., Louisville, CO (US)

(*) Notice: Subject to any disclaimer, the term of this patent is extended or adjusted under 35 U.S.C. 154(b) by 51 days.

This patent is subject to a terminal disclaimer.

(21) Appl. No.: 14/768,216

(22) PCT Filed: Feb. 16, 2014

(86) PCT No.: PCT/US2014/016647
§ 371 (c)(1),
(2) Date: Aug. 15, 2015

(87) PCT Pub. No.: WO2014/127317
PCT Pub. Date: Aug. 21, 2014

(65) Prior Publication Data
US 2016/0013855 A1   Jan. 14, 2016

Related U.S. Application Data

(63) Continuation-in-part of application No. 13/769,288, filed on Feb. 16, 2013, now Pat. No. 9,088,313.

(Continued)

(51) Int. Cl.
  *H04B 7/12*  (2006.01)
  *H04B 7/04*  (2017.01)
  (Continued)

(52) U.S. Cl.
  CPC ............. *H04B 7/12* (2013.01); *H04B 7/0413* (2013.01); *H04B 7/0617* (2013.01); *H04L 27/2601* (2013.01)

(58) Field of Classification Search
  None
  See application file for complete search history.

(56) References Cited

U.S. PATENT DOCUMENTS

| 5,185,763 A | 2/1993 | Krishnan |
| 5,504,783 A | 4/1996 | Tomisato et al. |

(Continued)

FOREIGN PATENT DOCUMENTS

| WO | 2005/062498 | 7/2005 | |
| WO | 2011/161637 | 12/2011 | |
| WO | WO 2011157182 A2 * | 12/2011 | ........... H04B 7/0482 |

OTHER PUBLICATIONS

International Search Report (ISR) and Written Opinion of United States International Search Authority for corresponding PCT application PCT/US2014/016647, dated Jun. 3, 2014.

*Primary Examiner* — Faruk Hamza
*Assistant Examiner* — Cassandra Decker
(74) *Attorney, Agent, or Firm* — Great Lakes Intellectual Property, PLLC

(57) ABSTRACT

A multiple-input multiple-output (MIMO) capable system is contemplated. The communication system may include a signal processor configured to separate an input stream into multiple signal paths to facilitate simultaneous transport through a communication medium. The capability to simul- (Continued)

taneously transmit multiples signal paths may be beneficial in order to maximize throughput and/or minimize expense.

18 Claims, 29 Drawing Sheets

Related U.S. Application Data

(60) Provisional application No. 61/845,340, filed on Jul. 11, 2013.

(51) Int. Cl.
*H04L 27/26* (2006.01)
*H04B 7/06* (2006.01)
*H04B 7/0413* (2017.01)

(56) References Cited

U.S. PATENT DOCUMENTS

| | | | |
|---|---|---|---|
| 5,561,686 A | 10/1996 | Kobayashi et al. | |
| 5,749,857 A | 5/1998 | Cuppy | |
| 6,941,079 B1 | 9/2005 | Barozzi | |
| 6,944,120 B2 | 9/2005 | Wu et al. | |
| 7,391,832 B2 | 6/2008 | Catreux-Erces et al. | |
| 8,223,872 B1 | 7/2012 | Zhang | |
| 2001/0019723 A1 | 9/2001 | Monahan et al. | |
| 2002/0105928 A1 | 8/2002 | Kapoor | |
| 2002/0122398 A1 | 9/2002 | Jou | |
| 2002/0126338 A1 | 9/2002 | Volpi et al. | |
| 2004/0037561 A1* | 2/2004 | Guild | H04J 14/0227 398/79 |
| 2004/0037565 A1 | 2/2004 | Young et al. | |
| 2005/0058149 A1* | 3/2005 | Howe | H04L 47/10 370/428 |
| 2005/0063340 A1 | 3/2005 | Hoffman | |
| 2005/0105632 A1 | 5/2005 | Catreux-Erces et al. | |
| 2005/0174935 A1 | 8/2005 | Segel | |
| 2006/0234663 A1 | 10/2006 | Wilhoyte | |
| 2007/0032220 A1 | 2/2007 | Feher | |
| 2007/0054625 A1 | 3/2007 | Beale | |
| 2007/0121743 A1* | 5/2007 | Zuckerman | H04L 27/2601 375/260 |
| 2007/0230639 A1* | 10/2007 | Stirling-Gallacher | H04B 7/0408 375/347 |
| 2008/0150514 A1* | 6/2008 | Codreanu | H04B 17/21 324/76.77 |
| 2009/0028192 A1 | 1/2009 | Rieger | |
| 2009/0190488 A1* | 7/2009 | Hochwald | H04B 7/0617 370/252 |
| 2009/0204877 A1 | 8/2009 | Betts et al. | |
| 2010/0035600 A1 | 2/2010 | Hou et al. | |
| 2010/0285769 A1 | 11/2010 | Conroy | |
| 2011/0039497 A1* | 2/2011 | Hammarwall | H01Q 1/246 455/63.1 |
| 2011/0080979 A1 | 4/2011 | Duggan | |
| 2011/0135308 A1* | 6/2011 | Tarlazzi | H04B 7/0413 398/79 |
| 2011/0243025 A1 | 10/2011 | Kim | |
| 2011/0275376 A1* | 11/2011 | Boldi | H04B 7/022 455/436 |
| 2012/0206285 A1 | 8/2012 | Khlat | |
| 2012/0236971 A1 | 9/2012 | Taghavi Nasrabadi et al. | |
| 2012/0281621 A1 | 11/2012 | Loftallah | |
| 2012/0314649 A1 | 12/2012 | Forenza | |
| 2012/0331111 A1 | 12/2012 | Wu et al. | |
| 2013/0016966 A1 | 1/2013 | Jansen et al. | |
| 2013/0076566 A1 | 3/2013 | Jiang et al. | |
| 2013/0095873 A1* | 4/2013 | Soriaga | H04B 7/024 455/509 |
| 2013/0201316 A1 | 8/2013 | Binder et al. | |
| 2013/0215833 A1 | 8/2013 | Ong et al. | |
| 2013/0216228 A1 | 8/2013 | Nazarathy et al. | |
| 2013/0242769 A1* | 9/2013 | Hammarwall | H04L 5/0016 370/252 |
| 2013/0308950 A1 | 11/2013 | Blouza Sofiene et al. | |
| 2013/0337847 A1 | 12/2013 | Sridhara | |
| 2014/0064109 A1* | 3/2014 | Krishnamurthy | H04B 7/0456 370/252 |
| 2014/0066098 A1 | 3/2014 | Stern et al. | |
| 2014/0086353 A1* | 3/2014 | Ni | H04B 7/0482 375/267 |
| 2014/0177745 A1 | 6/2014 | Krishnamurthy et al. | |
| 2014/0192845 A1* | 7/2014 | Szini | H04B 7/0413 375/219 |
| 2014/0206367 A1 | 7/2014 | Agee et al. | |
| 2014/0213285 A1* | 7/2014 | Sauer | H04W 64/00 455/456.1 |
| 2014/0219267 A1 | 8/2014 | Eyuboglu et al. | |
| 2014/0233678 A1 | 8/2014 | Campos et al. | |
| 2014/0241446 A1 | 8/2014 | Zhang et al. | |
| 2014/0270776 A1 | 9/2014 | Jinno et al. | |
| 2014/0294393 A1 | 10/2014 | Lowery et al. | |
| 2014/0302802 A1 | 10/2014 | Chang et al. | |
| 2014/0321565 A1 | 10/2014 | Campos et al. | |
| 2014/0342659 A1 | 11/2014 | Maharajh et al. | |
| 2016/0094318 A1* | 3/2016 | Shattil | H04B 7/026 375/267 |

* cited by examiner

MULTIPLE-INPUT MULTIPLE-OUTPUT (MIMO) COMMUNICATION SYSTEM

CROSS-REFERENCE TO RELATED APPLICATIONS

This application is the U.S. national phase of PCT international application number PCT/US2014/016647 filed Feb. 16, 2014, which claims priority to U.S. application Ser. No. 13/769,288, filed Feb. 16, 2013 and U.S. provisional application No. 61/845,340 filed Jul. 11, 2013, the disclosures and benefits of which are hereby incorporated in their entirety by reference herein.

TECHNICAL FIELD

The present invention relates to communication systems and signal processors, such as but not necessarily limited to those capable of facilitating multiple-input multiple-output (MIMO) or multipath communications.

BACKGROUND

Wireless communications systems may employ multiple-input multiple-output (MIMO) techniques to facilitate multipath communications. The multipath capabilities of MIMO systems allow data to be transmitted simultaneously over multiple paths between a plurality of transmitting devices and a plurality of receiving devices to effectively increase capacity over single path systems.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
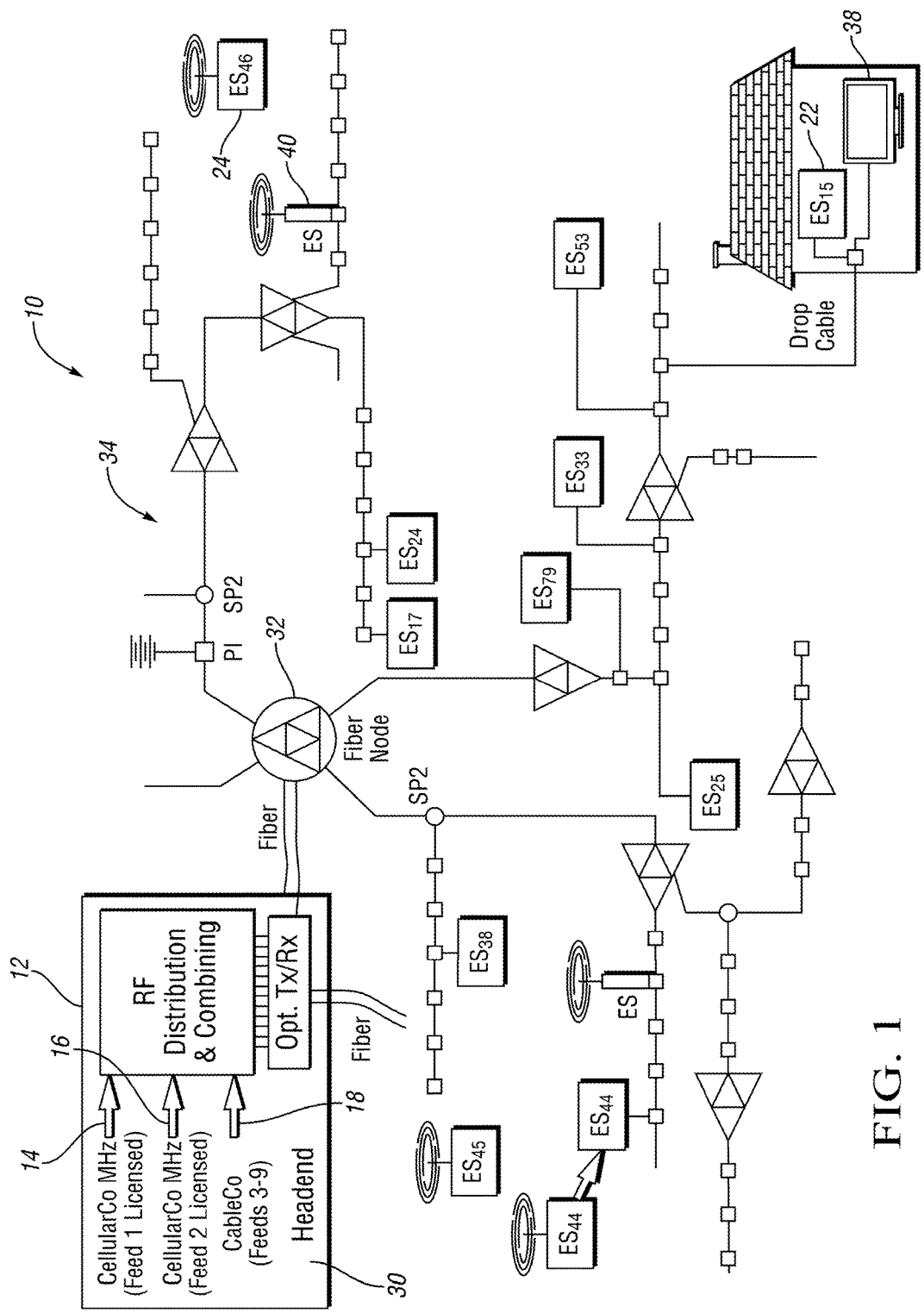
FIG. 1 illustrates a multiple-input multiple-output (MIMO) communication system in accordance with one non-limiting aspect of the present invention.

FIG. 1 illustrates a multiple input multiple output (MIMO) communication system 10 in accordance with one non-limiting aspect of the present invention. The system 10 may be configured to facilitate electronic signaling between a signal processor 12 and one or more end stations (ES), user equipment (UE), access points (APs), terminals or other devices. The signal processor 12 may be configured to facilitate transport of virtually any type of signaling, including signaling associated with a multiple system operator (MSO), such as but not necessarily limited to a cable, satellite, or broadcast television service provider, a cellular service provider, and high-speed data service provider, an Internet service provider (ISP), etc. The communication system 10 is illustrated with respect to the signal processor 12 supporting a first feed 14, a second feed 16, a third feed 18 (representing seven independent feeds), although more or less feeds may be received for transport. Each feed 14, 16, 18 may include data communicated to the signal processor 12 from a local or remote sourcing device/entity as a baseband or other suitable signal. Each feed may be processed for transport with the signal processor 12, optionally with the signal processor 12 comprising separate or independent signal processors for each feed. The first and second feeds 14, 16 may be associated with cellular related signaling (e.g., signaling associated with a cellular phone call) and the third feed 18 may be associated with cable related signaling (e.g., signaling associated with delivery of a television program and/or Internet data download). A master controller 20 may be included as a standalone component and/or integrated into one of the illustrated components in order to facilitate the operations contemplated herein.

The end stations ES correspond with any electronically operable device having capabilities sufficient to facilitate directly or indirectly interfacing a user with signaling transported through the communication system 10. The end stations ES may be a gateway, a router, a computer, a mobile phone, a cellular phone, a media terminal adapter (MTA), a voice over Internet protocol (VoIP) enabled device, a television, a set top box (STB), network address translator (NAT), etc. For exemplary non-limiting purposes, a first end station 22 is shown to be a wireline type of device, such as a home gateway or set-top box configured to output signaling to a television or other device through a wireless and/or wired connection, and a second end station 24 is shown to be a wireless type of device, such as a remote antenna unit, wireless computer, television or cellular phone, optionally having capabilities sufficient to interface signaling using a wireless and/or a wired connection. The use of such first and second end stations 22, 24 may be beneficial in facilitating continued access to a television program while a user travels between locations associated with the first and second ends stations 22, 24. Seamless access to the content may be provided in this manner using different ends stations or capabilities of the end stations, e.g., a wireless capability of the second end station 24 may be used when at one location and a wireline capability of the first end station 22 may be used when at another location.

The present invention contemplates distinguishing between wireless and wireline communications. The wireline communications may correspond with any type of electronic signal exchange where a wire, a coaxial cable, a fiber or other bound medium is used to facilitate or otherwise direct at least a portion of the related signaling, including the signaling exchanged outside of the communicating device/processor. The wireline communications include but are not necessarily limited to those carried at least partially over a fiber/cable backbone associated with a cable television distribution system or an Internet or non-Internet based data communication system. The wireless communications may correspond with any type of electronic signal exchange where an antenna, antenna port or other transmitting type of device is used to communicate at least a portion of the signaling as radio frequency (RF) signals, such as over a wireless link or through an unbound or air medium. The wireless communications include but are not necessary limited to satellite communications, cellular communications and Wi-Fi communications. The use of wireline and wireless communications and the corresponding mediums are not intended to limit the present invention to any particular type of medium, protocol, or standard and is instead noted to differentiate between two types of communications, e.g., bound and unbound.

The signaling desired for transports through the communication system 10 may be received at a headend unit 30 associated with the signal processor 12 and thereafter carried by one or more fibers to a fiber node 32. The fiber node 32 may be part of a cable television distribution system 34 from which a plurality of coaxial cables may facilitate further delivery to different geographical areas, optionally with use of splitters and/or amplifiers. The coaxial cables are shown to include a plurality of taps (shown as rectangles) through which various end stations ES may be connected to receive the wireline signaling and/or other signaling associated with the headend, e.g., signaling associated with other types of content and/or data transmissions. The first end station 22 is shown to be connected to one of the taps to facilitate interfacing transported signals to a locally connected, first user equipment (UE) 38. Using LTE over HFC, communications between end station 22 and UE 38 can take place through the signal processor 12 but not directly. Communications between end station 22 and UE 38 can take place directly if other means of communications are used such as WiFi or MoCA or Ethernet. Communications between end station 22 and UE 38 can also take place using LTE over HFC but over a separate system where end station 22 also has signal processor functionality and the UE 38 functions as an end station of this local "home LTE over HFC network". The first end station 22 may be configured to facilitate processing of frequency diverse signals for wireline and/or wireless communication to the UE 38, which is shown to be a television but could be any other type of device, such as a mobile phone, tablet, etc. having capabilities sufficient to access television or data signaling using one or both of a wired and wireless connection. The first end station 22 may be configured to facilitate interfacing transported signals with the first UE 38 by converting frequency diverse signaling to an output signaling stream usable by the UE 38.

A third end station 40 is shown to be configured to facilitate wirelessly signaling with the second end station 24. The third end station 40 may be configured to convert the frequency diverse signals carried over the wireline distribution system 34 to spatially diverse signals or other suitable types of RF signals. The third end station 40 may be included as part of a Wi-Fi access point, a router, a cellular tower, a base station, etc. The ability of the third end station 40 to output wireless signaling may be beneficial if licensing or other restrictions limit how the wireless signals can be transmitted from the third end station 40, e.g., frequency usage restrictions may prevent output of the frequency diverse signals carried over the distribution system 34 to the second end station 24 without being pre-processed by the third end station 40. The third end station 40 may be configured to pre-process the frequency diverse signals carried over the distribution system 34 to suitable wireless signals having other frequency characteristics licensed for use with the second end station 24.

The third end station 40 may be configured to convert received wireline signaling to wireless signaling suitable to any restrictions associated with the second end station 24. The third end station 40 may be useful in allowing a user to access content through different types of devices and/or to facilitate use of other wireless transmission frequencies and communication mediums. The third end station 40 may be configured to facilitate output of spatially diverse signals according to frequency ranges allocated to an originator of the corresponding signaling stream. The second end station 24 may be a handset, mobile phone or other device having capabilities sufficient to process spatially diverse signaling, such as to facilitate interfacing a cellular phone call with the user (additional processing may be done at the second end station 24 to facilitate the phone call or other operation desired for the signaling stream). A fourth end station 42 may be configured to facilitate wirelessly interfacing transported signaling with the second end station 24, such as to enhance spatial diversity of the interfaced wireless signal in the manner described below in more detail.

Figure 2A:
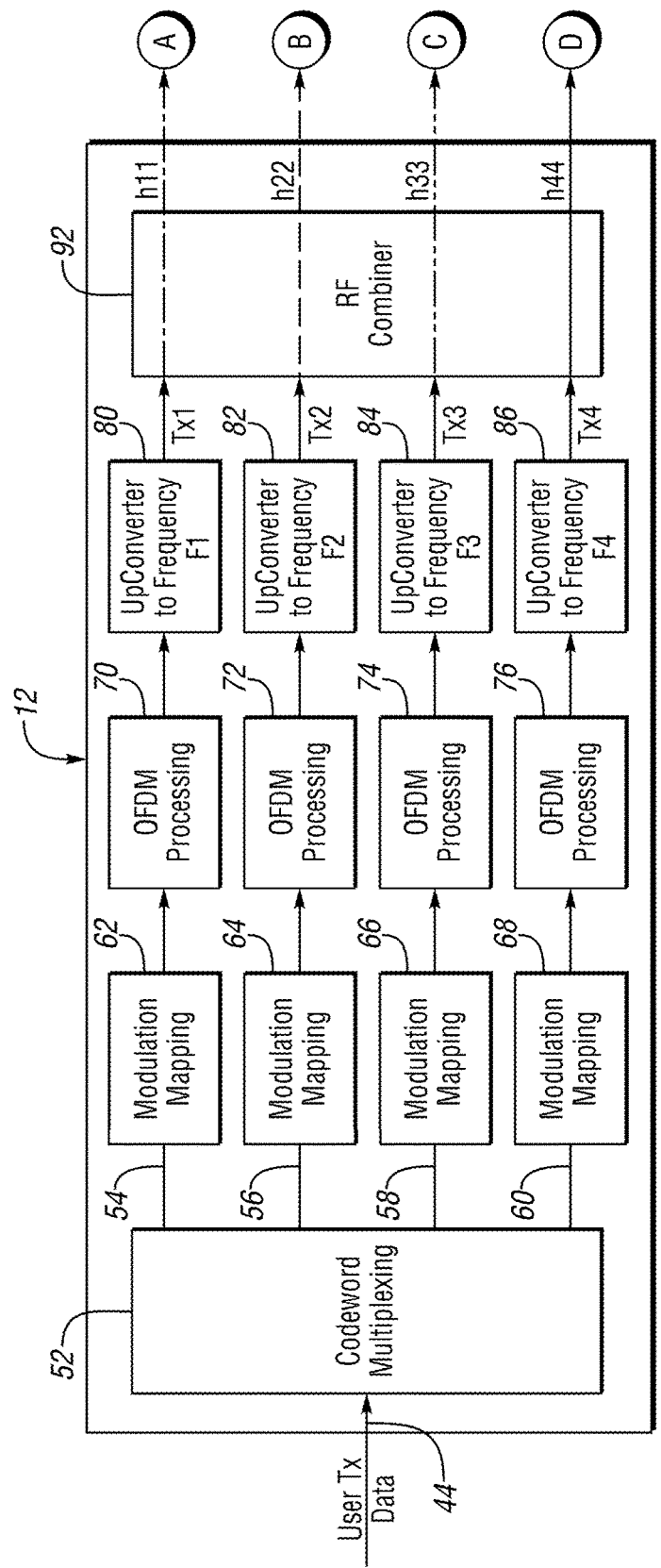
FIGS. 2a-2b schematically illustrate operation of the communication system when facilitating a wireline signaling mode in accordance with one non-limiting aspect of the present invention.
Figure 2B:
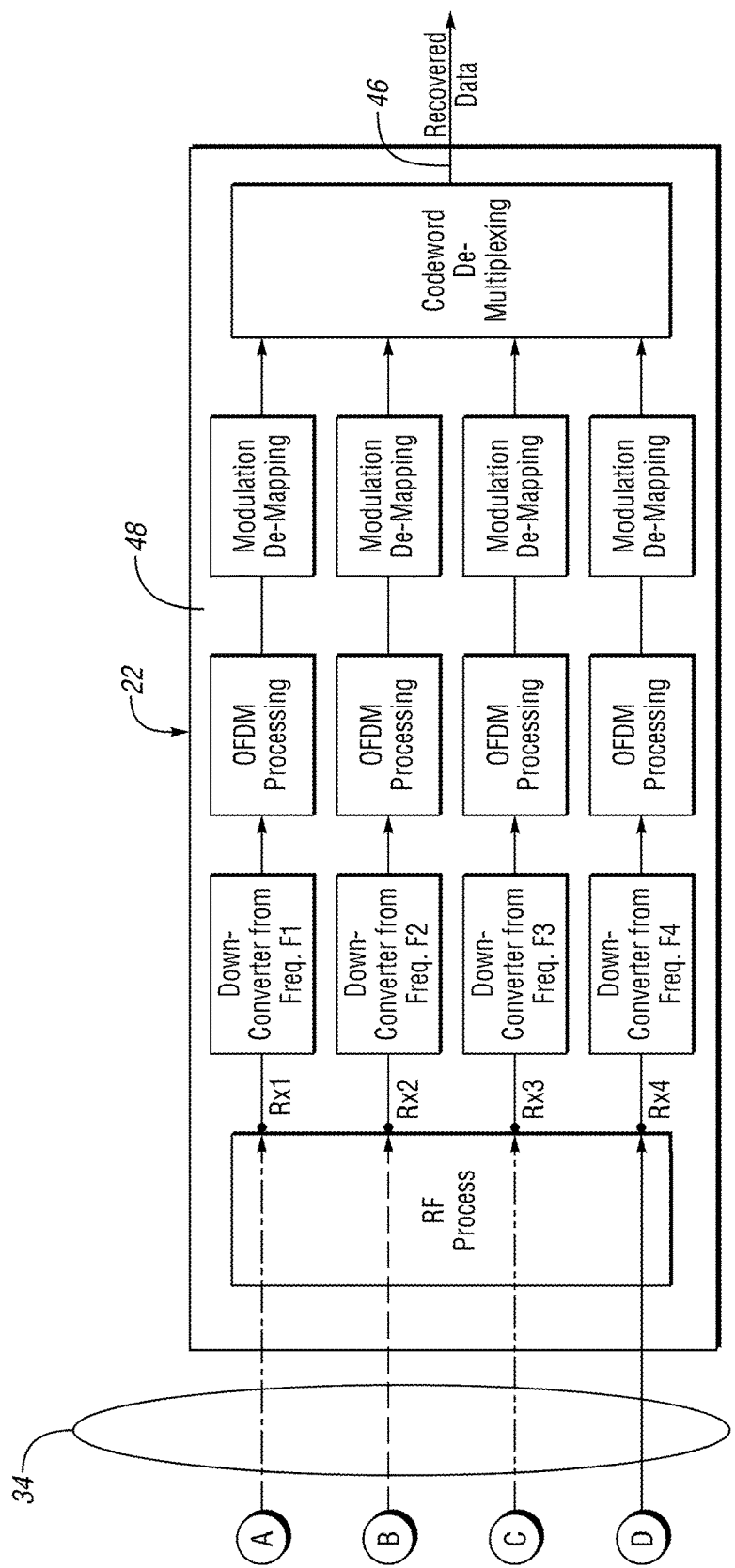

FIGS. 2*a*-2*b* schematically illustrate operation of the communication system 10 when facilitating a wireline signaling mode in accordance with one non-limiting aspect of the present invention. The wireline signaling mode corresponds with the signal processor 12 receiving an input signal 44, processing the input signal for transmission over at least a portion of the wireline communication medium 34, and the first end station 22 processing the transmitted signaling into an output signal 46. The output signal 46 may be subsequently transmitted to the first UE 38 or other device for final use. The signal processor 12 may be configured to receive the input signal from a base station, eNodeB, signal processor or other processing element desiring to transport signaling over the communication system (e.g., one of the feeds 14, 16, 18). The base station may be associated with an Internet service provider, a cable television sourcing entity, cellular phone provider or other source capable of providing data to the signal processor 12 for transport. The input signal 44 may be in the form of a baseband signal, a non-continuous wave (CW) type of signal and/or some other signaling/streaming sufficient to represent data, e.g. data represented using binary data bits/bytes and varying voltages or optical intensities. Optionally, the input signal 44 may be a non-diverse signal at least in that the data is carried within a single stream/signal as opposed to being divided for transmission using frequency diverse signaling and/or spatially diverse signaling.

The communication system 10 may be configured to facilitate transport of the input signal 44 (input data, message, video, audio, etc.) from an originating address associated with the sourcing entity to a destination address associated with the first UE 38 (or other end station). The present invention contemplates the signal processor 12 being configured to convert the input signal 44 to an intermediary signal prior to providing long-haul transport of the intermediary signal over one or more of the contemplated communication mediums so that the intermediary signal can be re-processed with another signal processor, such as with a signal processor 48 of the first end station 22 that converts the intermediary signal to the output signal 46. In this manner, the output signal 46 may take the same form as the input signal 44 prior to being processed with the first signal processor 12. Optionally, the second signal processor 48 may be configured to generate the output signal 46 as a different type of signal. The signal 46 as it comes out of signal processor 48 may not be frequency or spatially diverse, e.g., signal 46 may need another processor like 12 to regenerate back spatial or frequency diverse signals. This would most likely be to implement a home "LTE over HFC" network that extends from the larger coverage LTE over HFC access network. Another way of extending frequency or spatially diverse signals may include using an end station similar to end station 40 and converting to spatially or frequency diverse signals without use of a signal processor similar to the processor 48. The second signal processor 48 may be configured to assess the signaling capabilities of the first UE 38 and to adjust the characteristics of the output signal 46 to operate with the capabilities of the first UE 38.

The first signal processor 12 may include a codeword multiplexing device 52. The codeword multiplexing device 52 may be configured to multiplex the input signal 44 into a plurality of signal parts 54, 56, 58, 60. The codeword multiplexing device 52 is shown to be configured for non-limiting purposes to multiplex the input signal 44 into a first signal part 54, a second signal part 56, a third signal part 58 and a fourth signal part 60. The codeword multiplexer 52 may be configured to facilitate encoding the signal parts 54, 56, 58, 60 in/with codewords in order to enable additional robustness through addition of parity information. The codeword multiplexing device 52 may add extra bits to each signal part 54, 56, 58, 60 to increase robustness and the capability to reconstruct the original signal in case bits from one or more of the signaling parts 54, 56, 58, 60 are lost during communication. In a very benign environment, processing provided by the codeword multiplexing device 52 may be foregone, however, many applications, and in particular in MIMO, may practically require the additional robustness provided with the codewords. The use of four signal parts 54, 56, 58, 60 is believed to be beneficial as the particular implementation contemplates facilitating MIMO operations where the split parts correspond to four independent antenna ports. The codeword multiplexing device 52 may be configured to divide the input signal 44 into each of the signal parts 54, 56, 58, 60 such that each signal part 54, 56, 58, 60 carries at least a different portion of the input signal 44.

The signal processor 12 may include a plurality of modulation mapping devices 62, 64, 66, 68. The modulation mapping devices 62, 64, 66, 68 may be configured to format a received one of the first, second, third and fourth signal parts 54, 56, 58, 60 with respect to a constellation symbol. The mapping devices 62, 64, 66, 68, for example, may take a digital stream and convert that information into coordinate values defining different constellation symbols. The constellation symbols may correspond with a transport mechanism used within the communication system 10 to facilitate scheduling long-haul transmissions over the wireline communication 34, such as the constellation symbols associated with the MAP disclosed in U.S. patent application Ser. No. 12/954,079, the disclosure of which is hereby incorporated by reference in its entirety. In this manner, the modulation mapping devices 62, 64, 66, 68 may be configured to facilitate manipulating the data received from the codeword multiplexer 52 for actual transmission within the system 10. The modulation mapping devices 62, 64, 66, 68 may be configured to map or otherwise associate the bits/bytes output from the codeword multiplexer 52 with particular time periods and/or frequencies or other coordinates associated with transmission through the communication medium 34.

The signal processor 12 may include a plurality of orthogonal frequency division multiplexing (OFDM) processing devices 70, 72, 74, 76 (even though OFDM processing devices are included here as an example, other type of multicarrier or single carrier processing devices may be used). The OFDM processing devices 70, 72, 74, 76 may be configured to facilitate transmission of the received one of the first, second, third and fourth signal parts 54, 56, 58, 60 over a plurality of subcarriers. The OFDM processing devices 70, 72, 74, 76 may be configured to facilitate transmitting each signal part 54, 56, 58, 60 using an independent one of multiple narrowband subcarriers. The constellation symbol resulting from the modulation mapping devices 62, 64, 66, 68 may be used to define a plurality of values to which the particular subcarriers may be mapped. The use of multiple narrowband subcarriers may be beneficial in certain radio frequency environments compared to a single wideband carrier implementation. In principle, wideband carriers can also be used to carry frequency or spatially diverse information, however, the example of multiple narrowband subcarriers is used based on the likely environmental characteristics allowing it to provide better performance. The OFDM processing devices 70, 72, 74, 76 may be configured to translate a theoretical mapping provided by the modulation mapping devices 62, 64, 66, 68 for each signal part 54, 56, 58, 60 into actual signaling streams (spectrum) having specific parameters that will govern how the corresponding signals are actually transmitted beyond the signal processor 12. In this manner, the OFDM processing devices 70, 72, 74, 76 may be configured to map binary representations associated with the modulation mapping devices 62, 64, 66, 68 to the actual spectrum (e.g., signals received by the converter devices 80, 82, 84, 86).

The signal processor 12 may include a plurality of converter devices 80, 82, 84, 86. The converter devices 80, 82, 84, 86 may be configured to convert signaling associated with a received one of the first, second, third and fourth signal parts 54, 56, 58, 60 from a received frequency to a desired output frequency. The converter devices 80, 82, 84, 86 are shown to convert each of the first, second, third and fourth signal parts 54, 56, 58, 60 to a different frequency, which are correspondingly illustrated as a first frequency (F1), a second frequency (F2), a third frequency (F3) and a fourth frequency (F4). The conversion of each signal part 54, 56, 58, 60 output from the codeword multiplexing device 52 into a different frequency may be useful in providing frequency diversity. The frequency diversity enable the simultaneous transmission of multiple frequency multiplexed signals over medium 34, and thereby may allow more data to be transmitted than multiple spatially multiplexed signals over medium 110. Almost ideal or true orthogonality or diversity may be achieved over the HFC environment while spatial diversity over the wireless medium is not as efficient.

Figure 3:
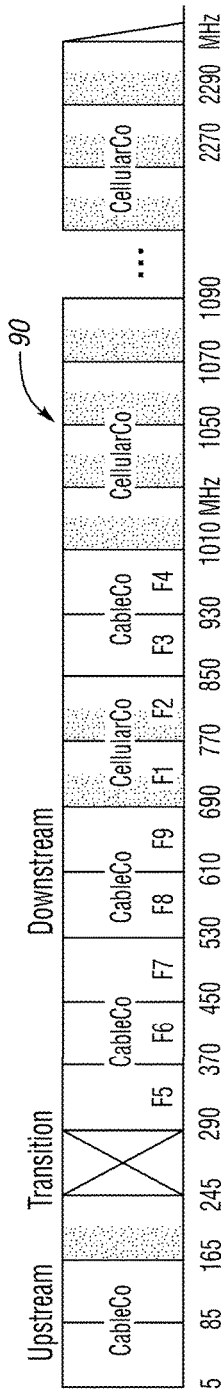
FIG. 3 illustrates a frequency selection map in accordance with one non-limiting aspect of the present invention.

FIG. 3 illustrates a frequency selection map 90 in accordance with one non-limiting aspect of the present invention. The frequency conversion map 90 may be used to facilitate selection of the frequency conversion performed with the signal processor converters 80, 82, 84, 86. The frequency selection map 90 may include a plurality of frequency intervals assigned to facilitate upstream and downstream transmissions within the communication medium 34. An additional interval of frequencies may be set aside as a transition boundary between upstream and downstream related frequencies in order to prevent fall off or other interferences between the upstream/downstream frequencies. The mapping table is shown to include a feed reference (F1, F2, F3, F4, F5, F6, F7, F8, and F9) within each one of the downstream intervals in order to illustrate certain frequency ranges set aside for particular feeds 14, 16, 18. One non-limiting configuration of the communication system 10 contemplates nine feeds being simultaneously transported downstream through the communication mediums without interfering with each other.

Each of the potentially supportable feeds 14, 16, 18 may be assigned to a particular one of the intervals depending on a mapping strategy, licensing strategy or other operational requirements. The frequencies of each feed 14, 16, 18 may be determined by an originator of the corresponding input signal 44. The signal processor 12 may identify the originator from additional information received with the corresponding input signal 44 in order to facilitate identifying which portion of the mapping table 90 has been allocated to support signal transmissions of that originator. A first interval of the downstream frequency spectrum ranging from 690-770 MHz has been allocated to support signaling associated with the originator of the first feed 14. A second interval the downstream frequency spectrum ranging from 770-850 MHz has been allocated support signaling associated with the originator of the second feed 16. The corresponding intervals of the downstream frequency spectrum allocated to the other feeds 18 as shown with reference to one of the illustrated F3, F4, F5, F6, F7, F8 and F9 designations.

When processing the first feed 14, the converter devices 80, 82, 84, 86 assigned to facilitate conversion of each corresponding signal part 54, 56, 58, 60 may be configured to select four different output frequencies from within the corresponding interval of the selection map, i.e., within 690-770 MHz. The particular frequency selected for each converter 80, 82, 84, 86 from within the 690-770 MHz interval may be determined in order to maximize a center frequency spacing, e.g., the first frequency (F1) may correspond with 710 MHz, the second frequency (F2) may correspond with 730 MHz, the third frequency (F3) may correspond with 750 MHz and the fourth frequency (F4) may correspond with 770 MHz. The intervals in the selection map 90 may be tailored to the particular center frequency offset in order to facilitate desired frequency spacing, which for exemplary non-limiting purposes has been selected to correspond with 20 MHz. The signal processor 12 may include a separate set of devices to support simultaneous transmission of the second feed 16 whereby the corresponding converters may be configured to output the signal parts associated with the second feed at 790 MHz, 810 MHz, 830 MHz and 850 MHz. (The devices used to support the additional feeds are not shown however they would duplicate the devices illustrated in FIG. 2 with additional duplicates optionally being included to support additional feeds.)

The signal processor 12 may include a combiner 92 configured to receive the signal parts 54, 56, 58, 60 from the converter devices 80, 82, 84, 86 as well as other signal processors as described here or from other processors from other services carried over the CATV networks. The combiner 92 may be configured to aggregate the received frequency diverse signals for transport over the communication medium 34. The combiner 92 may be configured to prepare the received first, second, third and fourth signal parts 54, 56, 58, 60 for transmission to a laser transmitter (see optical transmitter/receiver (opt. Tx/Rx) in FIG. 1) to facilitate subsequent modulation over an optical medium and/or for transmission directly to a hybrid fiber coaxial (HFC) or other wired communication medium 34. The laser transmitter may be configured to receive the signaling (h11, h22, h33, h44) from the combiner 92 as a single/common input to be subsequently modulated for transport over one or more of the fibers and/or coax portions of the communication medium 34. The communication medium 34 may be used to facilitate long-haul transport of the signal parts 54, 56, 58, 60 for subsequent receipt at the first end station 22. This type of long-haul transport of frequency diverse signaling, derive from processing the non-frequency diverse signaling received at the input 44 to the signal processor, may be helpful in maximizing signaling throughput.

The second signal processor 48 may include a processor, a plurality of down-converter devices, a plurality of OFDM processing devices or alternative multicarrier or single carrier processing devices, a plurality of modulation de-mapping devices and a codeword de-multiplexing device. These devices may be configured to facilitate inverse operations to those described above with respect to the signal processor 12 in order to facilitate generating the output signal 46. While the signal processors 12, 48 are described with respect to including various devices to facilitate the contemplated signal transmission, the signal processors 12, 48 may include other electronics, hardware, features, processors, or any other sufficient type of infrastructure having capabilities sufficient to achieve the contemplated signal manipulation. The first end station 22, in particular, may include an output port or other interface to facilitate communication of the output signal 46 to the first UE 38. In this manner, the communication system 10 may be configured to facilitate wireline signaling between the signal processor 12 and the first end station 22. FIG. 2 describes signaling corresponding with a downstream direction for exemplary purposes as an equivalent but inverse set of components going in the uplink direction may be included to facilitate similar processes in a reverse or inverse order to facilitate upstream signaling.

Figure 4A:
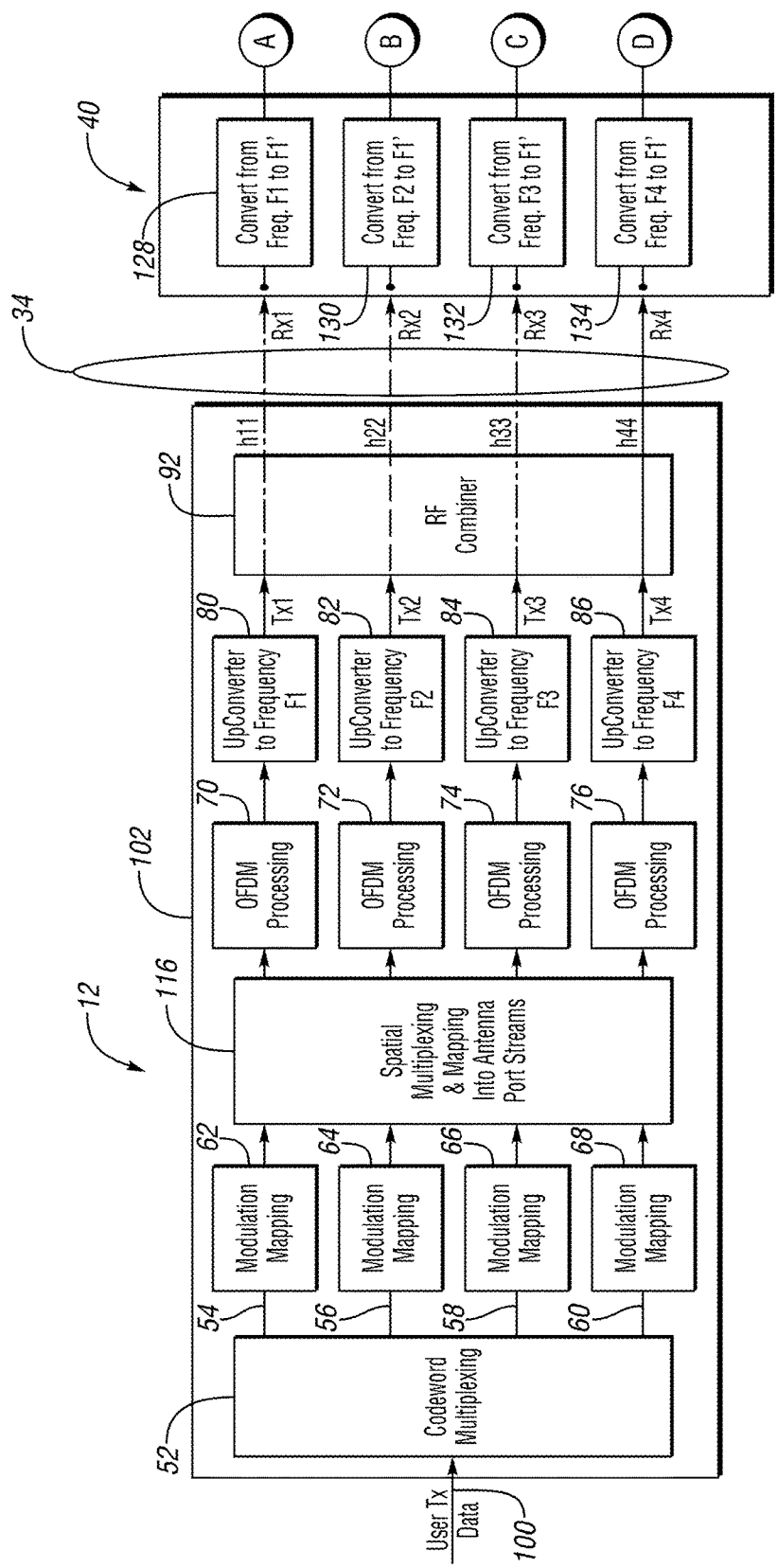
FIGS. 4a-4b schematically illustrate operation of the communication system when facilitating a wireless signaling mode in accordance with one non-limiting aspect of the present invention.
Figure 4B:
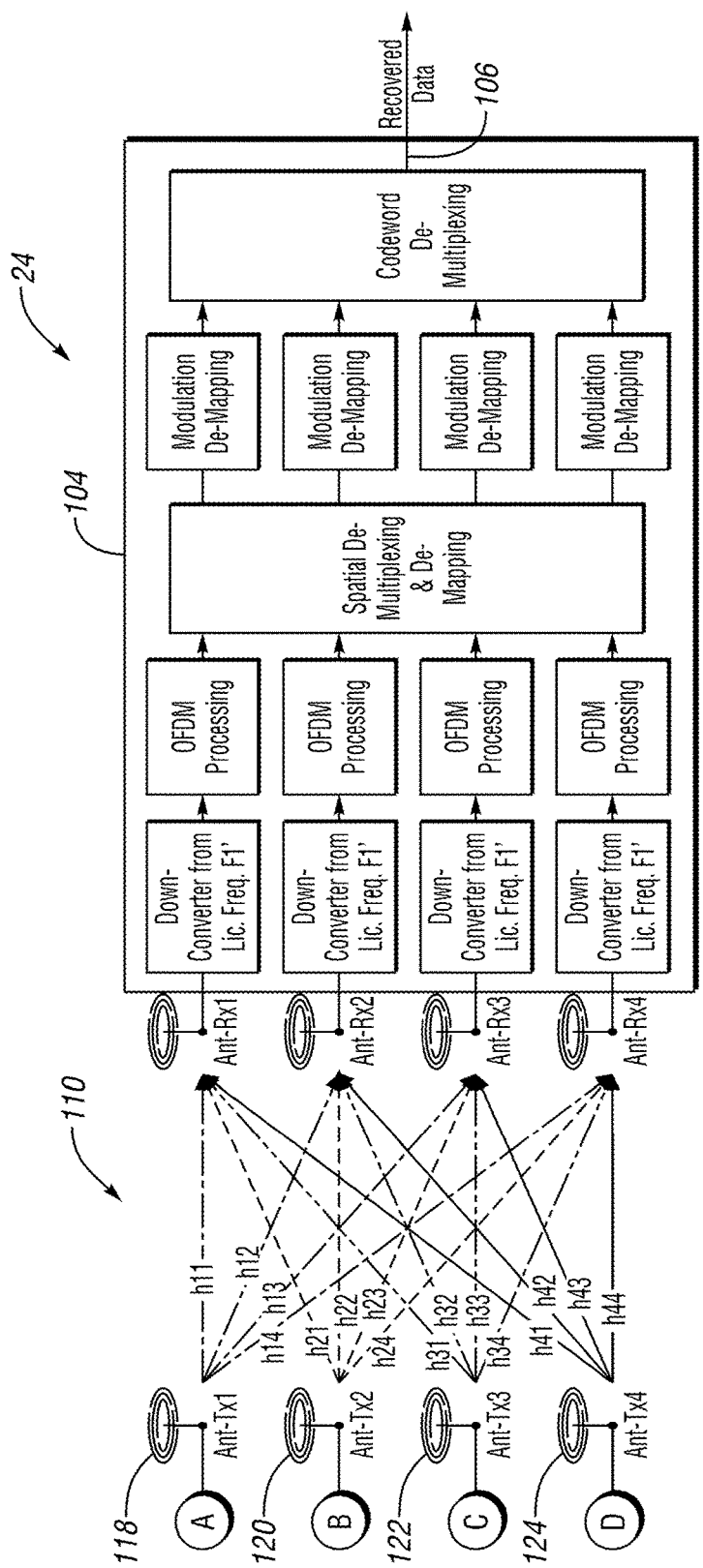

FIGS. 4a-4b schematically illustrate operation of the communication system 10 when facilitating wireless signal in accordance with one non-limiting aspect of the present invention. The wireless signaling may be similar to the signaling described with respect to FIG. 2 in that an input signal 100 received at the first signal processor 12 is converted to an intermediary signal (combined into a single/common output to laser transmitter, which is shown for exemplary purposes as having four equivalent parts—h11, h22, h33, h44) for transmission to a second signal processor 104 for conversion to an output signal 106. The illustration associated with FIG. 4 differs from that in FIG. 2 at least in that the intermediary signal traverses at least part of the distance between the first and second signal processors 12, 104 through a wireless medium 110. In particular, FIG. 4 illustrates a scenario where the intermediary signal is transmitted initially through the wireline communication medium 34 and thereafter through the wireless communication medium 110, which may correspond with a signal traveling from the headend unit 30 through the third end station 40 for wireless receipt at the second end station 24 (see FIG. 1).

The configuration shown in FIG. 4 may have many uses and applications, including supporting cellular telephone services, or other services that are at least partially dependent on wireless or RF signaling, such as where a provider desires to obtain certain benefits associated with transporting signaling at least partially through the wireline communication medium 34. The ability to at least partially rely on the wireline communication medium 34 may be beneficial in facilitating long-haul transport of the corresponding signaling (intermediary signal) in a manner that maximizes throughput and minimizes interference or other signaling loss that may otherwise occur if transmitted solely through wireless mediums. The third end station 40 may be included between the first and second end stations 22, 24 to facilitate interfacing the wireline communication medium 34 with the wireless communication medium 110. Optionally, the third end station 40 may be positioned as close to the second end station 24 as possible in order to maximize use of the wireline communication medium 34 and/or the third end station 40 may be included as part of the first end station 22 in order to maximize wireless communication.

The first and second signal processors 12, 104 shown in FIG. 4 may be configured similarly to the corresponding signal processors shown in FIG. 2. The elements illustrated in FIG. 4 with the same reference numerals, unless otherwise noted, may be configured to perform in the same manner as those described above with respect to FIG. 2. The first and second signal processors 12, 104 of FIG. 4 may include an additional device to facilitate supporting the at least partial wireless communication, which is referred to as a spatial multiplexing and mapping device 116 and its corresponding inverse 116'. The spatial multiplexing device 116 may be configured to facilitate spatial diversity of the signal parts output from the modulation mapping devices 62, 64, 66, 68. The spatial multiplexing and mapping device 116 may be configured to add delay to one or more of the signal parts 54, 56, 58, 60 or modify these signal parts in different ways in order to facilitate spatially separating each signal part 54, 56, 58, 60 from one another. This may be beneficial in order to enhance the spatial diversity of antennas 118, 120, 122, 124, which may be individually used to transmit the signal parts 54, 56, 58, 60.

The third end station 40 may be configured to receive the frequency diverse signaling output from the combiner 92. The third end station 40 may include converter devices 128, 130, 132, 134 or additional features sufficient to facilitate converting the received frequency diverse signaling to spatially diverse signaling. The third end station 40 may include one converter device 128, 130, 132, 134 for each of the received signal parts, i.e., a first converter 128 for the first signal part 54, a second converter 130 for the second signal part 56, a third converter 132 for the third signal part 58 and a fourth converter 134 for the fourth signal part 60. Each converter 128, 130, 132, 134 may be configured to convert the frequency of the received signal part to a common frequency in order to translate frequency diversity over medium 34 to spatial diversity over medium 110. The common frequency may correspond with a frequency licensed by an originator of the input signal 100, e.g., wireless frequency ranges purchased by cell phone service providers and/or another frequency range otherwise designated to be sufficient to facilitate subsequent wireless transmission to the second end station 24. The second end station 24 may include a separate antenna and separate active converter devices for each of the spatially diverse signal it receives in order to facilitate spatially receiving the signal parts to the second UE. FIG. 4 describes signaling corresponding with a downstream direction for exemplary purposes as an equivalent but inverse set of components going in the uplink direction may be included to facilitate similar processes in a reverse or inverse order to facilitate upstream signaling.

Figure 5A:
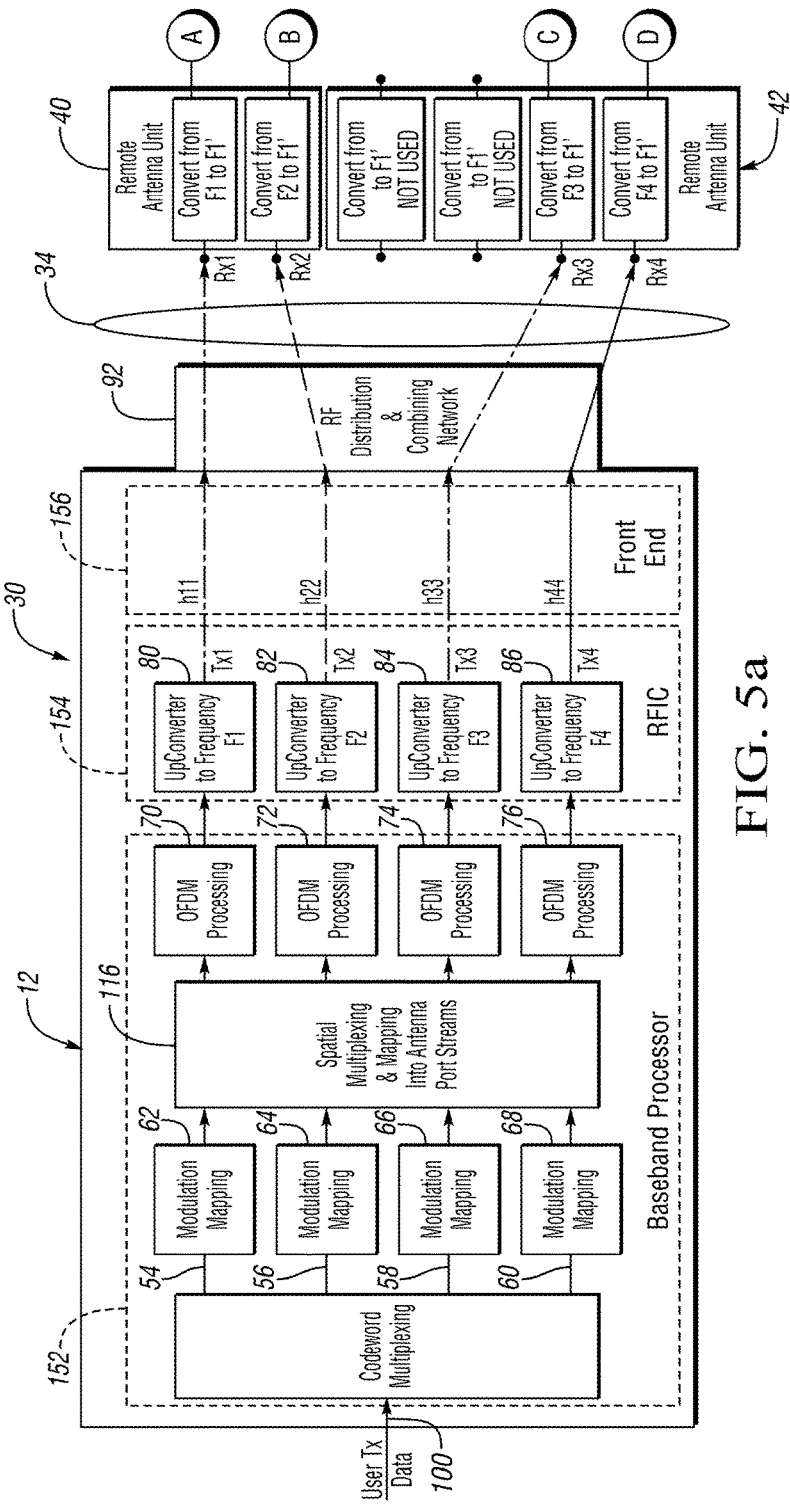
FIG. 5a-5b schematically illustrates operation of the communication system when facilitating wireless signaling having enhanced spatial diversity in accordance with one non-limiting aspect of the present invention.
Figure 5B:
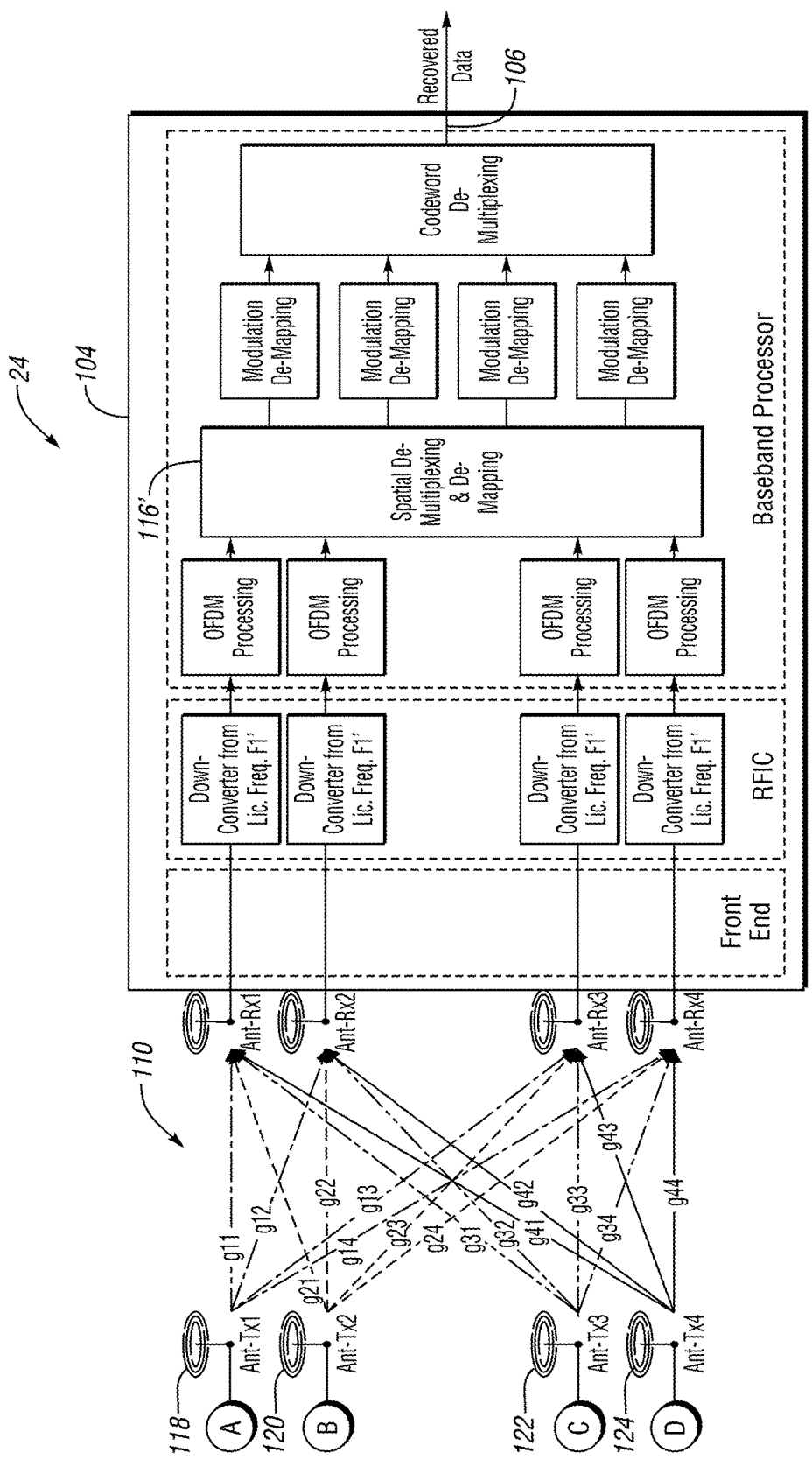

FIGS. 5a-5b schematically illustrates operation of the communication system 10 when facilitating wireless signaling having enhanced spatial diversity in accordance with one non-limiting aspect of the present invention. The wireless signaling may be similar to the signaling described with respect to FIGS. 2 and 4 at least in that the input signal 100 received at the first signal processor 12 is converted to an intermediary signal (combined into a single/common output to laser transmitter shown for exemplary purposes as having four equivalent parts—h11, h22, h33, h44) for transmission to the second signal processor 104 where it is then converted to the output signal 106. The illustration associated with FIG. 5 differs from that in FIG. 4 at least in that the intermediary signal traverses at least part of the distance between the first and second signal processors 12, 104 through the wireless medium 110 by way of two remote antenna units instead of one. FIG. 5 illustrates a scenario where the intermediary signal is transmitted initially through the wireline communication medium 34 and thereafter through the wireless communication medium 110, which may correspond with signaling traveling from the headend unit 30 through the third end station 40 and the fourth end station 42 for wireless receipt at the second end station 24 (see FIG. 1). FIG. 5 provides enhanced spatial diversity for the wireless signals due to the third end station 40 being at a location physical different from or spatially distinct from the fourth end station 42.

One non-limiting aspect of the present invention contemplates the third and fourth end stations 40, 42 being physically spaced apart in order to enhance the spatial diversity of the wireless signals transmitted therefrom, at least in comparison to the wireless signaling shown in FIG. 4 to be transmitted solely from the third end station 40. The fourth end station 42 is shown to be connected to a different trunk, cable, fiber line, etc. than the third end station 40 in order to demonstrate the ability of the signal processor 12 to transmit signals to the second end station 24 using multiple, frequency diverse portions of the wired communication medium 34. The signal processor 12 may be configured to select from any number of end stations when determining the two or more end stations desired to communicate wireless signaling with the second end station. The two or more end stations may optionally included another end station that may be closer to the second end station and/or connected to the same trunk or feed, such as but not limited to a fifth end station 140 (see FIG. 1). In this manner, the signaling desired for receipt at the second end station may commonly originate from the signal processor and thereafter traverse different portions of the wired communication medium 34 and the wireless communication medium 110 prior to being re-joined and commonly received at the second end station 24. FIG. 5 describes signaling corresponding with a downstream direction for exemplary purposes as an equivalent but inverse set of components going in the uplink direction may be included to facilitate similar processes in a reverse or inverse order to facilitate upstream signaling.

Figure 6A:
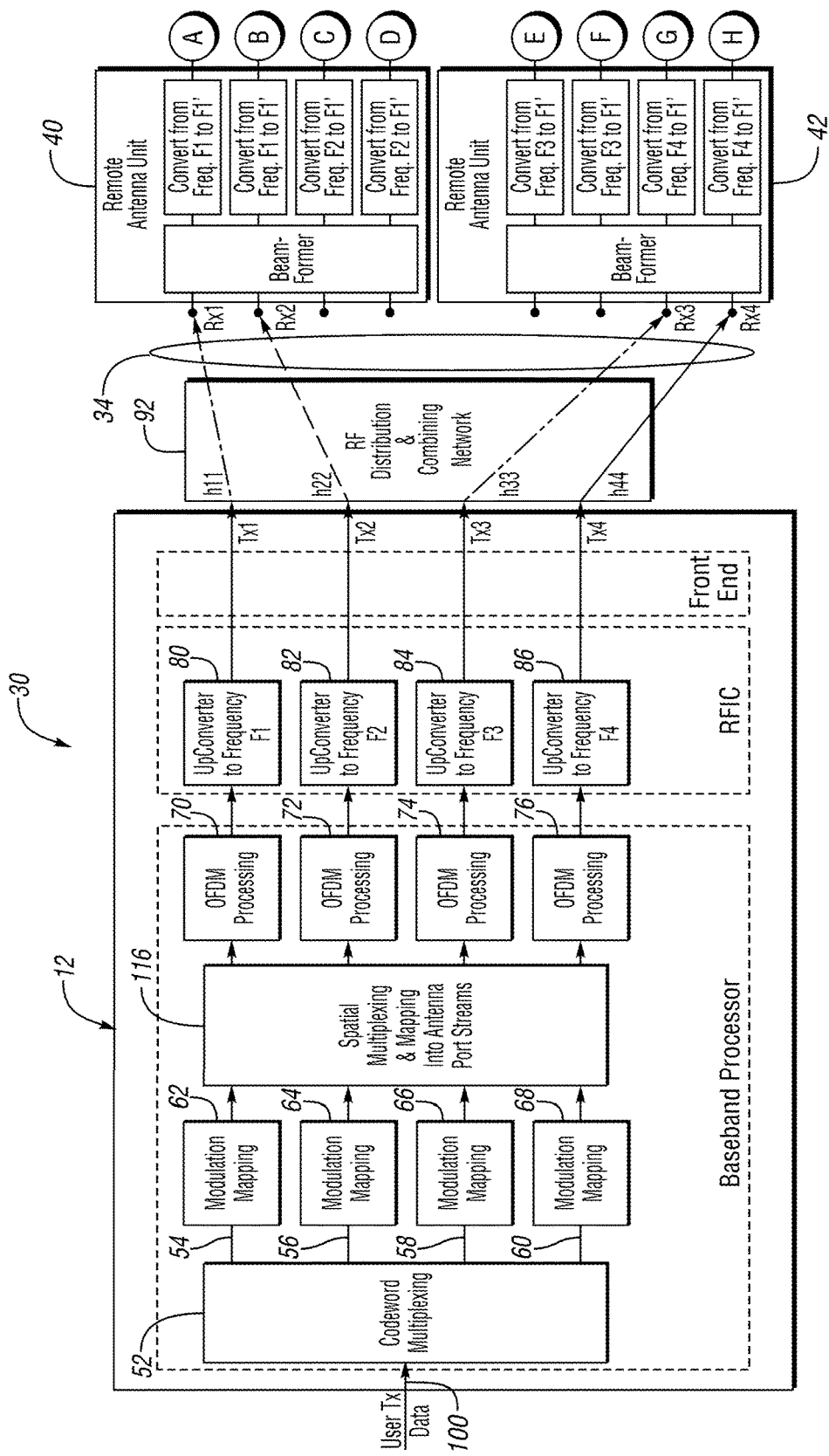
FIG. 6a-6b schematically illustrates operation of the communication system when facilitating wireless signaling having enhanced spatial diversity in accordance with one non-limiting aspect of the present invention.
Figure 6B:
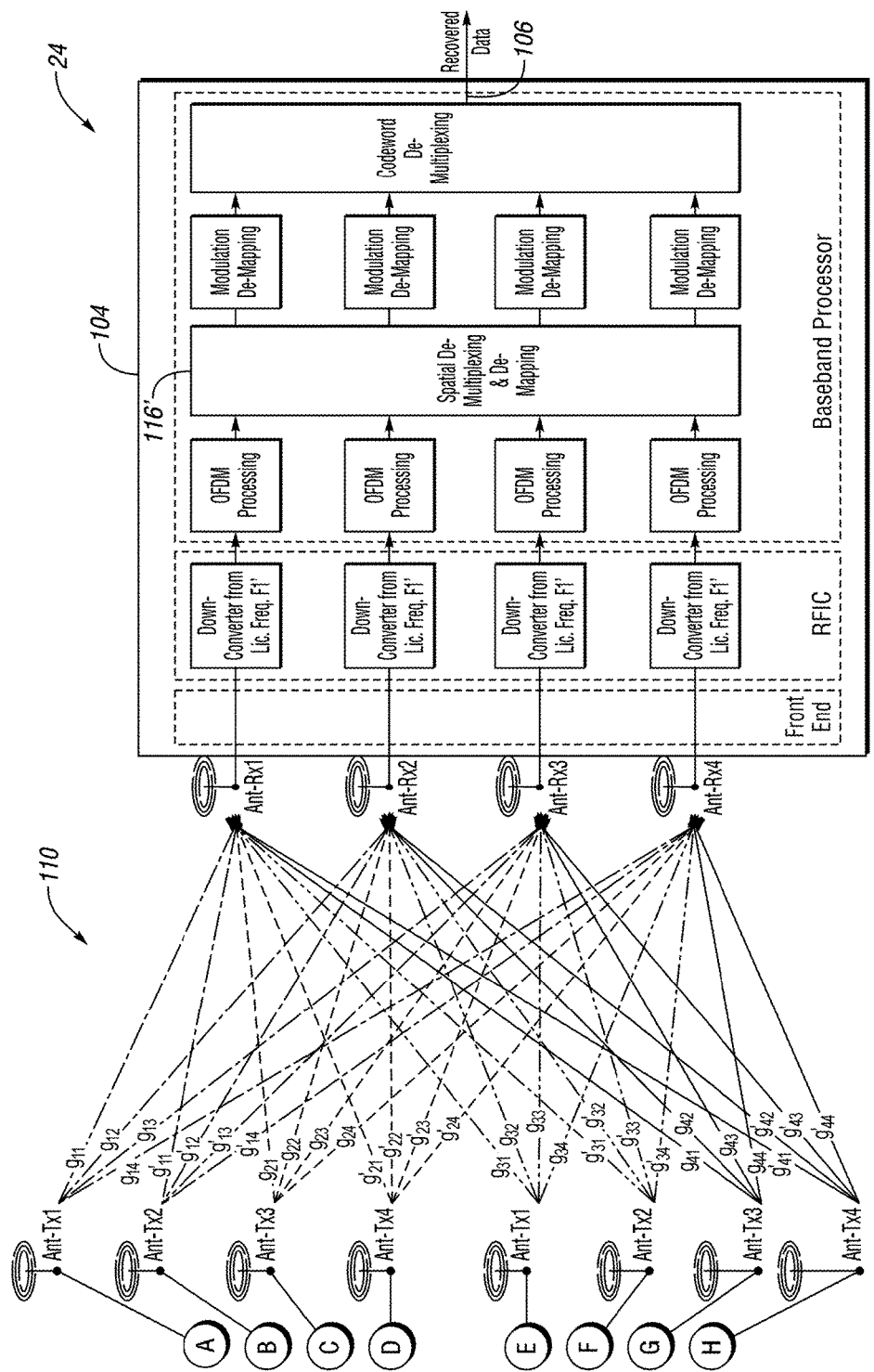

FIGS. 6a-6b schematically illustrates operation of the communication system 10 when facilitating wireless signaling having enhanced spatial diversity with beamforming in accordance with one non-limiting aspect of the present invention. The wireless signaling may be similar to the signaling described with respect to FIGS. 2, 4 and 5 at least in that the input signal 100 received at the first signal processor 12 is converted to an intermediary signal (combined into a single/common output to laser transmitter shown for exemplary purposes as having four equivalent parts—h11, h22, h33, h44) for transmission to the second signal processor 104 where it is then converted to the output signal 106. The illustration associated with FIG. 6 differs from that in FIG. 5 at least in that the intermediary signal traverses at least part of the distance between the first and second signal processors 12, 104 through the wireless medium 110 using beamforming. FIG. 6 illustrates a scenario where the intermediary signal received at each of the first and second end stations 40, 42 is replicated with beamformers such that duplicate signals are output to addition ports for use in transmitting four wireless signals. The additional wireless signals may be replicated with phase, delay or amplitude adjustments sufficient to facilitate beamforming. FIG. 6 describes signaling corresponding with a downstream direction for exemplary purposes as an equivalent but inverse set of components going in the uplink direction may be included to facilitate similar processes in a reverse or inverse order to facilitate upstream signaling.

The signal processor 12 may be configured to facilitate MIMO related signaling by processing an input signal into multiple, frequency diverse signals (e.g., h11, h22, h33, h44) particularly suitable for transmission over an HFC infrastructure. Following transmission over the HFC infrastructure, the signals may optionally be processed for further wireless transport, such as by converting the frequency diverse, MIMO related signals to a common frequency prior to facilitating wireless transmission. Spatial diversity may be facilitated on the frequency converted signals sharing the common frequency by adding delay and/or other adjustments and transformations, i.e., signals carried over the HFC infrastructure, and/or by directing different portions of the MIMO signals derived from the same input signal to different, spatially diverse remote antenna units 40, 42 before wireless transport. Optionally, the frequency diverse, MIMO signals may be transmitted to different types of remote antenna units or remote antenna units having different transmission capabilities, e.g., FIG. 5 illustrates the third end station 40 having two converters and two antenna ports and the fourth end station 42 having four converters and four antenna ports.

The remote antenna units 40, 42, or more particularly the converters associated therewith, may be configured to convert received signaling for transport over corresponding antennas ports. Each antenna port may be configured to transmit one of the converted, MIMO signals (h11, h22, h33, h44), effectively resulting in transmission of multiple signals, e.g., signal h11 effectively produces multiple signals g11, g12, g13, g14 due to signal h11 being received at multiple antenna ports included on the receiving user equipment 24. The remote antenna units 40, 42 may be configured to simultaneously emit multiple MIMO signals, such as MIMO signals associated with different feeds and/or MIMO signals intended for receipt at other usual equipment besides the illustrated user equipment 24. The remote antenna units 40, 42 may include capability sufficient to facilitate beamforming or otherwise shaping wireless signals emitted therefrom, such as to in a manner that prevents the beams from overlapping with each other or unduly interfering with other transmitted signaling. The beamforming may be implemented using multiple antenna arrays or selection of antennas ports associated with each of the illustrated antennas, such as according to the processes and teachings associated with U.S. patent application Ser. No. 13/922,595, the disclosure of which is hereby incorporated by reference in its entirety.

Figure 7:
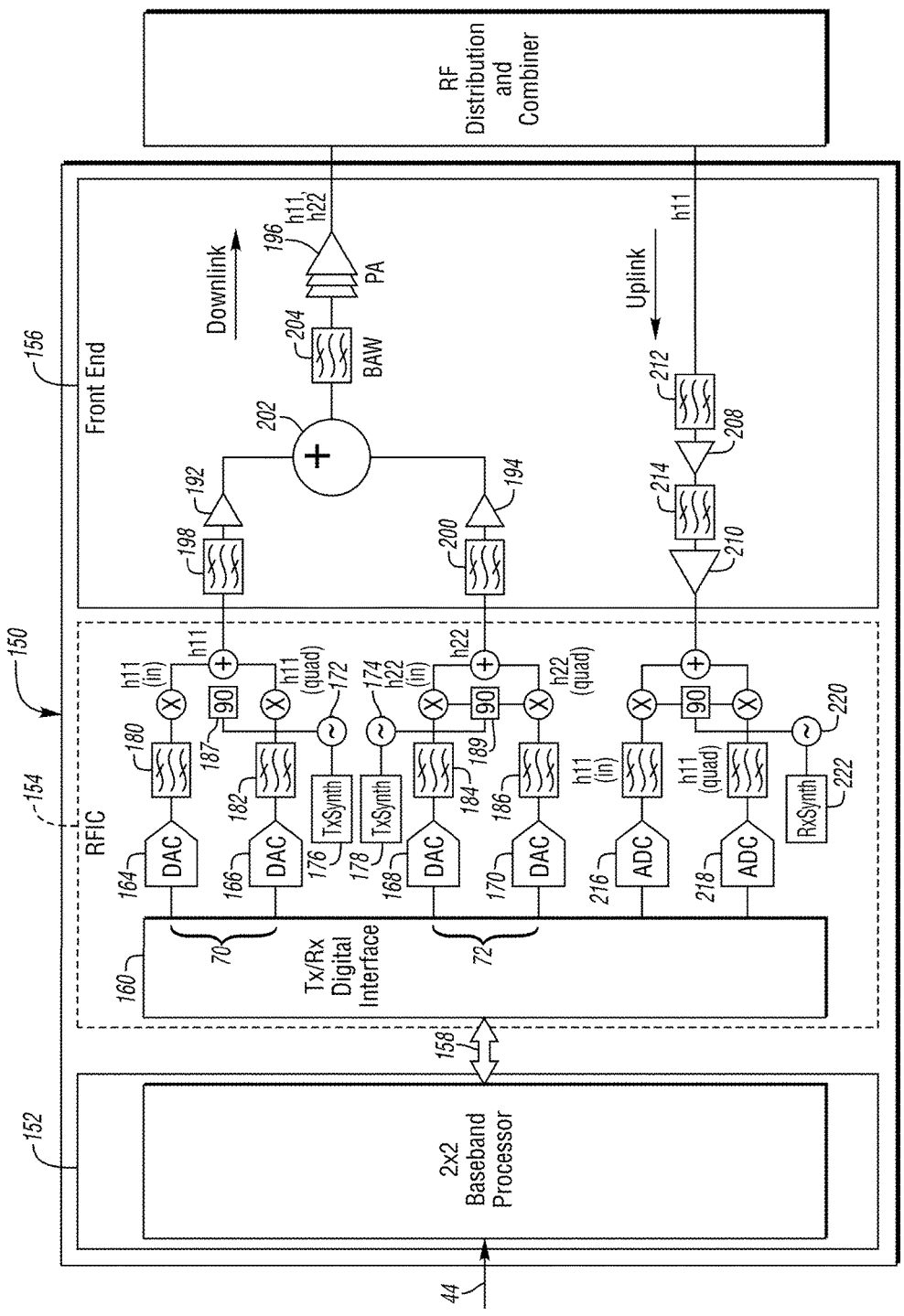
FIG. 7 illustrates a signal processor as configured to facilitate signaling in accordance with one non-limiting aspect of the present invention.

FIG. 7 illustrates a signal processor 150 as configured to facilitate signaling in accordance with one non-limiting aspect of the present invention. The signal processor 150 may be considered as a 2×2 MIMO signal processor at least in that in the input signal 44 is shown to be processed into a first signal (h11) and a second signal (h22) for transport. The signal processor 150 may be one of the signal processors 12 residing at the headend or hub location 30 in a wireline cable network as an aggregation/distribution component to facilitate interconnecting an aggregation network to the access or local distribution network (e.g., wireline network 34 and/or wireless network 110). The signal processor 150 may include a plurality of devices configured to facilitate processing signals for wireline transport over the cable network 34, and optionally subsequent wireless transmission over the wireless network 110. (The plurality of devices are illustrated in FIGS. 2, 4 and 5 for exemplary non-limiting purposes with respect to those associated with facilitating downlink communications, i.e., communications originating from headend and thereafter traversing in a downstream direction to the end stations). The devices are shown for exemplary non-limiting purposes with respect to being arranged into three basic components: a baseband processor unit 152, a radio frequency integrated circuit (RFIC) 154 and a front end 156.

The baseband processor 152 unit may include various devices (e.g., the devices 52, 62, 64, 66, 68, 70, 72, 74, 76 and/or 116) associated with processing the input signals received at the signal processor for subsequent transport. The baseband processor unit 152 may process the input signals, which may be baseband, non-CW signals or signals otherwise lacking spatial and/or frequency diversity, into frequency diverse signals (e.g., when configured in accordance with FIG. 2 or in other situations when sufficient spatial diversity may be provided (e.g., in the event two remote antennas are sufficiently spaced) and into frequency and spatially diverse signals (e.g., when configured in accordance with FIGS. 4-6). The baseband processor unit 152 may be configured to generate individual data paths in a digital form prior to conversion into a digitally modulated RF signal for upconversion to the intended frequencies. Rather than having the baseband processor 152 in a different location than the RFIC 154 and the front end 156 as is the case with some remote antenna unit implementations, one non-limiting aspect of the present invention contemplates having them co-located, optionally with a Joint Electron Device Engineering Council (JEDEC) specification (JESD207) interface 158 or an equivalent or otherwise sufficient interface as a connection piece to a transmit/receive (Tx/Rx) digital interface 160. The JESD207 interface 158 may eliminate the need for connecting the baseband processor using a fiber optic link for carrying the digitized RF therebetween.

Optionally, the baseband processor 152 may utilize the capability for higher order modulation as well as capabilities for carrying information within a long term evolution (LTE) payload or other wireless payload containing the HFC frequency assignment, end device and antenna element location information (used while in the HFC domain 34). This information may be used to further enhance the capabilities of the system to facilitate transmitting signaling over wireline and wireless segments. In addition, reliance on the LTE protocol may enable use of a number of control channels, such as a Packet Data Control Channel (PDCCH) to facilitate at least downlink signaling, system setup and link maintenance. The output channels h11, h22 may be specified as low order modulation only (QPSK or BPSK) to ensure robustness in the wireless environment. However, in the cable environment, control channel overhead could be reduced by using only one symbol of PDCCH instead of the three symbols used in wireless applications and efficiency could be greatly increased by increasing the modulation order of these channels and leveraging the more benign channel characteristics of the HFC plant. Additionally, the present invention proposes updates to modify the length of the cyclic prefix (CP) currently specified in the LTE protocol. CP inserted before each OFDM symbol can be reduced in the cable environment to improve efficiency, at least in comparison to LTE, which specifies a number of CP lengths to take into account of varying degrees of expected inter-symbol interference.

At least in the downlink direction, the RFIC 154 may be the component that uses the digital data paths signals and directs them through an appropriate digital-to-analog converter (DAC) 164, 166, 168, 170 to be subsequently upconvert to desired frequencies. The RFIC may be configured in accordance with the present invention to employ independent local oscillators (LO) 172, 174 and transmit synthesizers 176, 178 for each path (h11, h22). The use of separate oscillators may be beneficial in allowing for multiple independently placed data paths at different frequencies to enhance frequency orthogonality, e.g., the data path output from the OFDM 70 may be converted to a frequency (F1) that is different from a frequency (F2) of the data path output from the OFDM 72. (An oscillator common to both paths (h11, h22), at least when connected in the illustrated manner, would be unable to generated the separate frequencies F1, F2.) Filters 180, 182, 184, 186 may be included for an in-phase portion (h11(in), h22(in)) and a quadrature portion (h11(quad), h22(quad)) to filter signals before subsequent front end processing, such as to facilitate removing noise, interferences or other signal components before the in-band and quadrature portions reach RF mixers operating in cooperation with the oscillators 172, 174. Optionally, the filters 180, 182, 184, 186 may be tunable, e.g., according to the frequency of the signaling from the OFDM 70, 72 as the OFDM frequency may vary. Instead of frequency multiplexing the signals adjacent to each other, and thereby requiring sharp roll-off filtering, the separate oscillators 172, 174 may be used to maintain frequency orthogonality, i.e., signal spacing, optionally allowing for placement of the orthogonal signal carriers without guard-bands and/or the use of a filter(s). The RFIC may be configured with 90 degree phase shifters 187, 189 to generate signals that are in-phase and in-quadrature to maximize total capacity. The phase shifter 187, 189 receive the local oscillator signal as input and generate two local oscillator signal outputs that are 90 degrees out of phase. These components enable the generation of quadrature amplitude modulated (QAM) signals. This invention describes the transmission of QAM signals as an example but it is not limited to QAM based transmissions.

The front end device 156 may be configured to aggregate and drive the signals h11, h22 to the coaxial medium (RF distribution and combining network) in the downlink direction. With the front end 156 connecting to the wired communication medium 34, the preset invention contemplates delivering signals from the signal processor 150 at relatively lower power levels than the signals would otherwise need to be delivered if being transmitted wirelessly. In particular, the contemplated cable implementation may employ amplifiers 188 (see FIG. 1) within the fiber and/or trunks to maintain the signaling power within certain levels, i.e., to amplify signaling output (h11, h22) from the RF distribution and combining network at relatively lower power levels and/or to ensure the signal power as emitted from the RF combining network remains approximately constant. The power level, for example, of a 20 MHz signal (h11, h22) output from the RF distribution and combining network to the optical transmitter may be approximately −25 dBm whereas similar wireless signaling outputted to an antenna, such as from a macro cell, may need to be greater, e.g., approximately 40 dBm. This contemplated capability of the present invention to leverage existing amplifiers and capabilities of existing HFC plants 34 may be employed to minimize the output signaling power requirements, and thereby improve design implications (i.e. lower gain) and provide lower implementation costs.

Downlink amplifiers 192, 194, 196 and/or filters 198, 200, 202 may be controllable to facilitate outputting the corresponding signaling at different power levels, e.g., the amplification of a first amplifier 192 may be different from a second amplifier 194 and/or an output amplifier 196. The amplification of the first and second amplifiers 192, 194, for example, may be set according to a signaling frequency and path being traversed to a corresponding output end station or remote antenna unit, i.e., the amplification of the signaling to the third end station 40 may be greater than or less than the amplification of the signaling to the fourth end station 42. In the medium 34, the channel frequency used to carry signals to end station 40 may be more attenuated than the channel frequency carrying the signals to end station 42, which may be compensated for with corresponding control of the amplifiers 192, 194. The ability to control the amplification on a per path basis may be beneficial in setting a slope of the corresponding signaling to account for losses, attenuation and/or other signaling characteristics of the corresponding path within the wired communication medium 34 in order to insure the signals are approximately flat when received at the corresponding output (e.g., the third and fourth end stations 40, 42). The output amplifier 196 may be similarly adjustable to further facilitate refinement of signaling power levels, such as to commonly amplify the signaling output (h11, h22) to the RF combiner using a larger and/or less precise amplifier than the first and second amplifiers 192, 194, which may be beneficial in allowing the use of smaller/more precise/accurate individual adjustment of first and second amplifiers 192, 194 and/or a more cost effective configuration.

The first and second amplifiers 192, 194 may optionally operate in cooperation with corresponding first and second filters 198, 200. The first and second filters 198, 200 may be controllable in order to facilitate downstream synchronization, elimination of sidelobes, unwanted adjacent channel energy and/or to compensate for signal distortions and/or other characteristics of the particular data paths to be traversed by the corresponding signaling. A combiner or other summation device 202 may be configured to join the signals (h11, h22) output from the first and second amplifier 192, 194, optionally after being individually gain adjusted and/or filtered. A bandpass filter such as a bulk acoustic wave (BAW) filter 204 may be used to minimize/suppress the energy of the OFDM sidelobes (70, 72) that may be generated outside the occupied signal spectrum, such as by passing through signaling within a passband range and blocking signaling outside thereof. The BAW 204, like the output amplifier 196, may be an extra component positioned downstream of the first/second amplifiers and filters 192, 194, 198, 200 in order to commonly filter the output signaling, such as for the purposes of using a larger and/or less precise filter 204 than the first and second filter 198, 200, which may be beneficial in allowing the use of smaller/more precise/accurate first and second filters 198, 200 and/or a more cost effective configuration. The BAW filter 204 or an equivalent filter may be used to protect services that coexist within medium 34, which occupy adjacent spectrum to the system described here.

In the uplink direction, signal processor 150 may be configured to processing incoming signals from an end stations ES, which is shown for exemplary purposes a signal h11, which may be different than the h11 signal transmitted on the downlink. The signal processor 150 is shown to support 2×2 MIMO on the downlink and 1×1, or non-MIMO, on the uplink for exemplary, non-limiting purposes as similar MIMO capabilities may be provided on the uplink. The incoming signal (h11) may be processed with third and fourth amplifiers 208, 210 and third and fourth filters 212, 214. The third and fourth amplifiers/filters 208, 210, 212, 214 may be controllable and/or tunable in order to facilitate proper signal recovery. As multiple tunings may occur over time for the downstream signaling, the upstream tunings may be similarly dynamic. State information may be kept to track and control the specific tuning parameters and/or data or other information may be include in the received signaling to facilitate the desired tuning of the third and further amplifiers/filters. Analog to digital converters (ADC) 216, 218 may be used to digitize the upstream down converted RF signals such that the front end device 156 may be configured to aggregate and drive the signal h11 from the coaxial medium in the uplink direction. As opposed to the separate oscillators and synthesizers in the downlink, the uplink maybe configured to operate in a SISO (or 1×1 MIMO) configuration may include a single oscillator and synthesizer 220, 222 to facilitate commonly converting the incoming signaling (h11) to the frequency output from the baseband processor (i.e., frequency of 70, 72) and/or another desired frequency. In case of an uplink configuration of 2×2 MIMO or greater MIMO order in medium 34 which requires frequency diversity, multiple local oscillators may be used.

Figure 8:
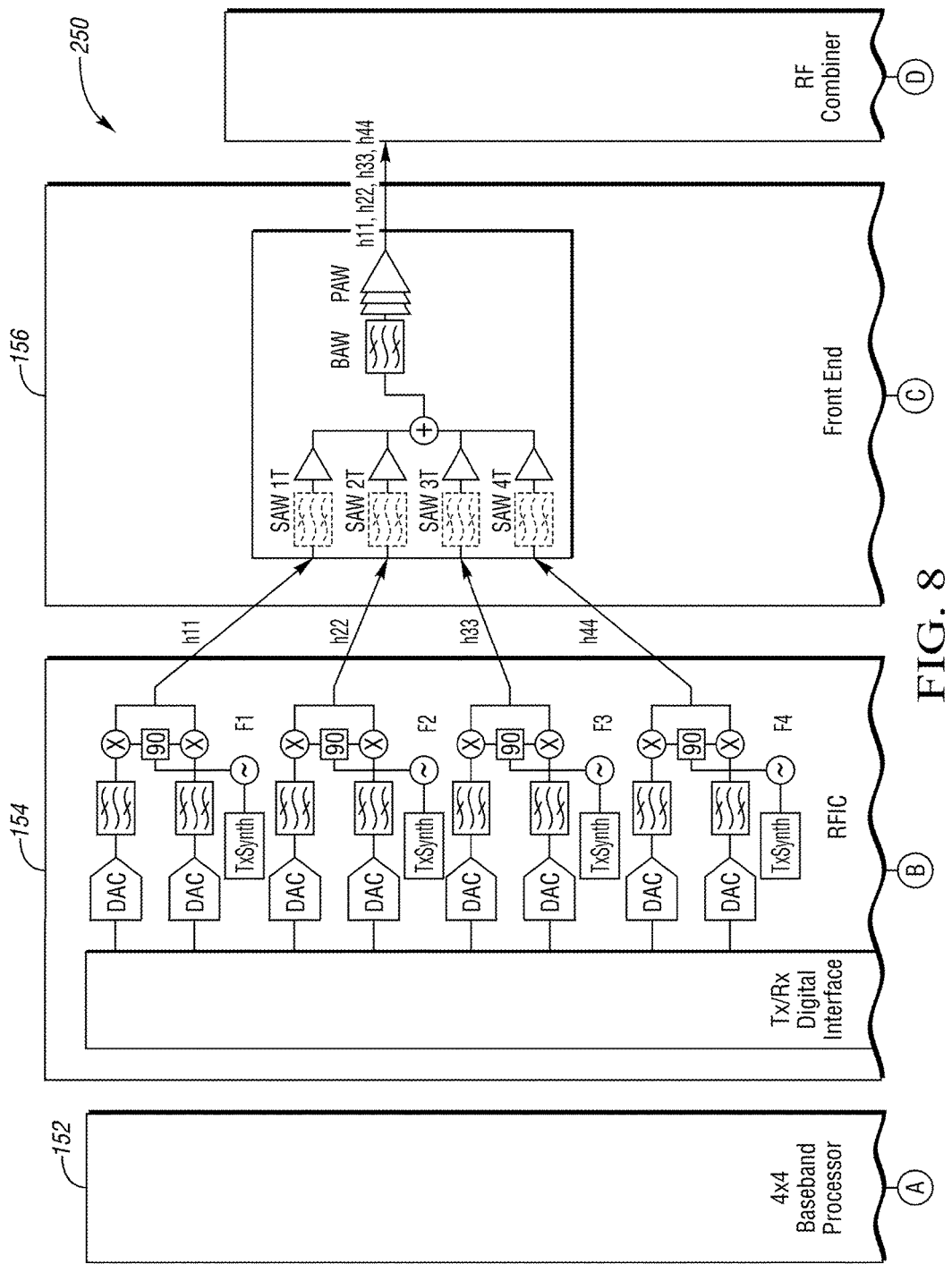
FIG. 8 illustrates a signal processor as configured to facilitate signaling in accordance with one non-limiting aspect of the present invention.
Figure 8:
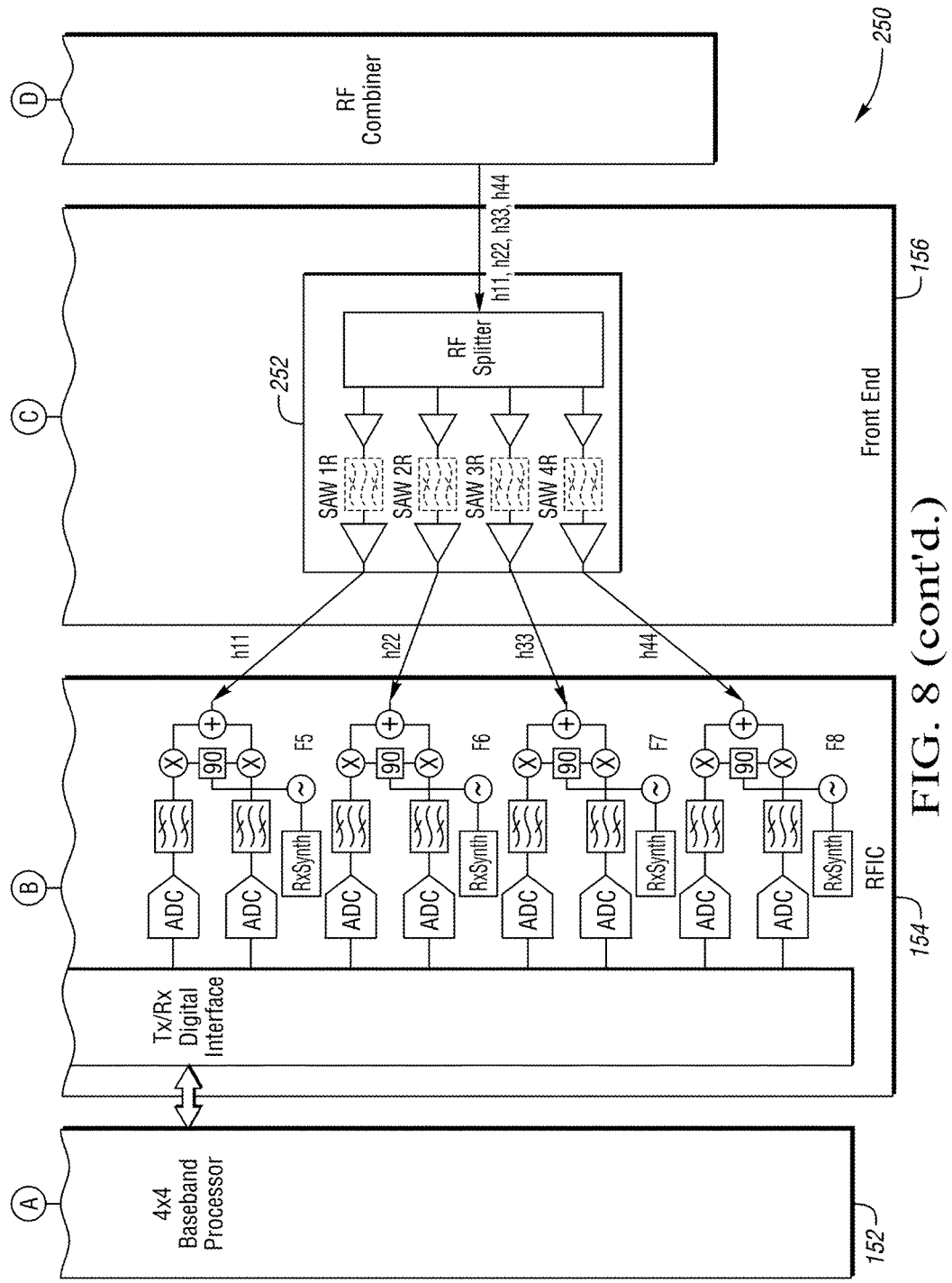

FIG. 8 illustrates a signal processor 250 as configured to facilitate signaling in accordance with one non-limiting aspect of the present invention. The signal processor 250 may be considered as a 4×4, MIMO signal processor at least in that singular signals input to and output from the baseband processor may be processed into a first signal (h11), a second signal (h22), a third signal (h33) and a fourth signal (h44) during uplink and downlink transport through the signal processor 250. The signal processor 250 may be configured similarly to the signaling processor 150 shown in FIG. 8, particularly with respect to the use of amplifiers, filters, combiners, digital and analog converters and oscillators/synthesizers (reference numerals have been omitted however the operation of the components may be controlled in the manner described above and the associated operation may be understood according to the corresponding circuit designation known to those skilled in the art). The signal processor 250 may include multiple oscillators/synthesizers, designated as F1, F2, F3, F4, F5, F6, F7 and F8, each of which be operable at a different and/or controllable frequency, to facilitate the contemplated MIMO operations. An RF splitter 252 may be added in the uplink to facilitate separating incoming (upstream) signaling into the equivalent parts h11, h22, h33, h44. (Note that unlike FIG. 6 that shows a SISO configuration in uplink, this example shows a 4×4 MIMO in the uplink.)

Figure 9:
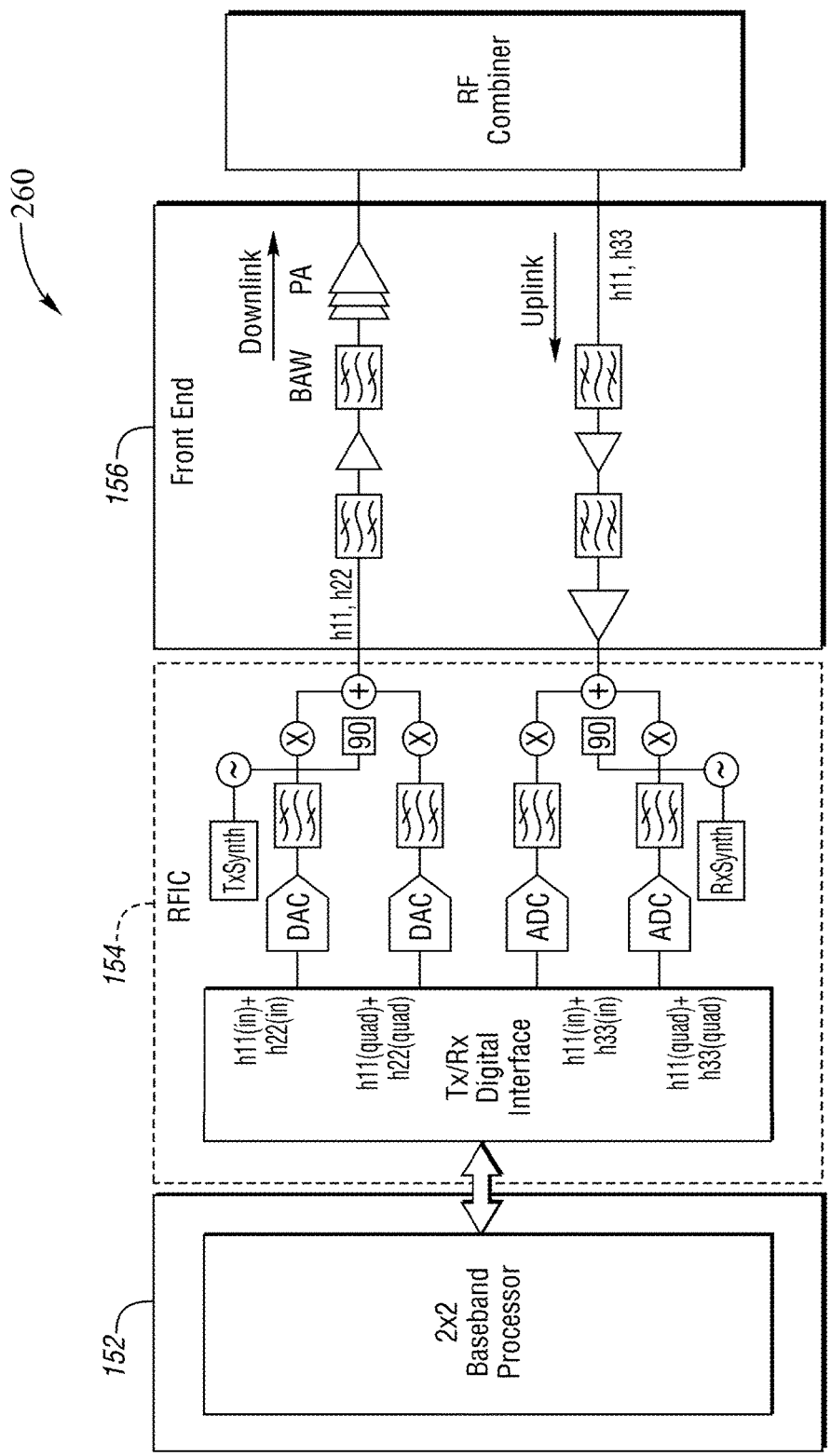
FIG. 9 illustrates a signal processor as configured to facilitate signaling in accordance with one non-limiting aspect of the present invention.

FIG. 9 illustrates a signal processor 260 as configured to facilitate signaling in accordance with one non-limiting aspect of the present invention. The signal processor 260 may include the baseband processor unit common to the signal processors shown above (12, 150, 250) while being configured to leverage the same chip as the wireless unit but with the RFIC and the front end chips being customized for the HFC environment. In FIG. 9, wideband generation of the aggregate spectrum of all LTE MIMO data paths and aggregated carriers takes place in a single step (e.g., combining multiple signal components (h11(in)+h22(in) in the downlink and simultaneously receiving other signals in the uplink such as (h11(in)+h22(in)). This may require a much higher sampling rate DAC in order to generate a much wider spectrum that would include a larger number of channels associated to the MIMO data paths and aggregated LTE carriers. For example an LTE system that uses 4×4 MIMO in the downlink and aggregates of two 20 MHz carriers, occupies a total of 4×2×20 MHz=160 MHz assuming the 20 MHz channels are placed continuously without gaps. This spectrum can be made wider assuming that higher rank MIMO and higher carrier aggregation are implemented. In addition to the higher sampling rates DACs it is also required that at the Tx/Rx digital interface the data paths are intelligently aggregated.

This type of aggregation lends itself for further optimization making sure that all downlink transmissions are synchronized and orthogonal to each other. The orthogonality requirement enables the elimination of guardbands as described in the continuous OFDM system of U.S. patent application Ser. No. 13/841,313, the disclosure of which is hereby incorporated by reference in its entirety. A 10% improvement in efficiency can be achieved, the 160 MHz occupied signal bandwidth reduces to 144 MHz (4×2×18 MHz). What is shown in FIG. 8 is a baseband of 160 MHz (or 144 MHz when guardband elimination is applied) aggregation of channels that are upconverted to an RF frequency. An even higher sampling rate can generate full spectrum and avoid the upconversion process. These different implementation options provide flexibility based on the cost of customization of the overall system.

As shown in FIG. 5, the signal processor 12, optionally having the various RFIC and front end configurations associated with the more detailed signal processors 150, 250, 260 (baseband portions are contemplated to be essentially the same for each implementation except for the number of signal paths and related components varying depending on whether the configuration is 1×1, 2×2, 2×1, 4×4, 8×8 etc.), may be configured to facilitate MIMO related signaling by processing an input signal into multiple, frequency diverse signals (e.g., h11, h22, h33, h44) particularly suitable for transmission over an HFC infrastructure. Following transmission over the HFC infrastructure, the signals may optionally be processed for further wireless transport, such as by converting the frequency diverse, MIMO related signals to a common frequency prior to facilitating wireless transmission. Spatial diversity may be facilitated by adding delay and/or other adjustments to the frequency diverse signals, i.e., signals carried over the HFC infrastructure, and/or by directing different portions of the MIMO signals derived from the same input signal to different, spatially diverse remote antennas before wireless transport. Optionally, the frequency diverse, MIMO signals may be transmitted to different types of remote antennas units or remote antennas units having different transmission capabilities, e.g., FIG. 5 illustrates the third and station 40 having two converters and the fourth end station 42 having four converters.

The remote antenna units 40, 42, or more particularly the converters associated therewith, may be configured to convert received signaling for transport over corresponding antennas. Each antenna may be configured to transmit one of the converted, MIMO signals (h11, h22, h33, h44), effectively resulting in transmission of multiple signals, e.g., signal h11 effectively produces multiple signals g11, g12, g13, g14 due to signal h11 being received at multiple antennas included on the receiving user equipment 24. The remote antenna units 40, 42 may be configured to simultaneously emit multiple signals, such as MIMO signals associated with different feeds and/or MIMO signals intended for receipt at other usual equipment besides the illustrated user equipment 24. The remote antenna units 40, 42 may include capability sufficient to facilitate beamforming or otherwise shaping wireless signals emitted therefrom, such as to in a manner that prevents the beams from overlapping with each other or unduly interfering with other transmitted signaling. The beamforming may be implemented using multiple antenna arrays or antennas associated with each of the illustrated antennas, such as according to the processes and teachings associated with U.S. patent application Ser. No. 13/922,595, the disclosure of which is hereby incorporated by reference in its entirety.

Figure 10:
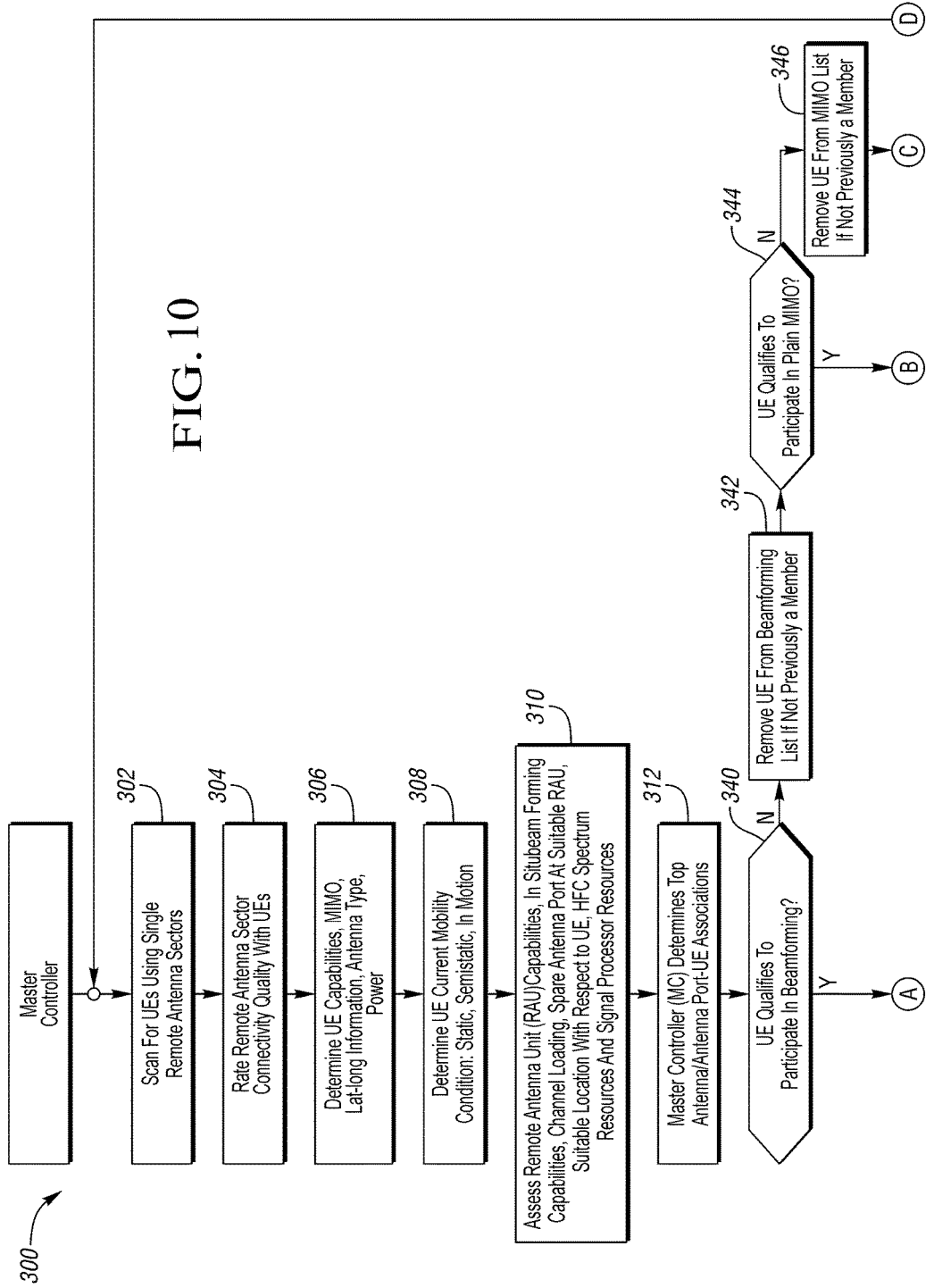
FIG. 10 illustrates a flowchart of a method for transporting signals in accordance with one non-limiting aspect of the present invention.
Figure 10:
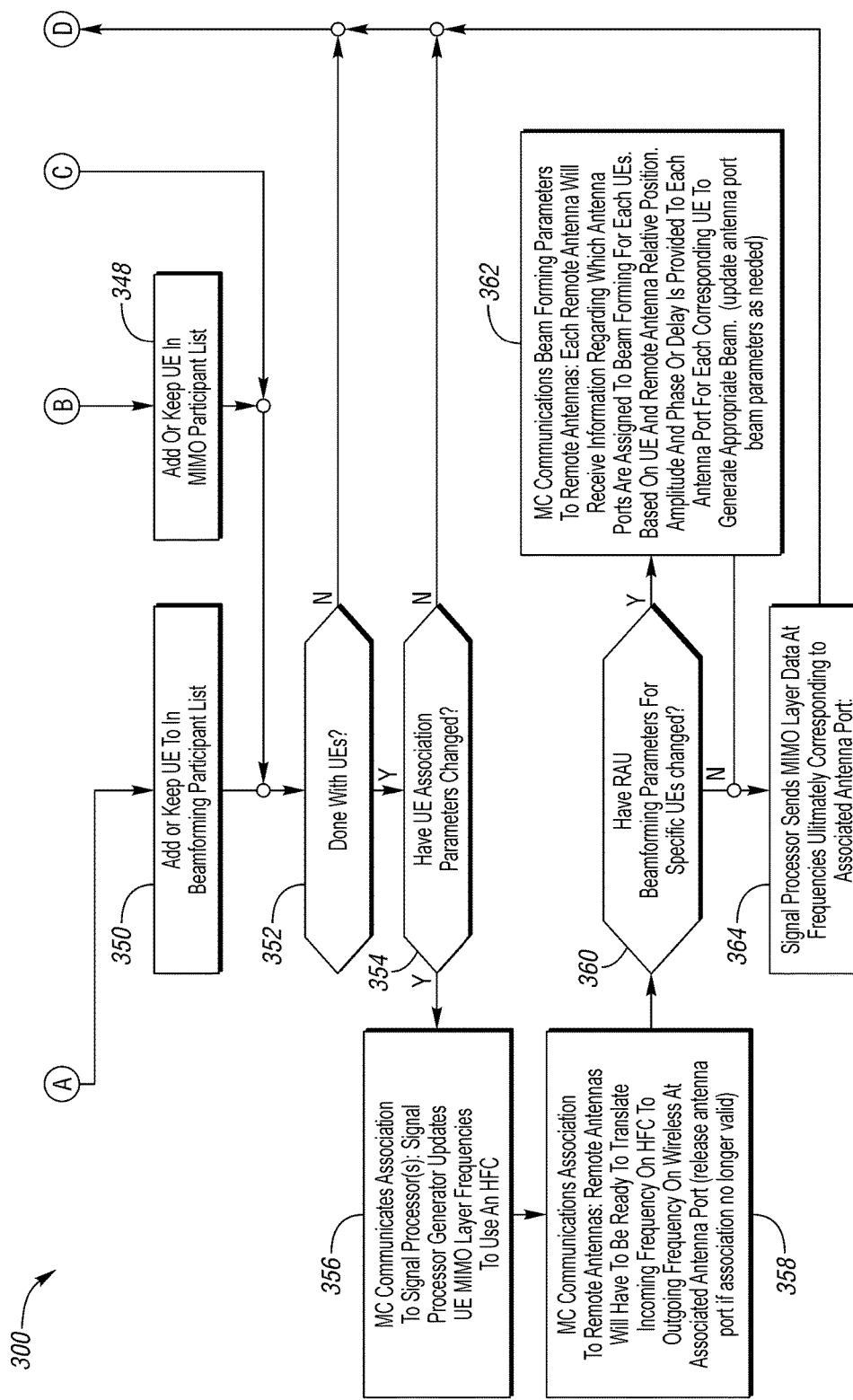

FIG. 10 illustrates a flowchart 300 of a method for transporting signals in accordance with one non-limiting aspect of the present invention. The method may be embodied in a non-transitory computer-readable medium, computer program product or other construct having computer-readable instructions, code, software, logic and the like. The instructions may be operable with an engine, processor or other logically executing device of the remote antenna unit and/or another one or more of the devices/components described herein to facilitate controlling the signaling processor and/or the other devices/components in the manner contemplated by the present invention to facilitate delivering wireless signaling (e.g., a master controller). The method is predominately described for exemplary non-limiting purpose with respect to at least a portion of the wireless signaling, or corresponding intermediary signaling, being long-hauled carried over a wired and/or wireline communication medium, such as but not necessarily limited to cable or hybrid-fiber coax (HFC) network. The long-haul or intermediary signaling may be facilitated with processing or other controls performed with the signal processor to provide wired transport over a greater distance than the eventual wireless signaling transport, thereby leverage off of the economies associated with wired transport while also facilitating interactions with wireless devices (e.g., a powerful signal processor in a centralized location with de-centralized, less powerful or less expensive remote antenna units).

Block 302 relates to scanning for user equipment (UE) using single remote antenna unit sectors. The remote antenna unit sectors may correspond with wireless areas covered by remote antenna units (and stations) having capabilities sufficient to facilitate receiving the wireline transported signal and thereafter converting the received signals to wireless signals. The scanning may be performed to identify one or more pieces of user equipment, referred to hereinafter as devices, desiring to receive wireless signals following transport over the wireline communication medium and/or to transmit wireless signals for subsequent transport over the wireline communication medium. The scanning may be performed on a per signal processor basis in order to facilitate processing an input signal intended for transport over a wireline communication medium and final/initial transport over a wireless communication medium The method is predominantly described with respect to downlink or downstream signaling where the input signal originates at a signal processor and is eventually received at one of the devices for exemplary non-limiting purposes as the present invention fully contemplates similar processing and operations being performed to facilitate uplink or upstream signals, i.e., wireless signals originating from one of the devices. The scanning may identify devices desiring signal transport and the signal processors associated with facilitating the related signaling.

Block 304 relates to rating remote antenna unit sector connectivity quality on a per device basis to identify the remote antenna units having capabilities sufficient to facilitate wireless signaling with one or more of the devices. The ratings may be organized or tabulated in order to associate each device with one or more remote antenna units having or lacking connectivity quality sufficient to facilitate wireless signaling therewith. The ratings may be based on networking signals or other wireless signals exchanged between the devices and the remote antenna units as part of a handshake operation or other operation related to gaining access to a wireless network or wireless service area associated with each remote antenna unit (the wireless service area/network of each remote antenna unit may overlap to define a larger wireless medium). The connectivity quality may be based on relative signal strength indicators (RSSI) or other factors related to signal quality, integrity, or other influences on the ability of the device to facilitate wireless signaling with one or more remote antenna units. The connectivity quality may be assessed on a pass/fail basis such that the remote antenna units having capabilities sufficient to facilitate wireless connectivity with one or more devices may be identified and those lacking sufficient connectivity may be omitted, at least until a device moves within range or otherwise improves its transmit capabilities (e.g., greater power or gain, less interference, etc.). The results may be tabulated for each device for subsequent use in identifying remote antenna unit(s) available as candidates to facilitate the contemplated wireless signaling.

Block 306 relates to determining capabilities or other characteristics for the devices desiring wireless signal exchange. The device capabilities may include assessing MIMO capabilities (e.g., whether the device has multiple antennas or an antenna array configurable to facilitate receiving multiple wireless signals), latitude and longitude (lat-long), antenna type or characteristics, power capabilities, beamforming suitability, etc. The device capability assessment may generally relate to determining controllable parameters and/or limitations of the devices in order to facilitate configuring the remote antenna unit(s) to operate in a manner commiserate with desired wireless performance (e.g., in some cases it may be desirable to assess performance relative to signal integrity and in other cases it may be desirable to assess performance relative to signal range, power, etc.). Depending on the desired performance or other operational constraints, such as but not necessary limited to wireless capacity and/or signal rates available to the devices, certain capabilities of the devices may be assessed and/or related data may be requested from the devices. The present invention fully contemplates devices having any number of capabilities and/or operating characteristics such that any one of these characteristics may be assessed and used to facilitate subsequent wireless signaling therewith.

Block 308 relates to determining a mobility state of the devices. The mobility state may be determined to characterize whether the devices is static, semi-static or in motion. The latitude and longitude associated with each device may be periodically measured to determine whether the device falls within one of the static, semi-static or in motion states. The mobility states are described with respect to being one of static, semi-static or in motion for exemplary non-limiting purposes as the present invention fully contemplates assessing the ability of the devices according to any number of other states. The noted states are described in order to demonstrate three thresholds that may be useful in assessing whether the corresponding device is likely to remain in its current position (static), remain relatively close to its current position such that wireless signaling is likely to be unaffected or unlikely to require immediate change (semi-static) or likely to keep moving or begin moving such that wireless signaling may be affected, e.g., the remote antenna units needed to maintain continuous communication with the wireless device may change due to the wireless device being mobile. The mobility states or their corresponding thresholds may be based on capabilities of the signal processor and/or remote antenna units to change operating settings and/or signal transmissions, e.g., whether signals can be re-processed quickly enough over the wired communication medium to enable multiple remote antenna units to communicate with a moving device. The mobility state may be periodically re-assessed in order to facilitate changing mobility state determinations from one state to another state.

Block 310 relates to assessing remote antenna unit capabilities for the remote antenna units having devices within wireless range and/or likely to have devices within wireless range in the near future. The assessment of the remote antenna unit capabilities may be similar to the assessment performed with respect to the devices at least insofar as assessing the capabilities of the remote antenna units to facilitate wireless signaling. Block 310 also contemplates assessing spectrum resources/capabilities for the wired communication medium (HFC) and the signal processor(s) being associated therewith. These capabilities may influence the portions of the wired communication medium that may be available to transport signals, e.g., some portions of the wired communication medium from a bandwidth or frequency perspective may already be maximized and unable to support signal transport (the remote antenna units associated therewith may be eliminated as candidates). The frequency, bandwidth and other transport related characteristics of the wired communication medium and/or the signal processor(s) may influence a number of decisions made by the master controller or other entity tasked with monitoring system operations, including those associated with selecting the one or more remote antenna units to communicate with each of the devices and the signaling parameters to be used when facilitating transmission of the attendant signaling over the wired communication medium and/or the wireless communication medium.

Block 312 relates to associating the devices identified in Block 302 as desiring wireless signaling with one or more of the remote antenna units identified to be suitable candidates in Block 310. The association may be performed at a port-level or antenna-basis such that multiple remote antenna units may be associated with the same or multiple devices and/or individual antennas/ports on the remote antenna units and/or the devices may be associated with each other. The associations may correspond with selecting one or more remote antenna units identified as candidates for further use in communicating with each of the devices and associating the corresponding antennas/ports on the selected remote antenna units with a counterpart on the corresponding device, i.e., on a one-to-one-basis. The present invention contemplates any number of methodologies for determining the contemplated associations, including those that benefit one parameter over another, e.g., spatial diversity may be preferred over longevity and/or based on other limitations such as frequency availability, HFC spectrum, etc. may influence associations. The number of available remote antenna units may vary and the relationship of the remote antenna units relative to static or moving ones of the devices may also very such that the association determinations may be relatively dynamic and/or require frequent updates and/or adjustments in order to facilitate continuous signaling and/or to enable transmissions to complete.

Figure 11:
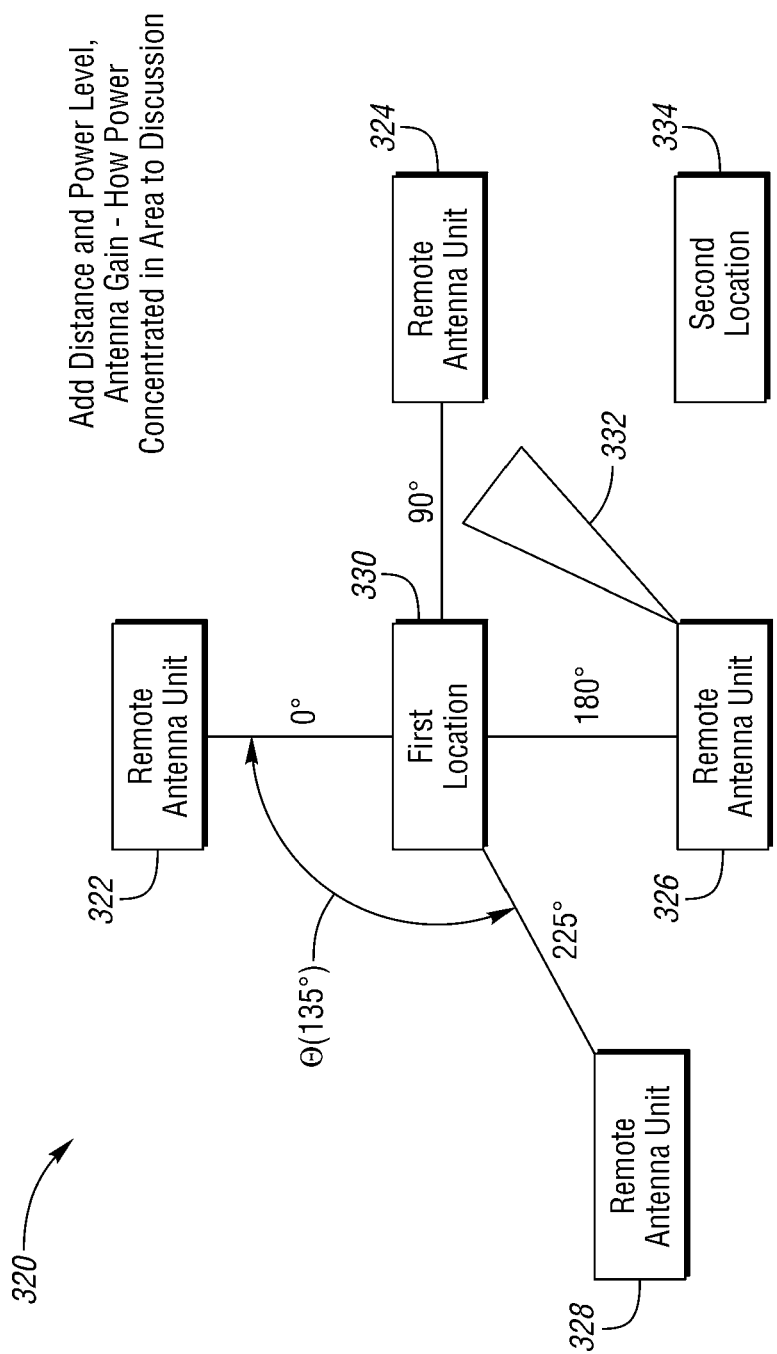
FIG. 11 illustrates a diagram showing spatial diversity as contemplated by one non-limiting aspect of the present invention.

One non-limiting aspect of the present invention contemplates facilitating the association and/or otherwise selecting the remote antenna unit(s) to be used in facilitating wireless communication with the devices based at least in part on spatial diversity. The spatial diversity may be characterized by relative spatial positioning of each remote antenna unit to each device it is selected to communicate with. When multiple remote antenna units are selected to communicate with a single device, performance may be improved by maximizing or otherwise ensuring sufficient spatial diversity of the remote antenna units relative to the single device. FIG. 11 illustrates a diagram 320 showing spatial diversity as contemplated by one non-limiting aspect of the present invention. The diagram 320 illustrates an exemplary scenario where four remote antenna units 322, 324, 326, 328 are determined to be candidates to facilitate communications with a single device located at a first location 330. The spatial diversity or spatial positioning of each remote antenna unit may be based on angular positioning relative to the first location 330. The angular positioning of the first remote antenna unit 322 is shown to correspond with 0°, the angular positioning of the second remote antenna unit 324 is shown to correspond with 90°, the angular positioning of the third remote antenna unit 326 is shown to correspond with 180° and the angular positioning of the fourth remote antenna unit 328 shown to correspond with 225°.

The master controller may assess these angular positioning values when selecting the one or more of the first, second, third and fourth remote antenna units 322, 324, 326, 328 to be used when facilitating communications with the device while at the first location 330. The master controller may then rely on the angular positioning values to assess spatial diversity with respect to the available remote antenna units 322, 324, 326, 328, and optionally based thereon, select the antennas 322, 328 to be used in facilitating wireless signaling with the first location 330. Depending on the number of remote antenna units 322, 324, 326, 328 available to facilitate the wireless signaling, any number of factors may be weighed when selecting the remote antenna units 322, 328. In the illustrated example, with four relatively evenly spaced remote antenna units being available, the selected antennas are shown for exemplary non-limiting purposes with respect to being the first and fourth remote antenna units 322, 328. The first and fourth remote antenna units 322, 328 may be selected for a number of reasons, such as based on the portion of the wired communication medium being used to deliver the corresponding signals having less bandwidth usage or less restrictions than the portion of the medium used to deliver signals to the second and/or third remote antenna units 324, 326, spectrum or bandwidth constraints on the second and/or third antennas 324, 326 limiting their use, etc. Optionally, particularly when multiple remote antenna units are available, a minimum or threshold of related angular positioning (Θ) may be used to facilitate the selection, e.g., a minimum threshold of 100° maybe used such that the remote antenna unit combinations having a similar path (small relative angle) are voided and remote antenna unit combinations at right angles are eliminated and/or the threshold may be adjusted depending on the number of available remote antenna units.

The remote antenna units 322, 328 selected to facilitate wireless signaling may also be determined based on operational considerations or capabilities of the remote antenna units 322, 324, 326, 328. The beamforming capabilities of the remote antenna units 322, 324, 326, 328 may be one type of operational consideration assessed when selecting the available remote antenna units to facilitate the wireless signaling. The beamforming capabilities may be assessed to determine whether the available remote antenna units 322, 324, 326, 328 can direct a beam 332 or otherwise focus wireless signaling towards the first location 330 to enhance performance. Optionally, the directions that the beam may be focused beyond the first location, i.e., whether the corresponding remote antenna unit 322, 324, 326, 328 is able to maintain a continuous beam or wireless signaling capabilities while the device moves from the first location 330 to a second location 334 may be considered as part of assessing the beamforming enhancements. Optionally, the beamforming considerations may be used in cooperation with the angular positioning/spatial diversity considerations such that the beamforming may be used as a tiebreaker when multiple remote antenna units 322, 324, 326, 328 are equally spaced and otherwise equally or approximately equally suitable to facilitate wireless signaling whereby the selected remote antenna units may be one or more having the better or preferred beamforming capabilities.

In addition to the beamforming and/or angular positioning based assessments, other criteria may be used to select the used remote antenna units from the available remote antenna units. Antenna port resources may be one factor considered to assess the suitable of each remote antenna unit as well as amount of traffic and concentration of wireless users to be assigned or already assigned to each remote antenna unit. If user congestion at specific remote antenna unit is greater than traffic expected from target amount of traffic then those remote antenna units may be desirable to eliminate or demote in ranking. Such traffic or congestion may be measured as amount of traffic compared to total capacity where traffic is measured or estimated as bits per second, optionally using a formula to pick four remote antenna units (desired number may vary) and then use congestion to move on to others if one of the four exceeds threshold. Other factors such as signaling power levels, the number of antenna elements, antenna arrays or ports available on each remote antenna unit, channel loading, spare antenna ports/elements and other factors may influence ability of certain remote antenna units to continue to provide desired levels of wireless signaling and/or the likelihood that certain remote antenna units are likely to experience greater, detrimental wireless signaling demand in the future.

FIG. 5 illustrates a scenario where two remote antenna units 40, 42 have been selected to facilitate enhanced 4×4 MIMO wireless communications using two ports on two spatially separated remote antenna units 40, 42. The four ports, labeled as Tx1, Tx2, Tx3, Tx4, may correspond with four ports selected from N remote antenna units based on a corresponding remote antenna unit selection metric. The remote antenna unit selection metric may be analyzed for multiple groups of N remote antenna units as selected from the available remote antenna units. The lowest valued or multiple ones of the lower valued remote antenna units determined as a function of the remote antenna unit metric may be used to determine an initial termination of N (i.e. two, four, etc.) remote antenna units. Each initial combination(s) may then be further analyzed using a MIMO matrix manipulation process described below prior to actually being instructed to facilitate the desired wireless signaling. The remote antenna unit metric may be based on the following formula:

remote antenna unit selection metric =

$$\sum_{i=1}^{N} \frac{d_i^2}{G_i P_{MAXi}} \left\{ \left| |\theta_i - \theta_{i-1}| - \frac{360}{N} \right| + \left| |\theta_{i+1} - \theta_i| - \frac{360}{N} \right| \right\}$$

where N=number of participating remote antenna units; i=remote antenna unit index, varies from 1 to N; $G_i$=the antenna gain for the $i_{th}$ remote antenna unit; $P_{MAXi}$=the maximum power that the $i_{th}$ remote antenna unit can transmit; $d_i$=the distance from the device desiring wireless signaling to the $i_{th}$ remote antenna unit; and $\theta_i$ is the angle in degrees indicating the direction from the device to the $i_{th}$ remote antenna unit (for the purpose of populating the summation, the angles may repeat in a circle around the device such that $\theta_{N+1}=\theta_1$ and $\theta_0=\theta_N$). The remote antenna unit selection matrix generates values for each combination of remote antenna units based on angular positioning as adjusted according to distance, gain and power such that a lower value represents a better candidate while also enabling lower values to be achieved even if angular positioning is not ideal, e.g., in the event a sufficient relationship exists between distance, gain and power. In this manner, some conditions may permit a device located farther away from the device to be a better candidate if the device has greater gain and power capabilities than a closer device.

Following the remote antenna unit selection matrix calculations, additional factors may be considered when determining which one or more of the remote antenna units are the best candidate for facilitating wireless communications with the device. This may include analyzing the transfer function for each remote antenna grouping having a metric sufficient to indicate their suitability to facilitate wireless communications. The transfer function of each data path $g_{i,j}$, where i is the index of each transmitting antenna and j is the index of each receiving antenna, may be used to determine the transfer function matrix and whether the degree of uncorrelation between data paths would allow effective multiplication of capacity as compared to a single-input and single-output (SISO) system. Relative to FIG. 5, the following transfer function, optionally including background noise term (No1, No2, etc.), may be used to facilitate determining whether the equation is solvable and multiplication of capacity compared to a single-input, single-output (SISO) system is feasible.

$$[Rx1, Rx2, Rx3, Rx4] = [Tx1, Tx2, Tx3, Tx4] \begin{bmatrix} g11 & g12 & g13 & g14 \\ g21 & g22 & g23 & g24 \\ g31 & g32 & g33 & g34 \\ g41 & g42 & g43 & g44 \end{bmatrix} + [No1, No2, No3, No4]$$

In case all data paths are not uncorrelated, this transfer function matrix reduces to a smaller rank matrix. The equation below shows a case where the data paths from three remote antenna units are correlated hence the rank of this matrix reduces from four to two and at most capacity would be the capacity of a SISO system multiplied by a factor of 2.

$$[Rx1, Rx2, Rx3, Rx4] = [Tx1, Tx2, Tx3, Tx4] \begin{bmatrix} h11 & h12 & h13 & h14 \\ h21 & h22 & h23 & h24 \\ h21 & h22 & h23 & h24 \\ h21 & h22 & h23 & h24 \end{bmatrix} + [No1, No2, No3, No4]$$

If the data path signal levels are not much greater than the noise levels, the limited signal-to-noise ratio (SNR) would result in lower order modulations. The signals from the four transmitter antenna ports of one four-port antenna may be given by Tx1, Tx2, Tx3 and Tx4. The signals received by a four port antenna in each of the antenna ports may be given by Rx1, Rx2, Rx3 and Rx4. The transfer function of these signals as they traverse a wireless medium may be represented by the matrix H.

$$H = \begin{bmatrix} g11 & g12 & g13 & g14 \\ g21 & g22 & g23 & g24 \\ g31 & g32 & g33 & g34 \\ g41 & g42 & g43 & g44 \end{bmatrix}$$

This transfer function may also be the MIMO matrix, which may be manipulated to verify transmission. The gij element of the matrix indicates the gain from the ith transmitter antenna port to the jth receiver antenna port. The signal that is received in the four-port antenna is given by:

$$[Rx1, Rx2, Rx3, Rx4] = [Tx1, Tx2, Tx3, Tx4] \begin{bmatrix} g11 & h12 & h13 & h14 \\ h21 & h22 & h23 & h24 \\ h31 & h32 & h33 & h34 \\ h41 & h42 & h43 & h44 \end{bmatrix} + [No1, No2, No3, No4]$$

Since it is likely that noise has been added at the receiver the No1, No2, No3 and No4 elements representing the added noise is included.

To evaluate which group/collection of different antenna ports from different remote antenna units provide the best performance, the MIMO matrix with information using the different antenna ports selected may be evaluated. This may include checking for potential groups of antenna ports that meet the angular selection criteria as explained above and then calculating the determinant of the MIMO matrix (H). If the determinant is zero, then the rank of the matrix is lower than the number of antenna ports and capacity is not optimal for the corresponding group/collection of antenna ports and another group should be selected. If the determinant is non-zero, then the rank is equal to the number of antenna ports, meaning for example that a four-antenna port transmitter and four-antenna port receiver can support 4×4 MIMO. Thereafter, a suitable MIMO configuration from the will number of antenna ports is known and a next determination can be made on the quality of that selection. The quality may be assessed as a singular value matrix from the MIMO matrix according to the resulting components of this diagonal matrix. The antenna port group with the highest summation of values (called singular values) may provide the group of antenna ports that can be chosen from a performance criteria perspective. Other criteria like antenna port availability, traffic, congestion can also play a role in selecting the group of antenna ports.

The process of associating the antennas/ports of the selected ones 322, 328 of the available remote antenna units with the corresponding antennas/ports of each serviced device, as noted above, may be based on any number of factors and/or variables. Once the corresponding associations are determined or set for a certain period of time, the master controller, signal processor or other entity may then provide instructions to the corresponding remote antenna units 322, 328 and devices to facilitate implementing the desired associations. This may include transmitting various pieces of information and data necessary to instruct the remote antenna units and devices to identify each other and to limit communications with the associated antennas/ports. In the case of beamforming, the instructions may also include beamforming instructions related to controlling or otherwise setting beamforming related parameters for the remote antenna units and devices relying on beamforming, such as by instructing the remote antenna units and devices regarding amplitude and phase or delay of wireless signaling emitted therefrom. The amplitude and phase or delay may be dynamically adjusted in order to facilitate maintaining a desired beam, e.g., to ensure the beams reach the desire devices without influencing neighboring remote antenna unit/devices, and/or to facilitate shifting or pointing the beam in different directions as the devices move.

Once the associations are made and the corresponding instructions are transmitted, the wireless signaling between the remote antenna units and the devices, as well as the corresponding long-haul transport over the wired communication medium, may commence. The master controller, signal processor or other entity associated with the single communications may periodically update the instructions and/or change associations as more devices require wireless signaling and/or as devices previously requiring wireless signaling no longer require wireless signaling in the manner contemplated by the present invention. The dynamic nature of a wireless environment may require essentially real-time adjustments in order to ensure operations taking place based on the wireless signaling continue uninterrupted, i.e., at a rate sufficient to enable a user conducting a cell phone call on one of the wireless devices to continue the cell phone call in an uninterrupted manner as the corresponding cell phone travels within the service area. The updated associations or other parameters may be made at a rate sufficient to enable the wireless signaling associated therewith to be shifting or disbursed too other ones of the remote antenna units other than the remote antenna units initially/originally tasked with establishing wireless signaling with the device. As noted below, additional processes may be implemented to facilitate assessing various operational considerations for the purposes of maintaining, creating and/or terminating wireless signaling or otherwise adjudicating capabilities of the remote antenna units and lessor devices to facilitate wireless signaling.

Block 340 relates to determining whether devices are qualified to participate in beamforming. The beamforming participation capabilities may assess whether new devices desiring wireless signaling support beamforming and/or whether existing wireless devices or devices having existing wireless signaling are able to continue with beamforming and/or to begin beamforming. Block 342 relates to determining one or more of the devices being unable to perform beamforming. The devices determined to be incapable of being forming may be removed from a list or other table used to recognize devices having beamforming capabilities, such as to eliminate the need to subsequently check the same devices for beamforming capabilities, e.g., the unique identifier of the device may be kept and cross-referenced with the lack a beamforming capability so that that device need not be checked again for beamforming related information. Block 344 relates to determining whether a device lacking beamforming capabilities is be able to participate in non-beamforming related MIMO, i.e., whether the devices able to facilitate spatially diverse wireless signal transport where multiple signal parts generated from a common signal are transported to the device at a common frequency. Block 346 relates to removing devices lacking such MIMO capabilities (devices lacking MIMO capabilities may be indicated with using a single remote antenna unit or non-MIMO signaling).

Block 348 relates to adding or keeping devices in a MIMO participation list in the event such devices are able to facilitate MIMO signaling and/or the MIMO related wireless signaling described herein. The MIMO participation list may be beneficial in identifying the devices and their related capabilities so that the operating characteristics of recorded devices need not necessarily be re-assessed when the device or other device that later attempts to establish new wireless signaling or other communications from the same location or location in proximity thereto. This capability may be particularly beneficial when wireless devices are repeatedly or frequently used in the same location or relative to the same remote antenna units in order to ameliorate the processing needed each time such devices attempt to establish new wireless signaling. Block 350 relates to updating the same table or generating a new table for the devices and/or remote antenna units having beamforming capabilities. The table may be used to keep track of various operational capabilities related to beamforming, optionally in addition to those related to non-beamforming characteristics. Block 352 relates to assessing whether any more devices require addition to the lists/tables and/or are in need of making with one or more of the available remote antenna units. Block 302 may be returned to for the purposes of adding additional devices identified as requiring wireless signaling. In the event no additional devices are detected, an assessment can be made at Block 354 as to whether the established parameters or other information associated with the establish wireless signaling requires updating.

Block 356 relates to determining a change in parameters necessitating a different association and/or adjusting parameters or settings associated with an established association. The associations may relate to those established in Block 312 between the remote antenna units and the devices and/or associations between the signal processor and the remote antenna units. The association between the remote antenna units and the devices may change for any number of reasons, such as in the event a device moves from one location to another, a device terminates signaling, antenna elements become available to support beamforming, etc. The association between the signal processor and the remote antenna units may change similarly for any number of reasons, such as in the event bandwidth becomes available over other portions of the wired communication medium, currently used portions of the wired communication medium are allocated to higher priority processes, a device moves from one portion of the service area to another portion such that signals must be carried over a different portion of the wired communication medium in order to reach an appropriate remote antenna unit, etc. The wired communication medium and the signaling transported there over may be continuously changing such that frequencies previously unavailable may become available and previously determined to be available may become unavailable due to scheduling considerations or other operational requirements. As such, the signal processor may frequently updated a MAP or other instructional set used to control signal delivery over the wired communication medium in response to such adjustments, e.g., the frequencies used over particular portions of the HFC may be periodically updated.

Block 358 relates to the master controller providing new associations and corresponding instructions, if necessary, to the remote antenna units and the communicating devices in accordance with the new associations or other changes made to the signal processor in Block 356. This may require the remote antenna units to be ready to translate incoming frequency on the HFC to outgoing frequency on the wireless mediums, and in some cases at an associated antenna port (an antenna port may be released if an association is no longer valid). The signal transport contemplated herein maybe facilitated with beamformed and/or non-beamformed wireless signaling such that the beamforming steps or processes described herein may be eliminated in the event the remote antenna units lack beamforming capabilities and/or it is otherwise desirable to eliminate the extra processing or other operational constraints and considerations associated with beamforming. Block 360 relates to determining whether the remote antenna unit supporting beamforming have experience conditions that may result in the need to change related operational settings. Block 362 may include the master controller communicating beamforming parameters to remote antenna units. The remote antenna units may receive information regarding which antenna ports are assigned to beamforming for each device. Based on the device and remote antenna unit relative positioning, amplitude and phase or delay may be provided to each antenna port to facilitate implementing the appropriate beam and/or updating antenna port beam parameters as needed.

Block 364 relates to the signal processor sending MIMO layer data at frequencies ultimately corresponding to associated antenna ports. This may include the single processor or master controller sending pilot signals or other signals independent of signal parts associated with the input signals desired for transport to the wireless devices. The ability to transmit such signals may be beneficial in enabling processing related communications to occur over established or pre-defined channels/frequencies so that new remote antenna units and/or new devices can be pre-programmed to perform hand-shake operations or to otherwise establish initial communications with the remote antenna units and/or single processors. As noted above, the method for transporting signaling contemplated by the present invention is described as including a plurality of steps, processes, considerations or other decisions. The present invention fully contemplates implementing signal processing in accordance with the foregoing without necessarily having to perform each of the specified operations and/or without performing the specified operations in the sequencer manner described above.

Optionally, the present invention contemplates integrating various rules or other processes with the foregoing determinations, including one or more of the following:

Rules for Signal Processor Selection: Select signal processor, based on traffic, signal processor congestion, spectrum availability, channel loading etc.

Rules for Antenna Selection: IF UE and remote antenna unit antennas support polarization multiplexing include option of 2 polarization multiplexed antenna ports from the same remote antenna unit. A 4×4 MIMO can be implemented using 2 remote antenna units each with 2 antenna ports with 2 polarizations Rules for Antenna Selection: Select remote antenna units: that are not congested, that are in different directions from UE that are closer to UE. IF possible evaluate selection using MIMO matrix to optimize for rank and performance.

Rules for MIMO Conditions: Is MIMO gain from single remote antenna unit close to or equal that from antenna ports in geographically distinct remote antenna units? If yes, don't do enhanced MIMO.

Rules for Remote antenna Unit: If scheduling intelligence is added at remote antenna unit, agile switching between MIMO layer assignments to remote antenna unit antenna ports can take place, else operation is semi static.

Rules for Qualification Criteria: MIMO capable, # of good associations>MIMO order, static or semi-static, enough HFC/eNodeB resources.

Rules for UE Selection: Select UE based on capacity needs, antenna types, service level, Do not select if there is indication that UE is moving at speed greater than a certain threshold (design parameter).

One non-limiting aspect of the present invention contemplates how a cable network is used to transmit and distribute signals from a central location to remote antenna units that are controlled from this central location and carry information to a targeted wireless receiver. The MIMO performance enhancements takes place by using multiple geographically separate antenna remotes. In a cable distribution network environment, these remote antenna units are equipped with radio transceivers and have the functionality described above, which preserves diversity while traversing the cable environment. In one completed mode of operation in MIMO systems, one remote antenna unit is used to carry information to a target wireless user. This implementation relies on the degree of uncorrelation in the traversed wireless environment in addition to some uncorrelation processes subjected to each independent data set at the spatial—multiplexing-block to lead to a higher degree of uncorrelation and the resulting MIMO gain. In such systems only the remote antenna unit with the best transmissions characteristics to the target wireless user is used for communication. In one embodiment of this invention, using a Cable distributed LTE system, it uses processes to generate spatially multiplexed LTE signals but over antenna remotes that are geographically separated. Because of the enhancements in data set signal uncorrelation obtained through the geographical separation of the antenna ports network distribution, the need for uncorrelating data sets at the spatial multiplexing functional block is minimized. In fact the spatial diversity enhancement obtained by this technique is expected to exceed what can be achieved by the traditionally used spatial-multiplexing-block at the base station combined with the spatial diversity from a single antenna location because of the uncorrelation obtained by geographical separation of antennas. This is particularly true in the case of smaller cell networks where spatial diversity is diminished due to the shorter distances between antenna and wireless subscriber.

In this example the distribution of independent data sets to remote antenna units have been shown with a minimum granularity of antenna port pairs. These could also be distributed into single antenna ports but are shown here in pairs to leverage the uncorrelation capabilities achieved through cross polarization or other polarization multiplexing techniques. However, depending on the receiver capabilities for receiving spatially diverse signals it could use any number of antennas, resulting in a higher order MIMO. One mechanism by which remote antenna units and physical antenna ports are selected is through a mapping of the specific channel frequencies within the cable environment to the optimum physical antenna ports distributed across the cable network. For example, operating in a conventional cellular scenario the different remote antenna units would be evaluated to determine which antenna port is the most suitable to be used for communication with the target wireless user. The best would be chosen for communication. In one aspect of this invention, the ranking based on performance of the remote antenna units would be leveraged to select not one but multiple remote antenna units based on the capability of the UE or wireless end device. If the UE has a capability of 4×4 MIMO you could use any of the following configurations examples:

1) Use four highest performing remote antenna units with one physical antenna port used from each remote antenna unit.

2) Use two highest performing remote antenna units with two physical antenna ports used from each remote antenna unit. In each remote antenna unit spatial diversity can be leveraged using polarization diversity between the two ports co-located in each remote antenna unit.

3) Use three highest performing antenna remotes with two physical antenna ports used from one antenna remote and the remaining two antenna remotes with one antenna port each being used. In the antenna remote with two antenna ports spatial diversity can be leveraged using polarization diversity between the two antenna ports used.

The assessment of which sets of antenna remotes and physical antenna ports are used, may occur in the same fashion and with the same frequency as a traditional system would use for assessing whether one antenna remote is still optimal for the single antenna remote case. In other embodiments of this disclosure additional complexity in the selection of which antenna ports should be used is considered. Traffic consideration, services provided, application level requirements, channel utilization and remote antenna unit capabilities are some of the criteria that can be added to the antenna port selection process. When multiple criteria are used, a global optimization process must take place to configure this cable distributed antenna system in a way that meets the target requirements for all end-stations. In MIMO systems where only a single remote antenna unit is used, thereby having all the physical antenna ports co-located, it forces the system to rely on good spatial diversity in the physical port to port paths to have a high performance. This performance is measured through the MIMO transfer function matrix with elements hi,j where the matrix has to maintain maximum rank as well as high values. A good multipath environment improves to some extend the MIMO transfer function performance. However even in the best of cases, the degree of uncorrelation is limited and the gain and resulting modulation orders that can be achieved are limited. The degree of uncorrelation in a shorter path case is likely lower than a longer path. The use of geographically separate physical antenna ports provides a natural optimal spatial diversity configuration with uncorrelated data paths. This invention may leverage the cable network and the use of geographically separate physical antenna port to achieve optimum MIMO performance.

One aspect of this invention describes how a distributed antenna system is used to optimize MIMO performance through in situ beamforming, leveraging target wireless receiver location information extracted locally at the antenna site. In one aspect, it is proposed to use the asymmetric antenna distribution typically found in the field between the remote antenna units and the handset antennas in the mobile devices (user equipment/UE). In one proposed embodiment of a cable distributed antenna system, it is intended to add beamforming functionality to the MIMO enhancement mechanism. Leveraging geographically separated physical antenna ports, it is proposed to enable the use of just 4 of 8 physical antenna ports in a 4×4 MIMO system using duplicate antennas for the implementation of a high performance 4×4 MIMO system. The additional 4 physical antenna ports used to implement an 4×4 MIMO without beamforming can now be used to add beamforming and further enhance the performance of the 4×4 MIMO.

In order to save cable distribution resources, it is advantageous to use the cable transport medium only to carry independent data set information. Along with the data set, information regarding the location of the target and the location of the remote antenna unit (Latitude and longitude) can be extracted at the remote antenna unit site using a special UE device which is designed to sniff and extract location information. This information is obtained locally at the remote antenna unit site, additional beam-forming processing takes place to leverage unused antenna ports to produce beam steering. Most of the gains from spatial diversity have already been achieved and the capability of the system could be limited to a 4×4 MIMO. In this fashion additional gain with beam forming/steering can be obtained. This result in a very efficient MIMO transfer function matrix as the uncorrelation through spatial diversity by transmitting from different locations is effectively combined with an increase in gain achieved through beamforming. Location information that provides with the necessary information to generate beamforming can be carried in-band or can be deduced through triangulation mechanisms from the signal strength of the different antennas in the area around the wireless device.

Figure 12:
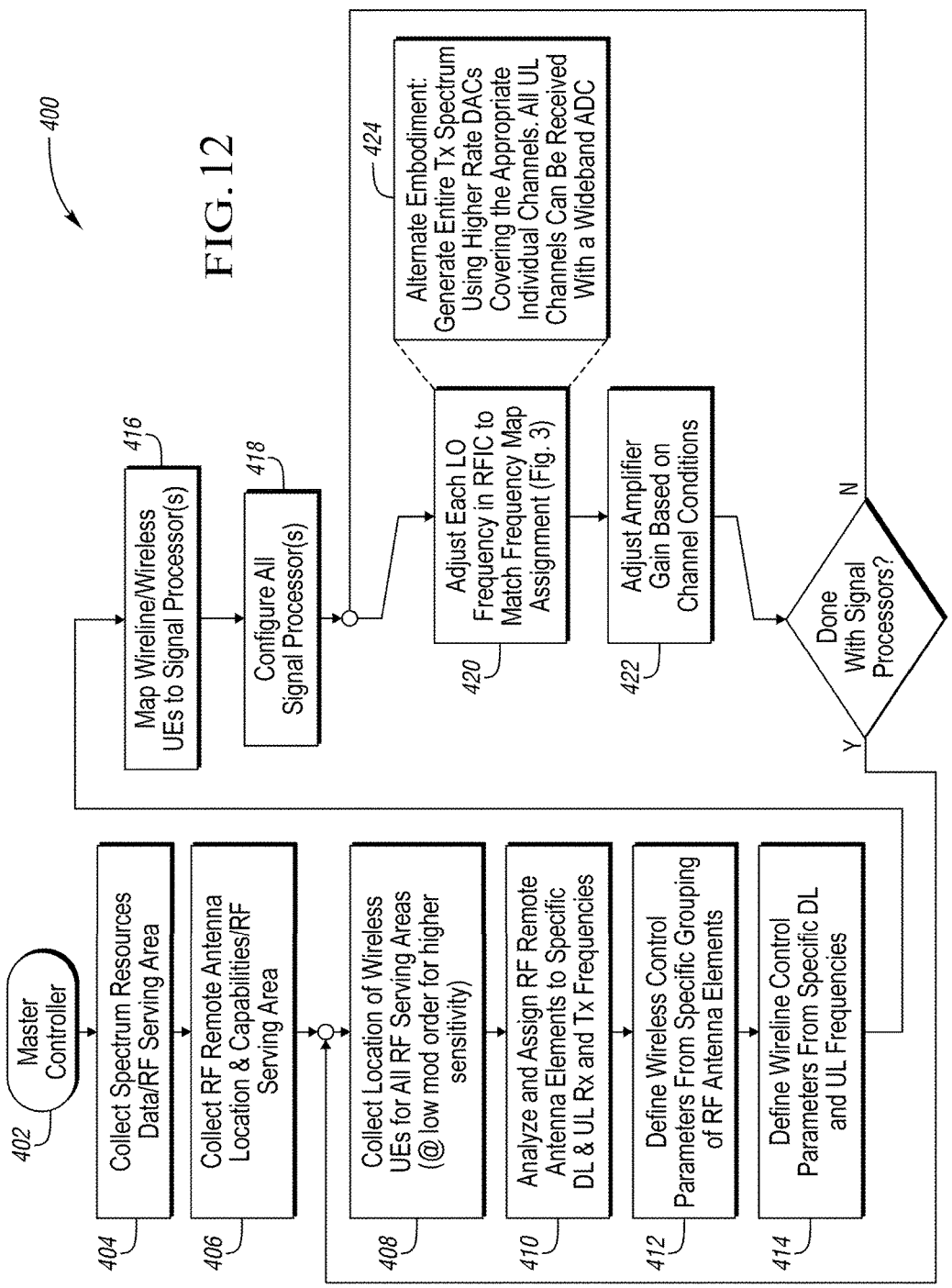
FIG. 12 illustrates a flowchart of a method for controlling a signal processor to facilitate wireless signaling in accordance with one non-limiting aspect of the present invention.

FIG. 12 illustrates a flowchart 400 of a method for controlling a signal processor to facilitate wireless signaling in accordance with one non-limiting aspect of the present invention. The method may be embodied in a non-transitory computer-readable medium, computer program product or other construct having computer-readable instructions, code, software, logic and the like. The instructions may be operable with a processor or other logically executing device of the signal processor and/or another one or more of the devices/components described herein to facilitate controlling the signaling processor and/or the other devices/components in the manner contemplated by the present invention to facilitate delivering wireless signaling. The method is predominately described for exemplary non-limiting purpose with respect to at least a portion of the wireless signaling, or corresponding intermediary signaling, being long-hauled carried over a wired and/or wireline communication medium, such as but not necessarily limited to cable or hybrid-fiber coax (hfc) network. The long-haul or intermediary signaling may be facilitated with processing or other controls performed with the signal processor sufficient to provide wired transport over a greater distance than the eventual wireless signaling transport, thereby leverage off of the economies associated with wired transport while also facilitating final interaction with wireless devices.

Block 402 relates to a master controller or other suitable entity collecting or otherwise determining resources available to a signal processor to facilitate transporting signals over wired mediums/networks to particular service areas. The master controller may also send control messages after sniffing in-band messages (in the signal) that contain desired frequency information. The resources may be considered in terms of data or RF spectrum representative of data rates, frequencies and other parameters related to transporting wired signaling from the signal processor, which may vary depending on the particular operating constraints and/or other variables associated with each portion of the wired medium. The service area may correspond with geographical areas traversed with the fiber nodes or other wired trunks within the domain of the signal processor, e.g., the area associated with each tap or reachable through a wire interconnecting the tap with one of the end stations. The geographical areas may be identified with global positioning system (GPS) markers/vectors, latitude and longitude and/or other references sufficient to represent the wired areas reachable from the signal processor. In the event multiple wired paths are available between the signal processor and an end station, a user equipment or other termination point, those overlapping or multi-path determinations may be identified along with the spectrum or other signaling parameters associated therewith.

Block 404 relates to collecting or otherwise determining resources available to the signal processor to facilitate transporting signals over the wireless mediums/networks of particular service areas. The service areas may correspond with geographical areas reachable from each end station, e.g., the wired and/or wireless reach of each end station to facilitate continued signal transport. The end stations having an antenna or other capabilities sufficient to facilitate continued wireless signaling, i.e., signaling beyond the physical location associated with a tap or device physically connected by a wire thereto, may be referred to as remote antenna units. The spectrum available to the remote antenna units may be identified in a similar manner to the wired spectrum, at least in so far as identifying beamforming capabilities, data rates, frequencies, protocols and/or other operational constraints and a corresponding geographical position of the wireless interfaces and their corresponding coverage range/reach. Optionally, overlapping signaling areas, i.e., areas reachable by multiple wired output interfaces may be identified in order to identify those areas that may be reachable by multiple wireless signals, e.g., a particularly wireless end station may be reachable with wired, intermediary signaling carried over different portions of the wired medium and wirelessly reachable from multiple, overlapping wireless antennas attached to two or more of the different portions of the wired medium.

Block 406 relates to determining end stations, user equipment and/or or wireless devices intended to receive wireless signaling from one of the end stations having wireline-to-wireless capabilities. The wireless devices may be identified as a function of signaling exchanged with one or more of the remote antenna units, such as when exchanging signals as part of a registration or authentication undertaken when attempting to access a corresponding wireless network (each remote antenna may be configured to support a wireless network and/or regulate the wireless devices enabled to receive wireless signals therefrom as a function of permissions granted during the registration/authentication). The wireless devices may be identified using Internet protocol (IP) addresses, media access control (MAC) addresses or other identifiers sufficiently unique to differentiate one wireless device from another. Wireless transmission related capabilities, operational constraints, messaging requirements and other information may be collected when identifying the wireless devices in order to assess the wireless capabilities of each device. Location and/or travel related information may be determined for the identified wireless devices using GPS coordinates, latitude and longitude, dead-reckoning, signaling strength (RSSI) and the like. Optionally, the collected information may be sufficient to identify a name, wireless capabilities/restrictions and location for each of the wireless devices within or likely to be within the corresponding service area. The wireless devices may be identified using low order modulations such as QPSK or BPSK to have a wider coverage and a larger pool of end stations with wireless and wireline capabilities associated with wireless devices which may provide a greater selection of association options between wireless and wireline devices Blocks 408, 410 relate to analyzing and assigning HFC wireline RF spectrum and wireless RF spectrum available within the service area to facilitate wired and/or wireless signaling. The present invention contemplates facilitating wired signaling, such as to the first end station, while also simultaneously supporting wireless signaling, such as to the second end station, where at least a portion of the wireless signaling is at least temporarily carried over the wired communication medium as an intermediary, wired signal. The RF spectrum assigned to facilitate this combined use of wired and wireless signaling may be dynamically selected in order to facilitate maximizing bandwidth and throughput of the system and/or according to operational constraints associated with the wireless signaling, i.e., certain portions of the system may have licensing restrictions or other requirements dictating use of particular portions of the RF spectrum. Optionally, the RF spectrum may be assigned and/or allocated differently depending on whether the corresponding signaling is traveling in a downlink (DL) away from the signal processor or an uplink (UL) direction toward the signal processor and/or on a per receiver (Rx) and transmitter (Tx) basis. For example, if more wireless devices are expected at a particular portion of the service area, more spectrum and/or other signaling resources may be allocated to that service area in comparison to other portions of the service area in order to ensure a desired quality of service.

Block 412 relates to determining control parameters for the signal processor. The signal processor may transmit signals through common RF port. The signal processor may have knowledge of which remote antenna unit end stations and which of their specific antennas are associated with the wireless UE end station it is targeting as the ultimate recipient of the signal. The signal processor can select the channel frequency on which to send the signal based on the remote antenna unit/antenna element mapping to the UE. Alternatively the signal processor doesn't have this knowledge but just transports this messages to the remote antenna units. The control parameters may be used to facilitate instructing and/or controlling the remote antennas to facilitate the contemplated wireless signaling within the constraints of the available RF spectrum. The wireless control parameters may define one-to-one groupings where a single antenna element within a remote antenna communications with a single wireless device and/or many-to-one groupings of two or more antenna elements within one or more remote antenna units communicate with individual wireless devices in order to provided enhanced spatial diversity, i.e., using spatially separate remote antennas to communicate with the same wireless device. The wireless control parameters by defining one to one grouping or one to many grouping could also be used generate beams to exclusively operate using beamforming or combining beamforming and spatial diversity for enhanced MIMO performance. The remote antennas groups may be dynamically assigned and re-assigned at certain intervals in order to provide continuous service for wireless devices moving in and out of the service area. Based on estimated traffic loading, geographical location and/or capabilities of the end station with wireline and wireless capabilities and the capabilities of a signal processor, pairing between signal processor and one or more remote antenna units may take place.

Block 414 relates to determining wired control parameters for the signal processor. The wired control parameters may be used to facilitate instructing and/or controlling the delivery of wired signals in the uplink and/or downlink directions. The control parameters may be constructed to facilitate allocating part of spectrum for the wired-only signaling and/or the intermediary signaling required to deliver the wireless signals choose the remote antennas. The wired control parameters may based on estimated traffic loading originated from the wired end stations and the wired end stations location in relation to the network topology, the capabilities of the wired end stations, number of channels and frequencies to carry traffic from these end stations are selected. The wired control parameters and the wireless control parameters may be coordinated and balanced relative to other system loads, bandwidth, etc. to facilitate allocating and dynamically adjust resources in a manner aimed at facilitating current and future signaling demands. A MAP or other network related control structures may be generated and distributed to the relevant signal processors (multiple signal processors may be used on per feed basis or per end device basis) to implement the desired controls.

Block 416 relates to generating mapping and/or other information sufficient to facilitate assigning wireless and/or wireline end stations to one or more signal processors. The signal processors may be configured to based on the frequencies and channels assigned to each device and its correspondence of such frequencies and channels according to the control parameters specified above. The mapping may assign signaling responsibilities for each end station requiring signaling to each available signal processor such that each of the feeds desired for transport are processed with at least on signal processor, and optionally one or more remote antennas in the event wireless transport is to follow wireline transport. The mapping may be dynamic at least in that a particular signal processor may support signaling for various end stations (e.g., user equipment and/or remote antennas) at intervals sufficient to facilitate essentially simultaneous communications with the multiple end stations.

Block 418 relates to configuring the signal processors based on current conditions, such as traffic, quantity of receiving end stations, capabilities, etc. These conditions may be periodically evaluated and the configuration adjusted as changes occur. Block 420 relates to the control and adjustment of the gain and/or tilt (frequency dependent gain) of the front end to obtain the desired power level to drive the optical transmitter of the HFC network. Block 422 relates to the control and the selection of the modulation order in the signal baseband processor to carry the appropriate amount of data in the channel. This may be determined based on channel conditions and the capabilities of the end station (UE) and the signal processor. In this manner, Blocks 420, 422 may included setting values or implementing other controls for the local oscillators and/or amplifiers being used to facilitate the signal processing contemplated herein. The related frequency, gain, tilt, loss, etc. may be dynamically adjusted depending on the signal feeds and/or the intended termination point (end station, user equipment, remote antenna unit, etc.) so as to achieve the noted benefits of the signal processors described above. Optionally, in the case of signal processor having capabilities to combine multiple signal components (e.g., h11+h22), an alternative Block 424 may be instigated to facilitate related controls. Block 424 performs an aggregation of signals that can be done using guardbands or alternative if the signals are frequency synchronized following a specific frequency spacing this aggregation is done without using guardbands resulting in a more efficient use of the spectrum.

Figure 13:
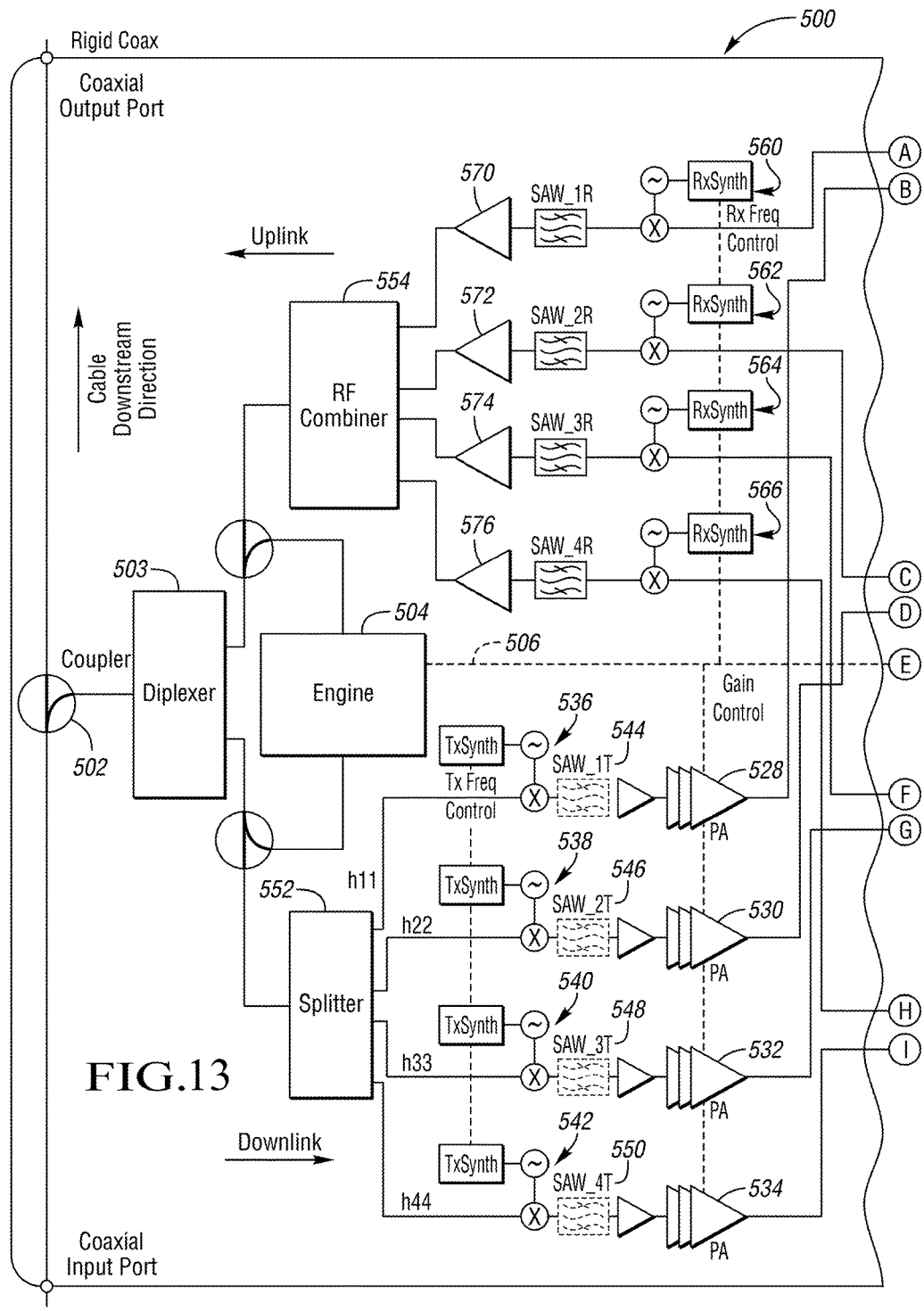
FIG. 13 illustrates a remote antenna unit accordance with one non-limiting aspect of the present invention.
Figure 13:
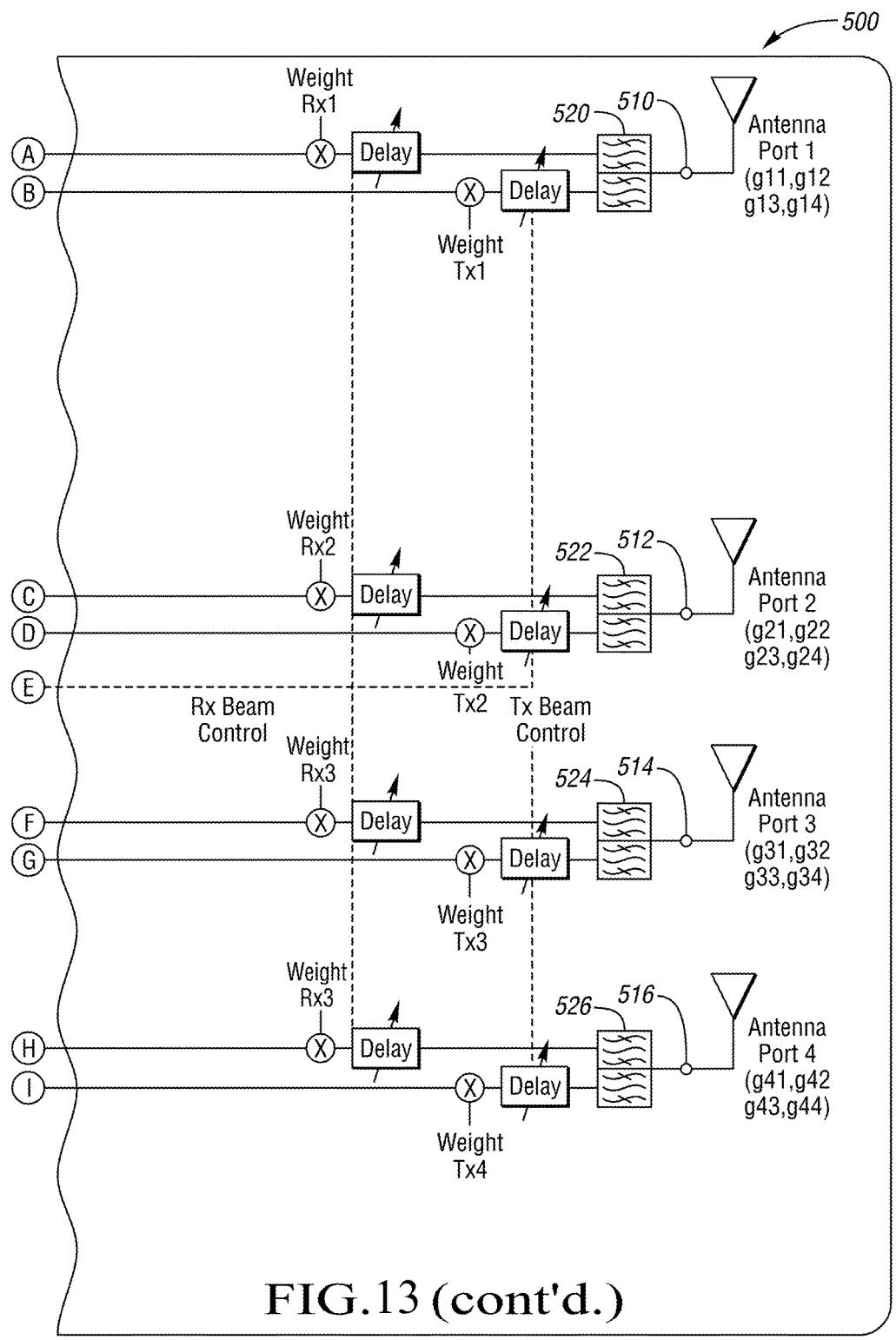

FIG. 13 illustrates a remote antenna unit 500 in accordance with one non-limiting aspect of the present invention. The remote antenna unit 500 may correspond with one of the end stations having capabilities sufficient to facilitate continued wireless signaling with another end station, user equipment (UE) or wireless device, e.g., the third end station 40 and the fourth end station 42. The remote antenna unit 500 may be configured to provide a transition between wireline/cable medium related signaling and wireless medium related signaling using an antenna equipped intelligent transceiver system. The remote antenna unit 500 may be configured to enable the provisioning of converged wireline and wireless services as well as traditional wireless services. This remote antenna unit 500, at least when compared to a remote radio head, may have a low complexity and enable the extension of the wireless distribution network reach in a similar fashion to a radio access network (RAN). The remote antenna unit 500 may include a coupler 502 configured to receive the intermediary wired signaling (i.e., signaling intended to be subsequently converted to wireless signaling) using a connection to the wired communication medium 34. A diplexer 503 may be configured to facilitate signal selection and guidance based on frequency, such as to differentiate uplink and downlink signal.

The coupler 502 may be used to enable transporting a portion of the intermediary signals to other components within the remote antenna unit 500. These intermediary signals may be processed further in the remote antenna unit 50 by frequency shifting, and by adjusting the amplitude, delay or phase of the signal prior to wirelessly transmitting these signal out of the antenna ports. This represents minor RF processing compared to the processing that takes places in traditional remote antenna units where the digitized RF signal is transported using baseband optics (i.e. via the high bandwidth of a common public radio interface (CPRI)). While the use of digitized intermediate RF signaling is contemplated, the use of RF signaling may be beneficial in enabling or maintaining use of existing pro-RF features and devices, such as but not necessarily limited to those employed in HFC/cable networks. The remote antenna unit 500 may include an intelligent device 504, which for exemplary non-limiting purposes is labeled as an engine, capable of detecting the uplink and downlink paths and the corresponding signaling, optionally in the manner that a cable UE would. The engine 504 may be configured to sniff location and other pertinent information to calculate antenna illumination parameters or other included instruction sufficient to facilitate controlling the remote antenna unit 500 to transmit the wireless signaling. Optionally, additional beamforming control information such as beamwidth, desired beam and null direction information or power level may be determined to achieve intended performance for the transmitted wireless signaling. A control link (bus) 506 from the engine 506 to various controllable elements of the remote antenna unit 500 may be used to facilitate communication instructions or otherwise controlling operations associated therewith.

At least some of the controllable aspects of the remote antenna unit 500 are labeled as transmit (Tx) frequency (freq) control, gain control, Rx beam control, Tx beam control and Rx freq control. Each of these controllable features may be controlled with the engine 504 as a function information recovered from the intermediary signaling (signaling over the wireline medium 34) and/or transmitted thereto from the signal processor 12 and/or master controller 20. The engine 504 may operate in this manner to facilitate implementing the various signal manipulations contemplated by the present invention to facilitate interfacing between the wireless medium 110 and the wired medium 34. The engine 504 may dynamically vary the related controls according to a current network MAP or other operational constraints, optionally in a manner sufficient to achieve essentially real-time adjustments necessary to facilitate interface multiple feeds and/or signaling through a plurality of antenna ports 510, 512, 514, 516. The MAP information may correspond with that described in U.S. patent application Ser. No. 12/954,079, entitled Method and System Operable to Facilitate Signal Transport Over a Network, the disclosure of which is hereby Incorporated by reference in its entirety. Four antenna ports 510, 512, 514, 516 may be associated with a single antenna element (the number of antenna elements and antenna ports for a particular antenna may vary) to facilitate 4×4 MIMO communications for exemplary, non-limiting purpose as more or less antenna ports 510, 512, 514, 516 may be utilized without deviating from the scope and contemplation of the present invention.

One non-limiting aspect of the present invention contemplates a scenario where the remote antenna unit 500 is located in a coaxial segment extending directly from an optical node (e.g., without actives or taps in between), and thereby, enabling frequencies used for upstream and downstream in the wired network above 1 GHz frequency range. The frequency range from 1 GHz to 3 GHz may used with the benefit of avoiding consumption of the spectrum resources that may be allocated to cable services and other applications required to operate below 1 GHz. Optionally, the use of signaling within the 1-3 GHz range may be enabled across the network if the existing active devices, i.e. amplifiers are by-passed by amplifiers and filters that enable the transmission channels that the system is using above 1 GHz. The coupler 502 attachment to a rigid coaxial section of the HFC network 34 may be beneficial in minimizing attenuation to the closest active node, which may be a nearby optical node, and thereby facilitating use of the 1-3+GHz range. If a relatively low number of remote antenna units 500 are operating in the 1-3 GHz are needed, special high gain amplifiers can be used and located in a coaxial segment directly connected to the optical node without unduly increasing system costs.

The remote antenna unit 500 may consist of amplified, filtered and/or frequency shifted downlink and uplink data paths. Duplexers 520, 522, 524, 526 may be used close to the antenna ports 510, 512, 514, 516 to connect both (UL & DL) direction paths to the same antenna element (separate antenna ports are shown as being part of the same antenna element). Beamforming components (labeled as weighted Rxn and Txn which modify the signal using RF mixers and corresponding signal delay controls) may be used at the antenna ports 510, 512, 514, 516 to facilitate implementing the contemplated adjustable delay components for beam steering and weighting factor multiplier control elements for shaping beam and nulls. The weights or multiplication factors and the delays may be used to shape the radiation pattern so that most of the energy (main beam) concentrates towards the intended target and minimum radiation energy or nulls are directed towards the interference sources. The delays may be individually adjusted on the signals traversing each antenna element such that the wireless signals add constructively (in-phase) when they reach the intended target. The weighting or multiplication factors contribute to the shaping of the beam and minimization of the energy in unwanted directions. The remote antenna unit 500 may be frequency agile such that the wireless operating frequency can be adjusted to the corresponding licensed spectrum, i.e., the spectrum authorized for use at or from the each of the remote antenna units 500 (some antennas may leverage licenses for different spectrum uses and/or the spectrum usage may correspond with that configured to the wireless devices receiving the transmitted wireless signaling—shown to be emitted as h11, h22, h33, h44 and effectively received as g11, g12, h13, g14, etc.). A gain control mechanism, optionally including a plurality of fixed or controllable amplifiers 528, 530, 532, 534, may be included to help in dense operating scenarios to limit interference to other RF remote antennas, such as by increasing or decreasing signal power levels according to beamforming parameters or non-beamforming parameters (e.g., to prevent/limit interference when omnidirectional or fixed-direction antennas are used).

The gain control mechanism may be controlled as a function of commands transmitted from the engine 504 to the corresponding amplifiers 528, 530, 532, 534. The signal processing preceding the gain control may be configured in accordance with the present invention to employ a frequency converter 536, 538, 540, 542 for each path (e.g., h11, h22, h33, h44) in order to facilitate converting the frequency diverse signals carried over the wireline medium 34 to signals having frequencies sufficient for transport over the wireless medium 110. The converters 536, 538, 540, 542 are shown to each include separate, independent oscillators, transmit synthesizers and RF mixers operable to enable conversion of multiple, independently placed data paths at different frequencies. Each of the local oscillators may be frequency locked to a master oscillator (not shown) to achieve frequency locking and enable the operation without guardbands on the HFC environment. The signals transported over the wireline medium 34 may be frequency diverse, at least in that the signals may be transmitted from a corresponding one of the signaling processor converters (e.g., 80, 82, 84, 86) and thereafter converted at the remote antenna unit 500 prior to transport (such as in the manner illustrated in FIG. 4 with respect to related converters 128, 130, 132, 134). The frequency converters 536, 538, 540, 542 may be independently controlled to output the signals h11, h22, h33, h44 at the same or different frequencies. In the case when MIMO and beamforming signals are directed to the same UE or end-device the converters 536, 538, 540, 542 output the signals at the same frequency. In MIMO, because the wireline signals are coming from different wireline channels, the mixing frequencies at the converters 536, 538, 540, 542 may be needed to be different in order to place the signals at the same frequency in the wireless domain. In beamforming the same wireline signal may be used in each antenna port 510, 512, 514, 516, in this case the same mixing frequencies can be used in each of the converters 536, 538, 540, 542. If h11, h22, h33 and h44 are to be output to the same UE, the output frequencies of each may be the same (FIG. 4), and if some of the signals are to be output to different UEs, then the output frequencies may vary according to the intended recipient (FIG. 5). Independent control of frequency allows for better use of resources as one remote antenna unit could be simultaneously be serving two end-devices but through different antenna ports.

The use of independent local oscillators may enable tuning to varying frequencies of the incoming signals (h11, h22, h33, h44), e.g., each oscillator may use different mixing frequency when converting to a common output frequency. Filters/amplifiers 544, 546, 548, 550 may be included for filtering signals before subsequent processing, such as to facilitate removing noise, interferences or other signal components before the signals are subsequently amplified and/or passed for further processing, e.g., to remove noise prior to being further propagated and/or magnified. The filters 544, 546, 548, 550 and subsequent gain controllers 528, 530, 532, 534 may be optional components that may be omitted and/or controlled to pass through signals without manipulation in the event the signals output from the converters 536, 538, 540, 542 have sufficient orthogonality to enable further, non-interfering or noise susceptible transport. Optionally, the filters 544, 546, 548, 550 may be tunable to convert the frequencies of incoming signals to desired frequencies. Optionally, the filters 544, 546, 548 and 550 may be eliminated sufficient orthogonality occurs across channels (e.g., h11, h22, h33, h44) to produce an interference free operation. Instead of frequency multiplexing the signals adjacent to each other, and thereby requiring sharp roll-off filtering, the separate oscillators 536, 538, 540, 542 may be used to maintain orthogonality by placing the subcarriers of different signals exactly an integer multiple of the subcarrier spacing. This may allow the placement of the orthogonal signal carriers without guard-bands and/or the use of a filter(s).

A splitter 552 may be included to facilitate separating incoming signals prior to delivery to the appropriate one of the converters 536, 538, 540, 542. The splitter 552 may split signals to each of the converters when 4×4 MIMO is active. Splitter branches my be left unused when splitting signals to a lower number of branches. Only two of the converters 536, 538, 540, 542 are used when 2×2 MIMO is active. A different number of active branches may be used to split signals to any one or more of the converters 536, 538, 540, 542 depending on other desired operating parameters. The splitter 552 is shown to be separate from an RF combiner 554 included in the uplink path to combine and modulate signals for transport over the wired medium 34. The combiner 554 may operate as a function of signals received from the engine 504 to enable one or more signals to be combined for upstream transport. The upstream signals may correspond with wireless signals received at the antenna ports 510, 512, 514, 516 and then subsequently processed with separate converters 560, 562, 564, 566 and filters/amplifiers 570, 572, 574, 576 of uplink filtering and/or amplification (controllable with the engine 540 according to demands/configuration of the wired medium 34). The uplink converters 560, 562, 564, 566 may be configured similarly to the downlink converters 536, 538, 540, 542 with respect to including independently controllable synthesizers, oscillators and RF mixer. The engine 504 may control the converters 536, 538, 540, 542 to facilitate adding frequency diversity to the upstream traveling signals prior to transport over the wired medium 34. The engine 504 may essentially perform operations on the uplink that are the inverse of those performed on the downlink, including implementing related beamforming processing.

While four antenna ports 510, 512, 514, 516 are illustrated, the remote antenna unit 500 can be extended to a include more or less antenna ports 510, 512, 514, 516. The number of corresponding antennas elements may be selected to provide enough elements and the proper path control mechanisms to enable the use or one or more antenna elements exclusively for MIMO, exclusively for beamforming and/or a combination of both. The engine 504 may serve as an intelligent communication device that in addition to generating the beamforming parameters adjustable on a per Tx or Rx burst basis, can provide state information of the remote antenna unit 500, including enabling the antenna element delay and amplitude weighting components associated with steering beams and nulls as commanded. Optionally, these control messages can be carried out in-band in the wireless protocol from a central location, thereby avoiding a need to modify the existing wireless protocol. The remote antenna unit 500 may also include modulation conversion capabilities, such as when the wireline channel will support significantly higher order modulation than the wireless channel. This capability may be advantageous in facilitating decode/demodulate of the incoming wireless signal on the uplink and re-encode/re-modulate to a higher order modulation to save spectrum for downlink communications over the wired medium 34. The added complexity to the remote antenna unit 500 associated therewith may be offset by savings for plant (wired medium) spectrum. In a similar manner, spectral de-compression via higher order modulation could be used in the downlink when the wireline signal is lower bandwidth with high order modulation as it transits to the remote antenna unit 500. The remote antenna unit 500 may make the corresponding conversion to a wider bandwidth signal and/or with lower order modulation more suitable for the wireless medium before being transmitted wirelessly.

Figure 14:
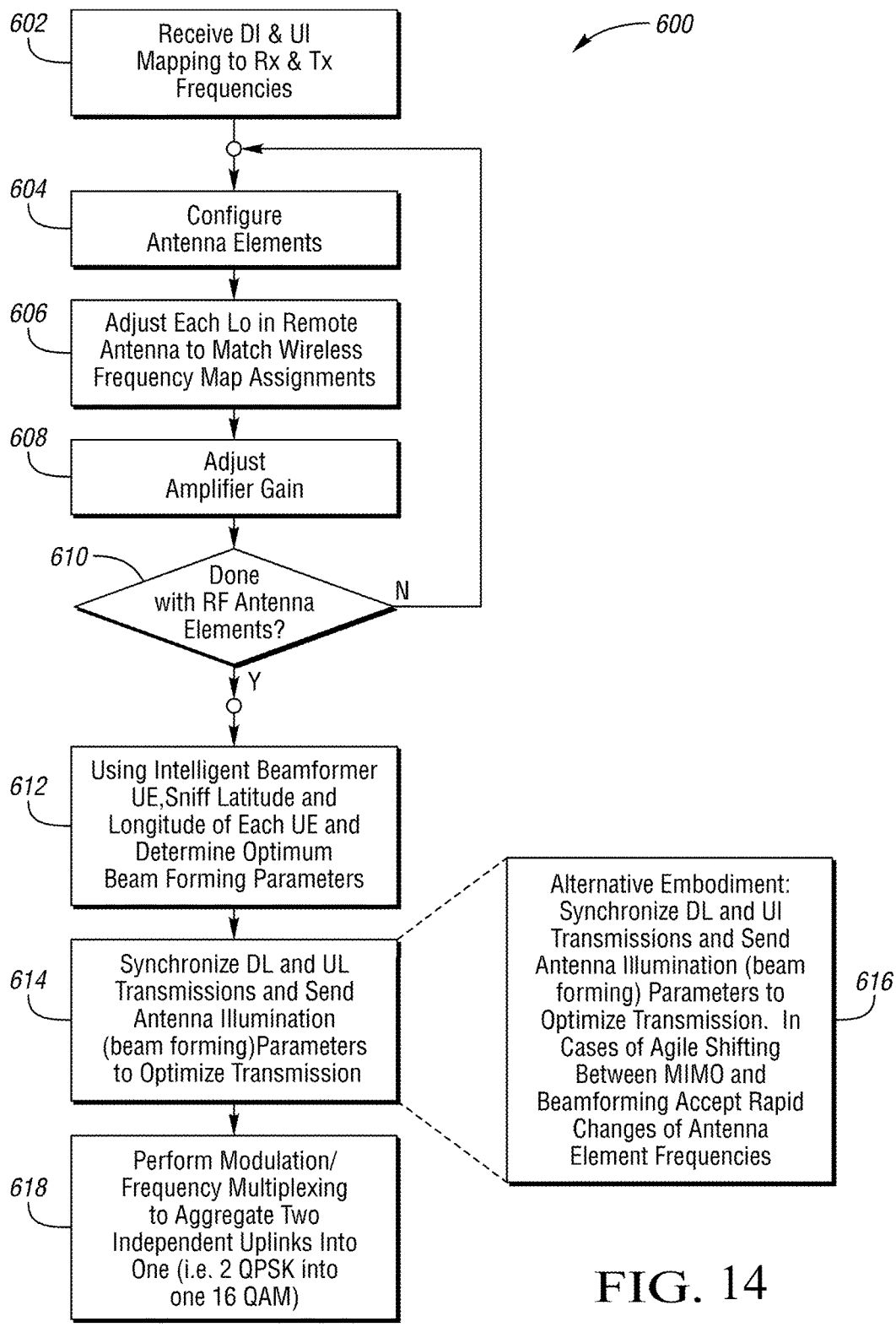
FIG. 14 illustrates a flowchart of a method for controlling a remote antenna unit to facilitate wireless signaling in accordance with one non-limiting aspect of the present invention.

FIG. 14 illustrates a flowchart 600 for a method of controlling a remote antenna unit to facilitate wireless signaling in accordance with one non-limiting aspect of the present invention. The method may be embodied in a non-transitory computer-readable medium, computer program product or other construct having computer-readable instructions, code, software, logic and the like. The instructions may be operable with an engine, processor or other logically executing device of the remote antenna and/or another one or more of the devices/components described herein to facilitate controlling the signaling processor and/or the other devices/components in the manner contemplated by the present invention to facilitate delivering wireless signaling (e.g., a master controller). The method is predominately described for exemplary non-limiting purpose with respect to at least a portion of the wireless signaling, or corresponding intermediary signaling, being long-hauled carried over a wired and/or wireline communication medium, such as but not necessarily limited to cable or hybrid-fiber coax (HFC) network. The long-haul or intermediary signaling may be facilitated with processing or other controls performed with the signal processor to provide wired transport over a greater distance than the eventual wireless signaling transport, thereby leverage off of the economies associated with centralized wired distribution system while also facilitating final interaction with wireless devices.

Block 602 relates to the engine receiving control parameters associated with processing to be performed on the uplink and downlink traveling signals. The control parameter may be determined by recovering related instructions from control signaling being carried over the wired medium 34. The control parameters are noted to include downlink (DL) and uplink (UL) receive (Rx) and transmit (Tx) frequencies. The Rx and Tx frequencies may specify frequencies or values for each converter of the remote antenna, typically with each oscillator (local oscillator (LO)) operating at a different frequency during 4×4 MIMO operation. The frequencies may be used to set various operating parameters for the converters, including frequency related settings for each of the synthesizers, oscillators and/or RF mixers. The frequencies may be designated in a MAP or other data set carried in signaling to the remote antenna and/or otherwise provided thereto. The MAP may specify frequencies that vary over time as a function of network traffic and/or spectrum licensed to UEs, optionally on a per oscillator basis or in any other manner suitable for enabling the engine to determine frequencies appropriate for each oscillator. The ability to set and vary the frequencies of each oscillator and/or the other frequency adjusting components in this manner may be beneficial in enabling remote antennas to facilitate wireless signaling with various types of devices and/or within the confines of different spectrum constraints.

Blocks 604 and 606 relates to configuring antenna elements and oscillators of the remote antenna unit. The configuration of the antenna elements may include assessing when each antenna is to be active and their corresponding operating characteristics and capabilities, e.g., beamforming support, transmission range, number of elements available for use, etc. The engine may determine the operating capabilities of the antennas and implement the related controls according the scheduling specified within the MAP and/or otherwise associated with the signaling desired for wireless transport. The configuration of the antennas may be controlled and adjusted as the frequencies or other operational settings of the MAP change. The configuration of the oscillators may include adjusting/setting each of the oscillators to match wireless frequency MAP assignments. Block 608 relates to performing further adjustments to the remote antenna unit to facilitate the desired wireless signaling. The further adjustments may include adjusting parameters of the amplifiers and/or filters used to facilitate signal processing and transmission following frequency conversion performed with the oscillators. One such adjustment may include adjusting a gain of the amplifiers according to beamforming parameters, signaling range or other variables necessary to facilitate the desired wireless signaling.

Block 610 relates to determining whether all the components supporting modification (or illumination) corresponding to each of the antenna elements of the remote antenna unit have been configured. As multiple antennas may be configured to facilitate MIMO signaling, i.e. coordinated wireless transmission from multiple antennas of the remote antenna, each of the antennas associated therewith may need to be configured prior to instigating the related wireless signaling. Once the frequencies and/or gains are set for each antenna element and/or for each signal (e.g., h11, h22, h33, h44, etc.), Block 612 relates to assessing position, movement or other variable states of the UE intended to receive the wireless signaling and adjusting beamforming parameters or other settings associated with the wireless signaling to direct the wireless signaling towards a moving UE and/or to make other adjustments associated with achieving optimum beamforming parameters. The engine may be configured to uncover information regarding the UE from registration packets or other signaling exchanged with the UE, e.g., signaling associated with granting or assessing whether to grant the UE access to a wireless network of the remote antenna unit. Optionally, the engine may determine latitude and longitude values for the UE in order to assess its movement and/or position in order to ensure desired beamforming, i.e., that the beam is directed towards the UE. In the event the remote antenna unit lacks beamforming capabilities or is an omnidirectional device, Block 612 may relate to determining whether the UE is within wireless signaling range.

Block 614 relates to synchronizing downlink and uplink transmissions and updating antenna illumination parameters is necessary to optimize transmission. The synchronization may correspond with switching the antenna ports and/or other controllable settings of the remote antenna to transmit and/or receive wireless signaling according to scheduling information included within the MAP. In the event each antenna port is limited to facilitating one of uplink or downlink transmissions, the synchronization may correspond with coordinating use of antenna ports in order to facilitate MIMO signaling where multiple antenna ports may require synchronization in order to facilitate uplink/downlink signaling. The antenna illumination parameters may be updated as necessary to facilitate the uplink/downlink signaling, i.e., the illumination parameters may be set to facilitate downlink communication to a first UE and thereafter adjusted to facilitate uplink communication with a second, different UE. Block 616 relates to an optional process where information related to the synchronization and adjusted illumination parameters may be transmitted from the remote antenna to the master controller and/or signal processor. The transmission of such information may be beneficial in agile environments where UEs may be rapidly transitioning from one remote antenna to another such that the master controller and/or single processor may need to instruct another remote antenna to prepare and/or begin facilitate wireless signaling with such agile UEs in order to prevent a loss/disruption of service.

Block 618 relates to performing modulation/frequency multiplexing in order to aggregate received wireless signaling for uplink transmission. The multiplexing may correspond with the remote antenna preparing received wireless signaling for further wireline signaling. In the event the remote antenna is simultaneously receiving wireless signals from different UEs, Block 618 may relate to the remote antenna combining the associated signals into one uplink transmission, e.g., by combining two QPSK signals into a single 16 QAM signal. The remote antenna may include an RF combiner or other multiplexing device to facilitate multiplexing or otherwise facilitating processing associated with converting wireless related signaling for wireline transport. The remote antenna may schedule transmission of the uplink, wireline signaling according to parameters specified within the MAP. The uplink signal may be received at an associated signal processor and thereafter further processed for subsequent transport. In this manner, one non-limiting aspect of the present invention may be to leverage the capabilities of an HFC infrastructure to support long-haul, wireline transport of wireless originating signaling (signaling received at a remote antenna) and terminating signaling (signaling transmitted from a remote antenna).

Figure 15:
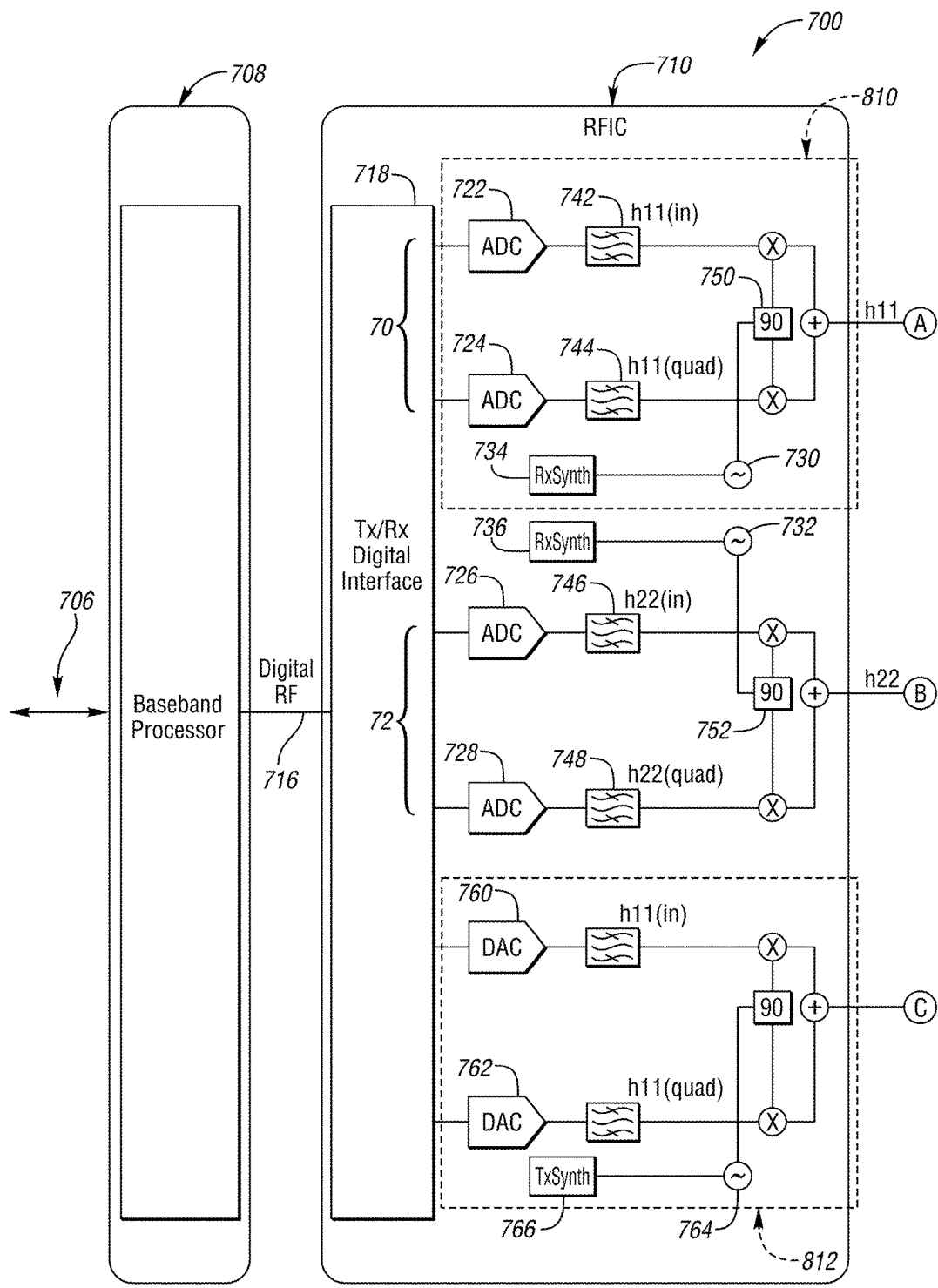
FIG. 15 illustrates a user equipment (UE) in accordance with one non-limiting aspect of the present invention.
Figure 15:
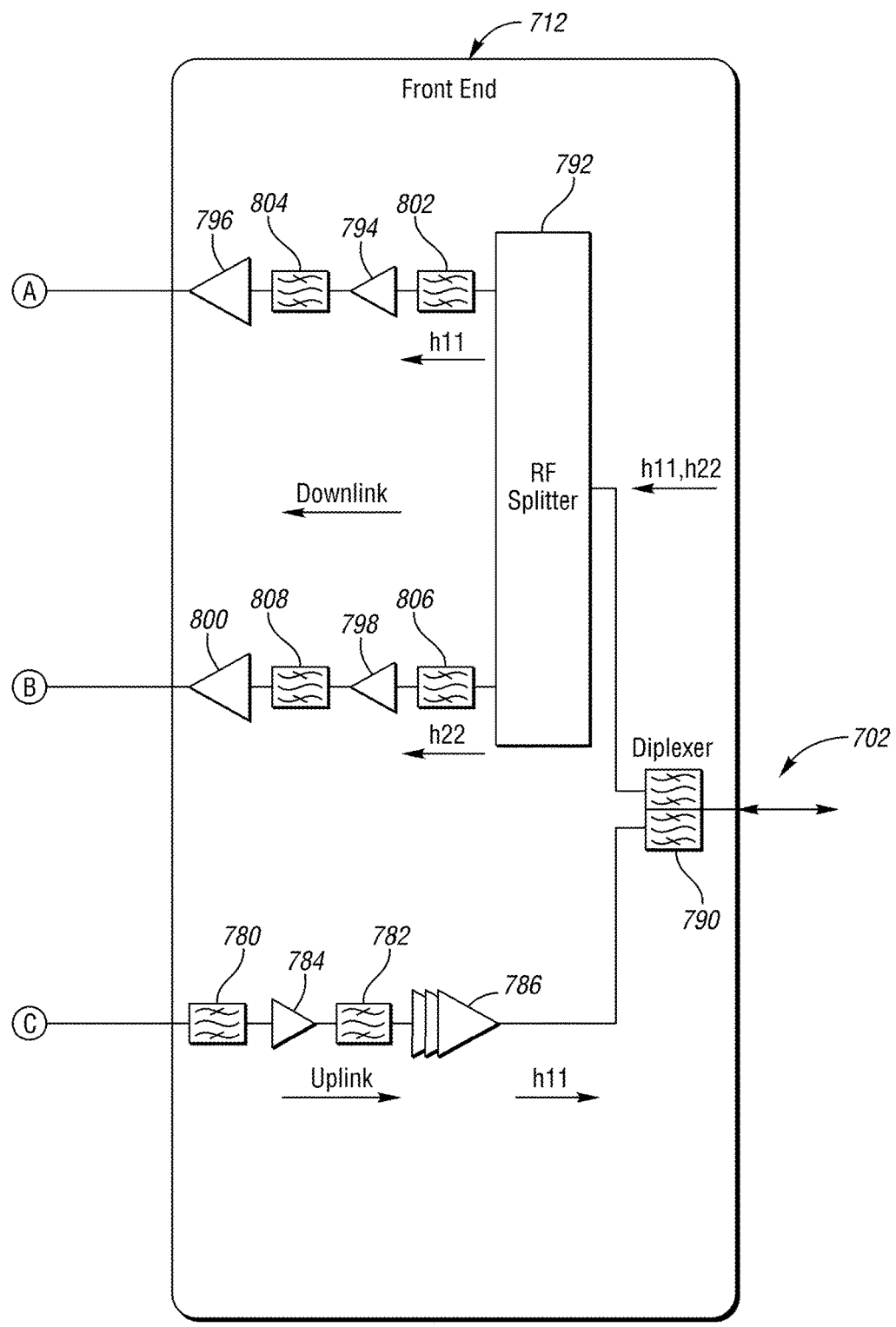

FIG. 15 illustrates a user equipment (UE) 700 in accordance with one non-limiting aspect of the present invention. The UE 700 may be considered as cable UE or other wireline UE configured to interface signals between the wired communication medium 34 and a user device, such as but not limited to the end station 22 shown in FIG. 1 (e.g., signal processor 48 in FIG. 2*b*). The UE 700 may be customer premise equipment (CPE), a modem, a settop box (STB), a television or virtually any other type of device configured to process signals transported in accordance with the present. These signals may be frequency-multiplexed signals that have been properly filtered so that they can be multiplexed on separate channels in the upstream and downstream spectrum. In the cable environment the upstream and downstream frequency ranges may be split, e.g., the upstream may from 5 MHz to 42 MHz or 65 MHz, but it may be expanded to 85 MHz or 204 MHz or greater and the downstream frequency range may be 50 MHz to 1 GHz but could be expanded from 258 MHz to 1.2 GHz or 1.8 GHz, optionally following a plant upgrade. The UE 700 may be considered as a 2×2 MIMO signal processor at least in that a network-side exchanged signal 702 in both the uplink and downlink direction is shown to comprise a first signal (h11) and a second signal (h22) generated as function of one input signal (e.g., device-side bidirectional signal 706 when traveling in the uplink direction and signal 44, 100 when traveling in the downlink direction).

The UE 700 may include a plurality of components configured to facilitate processing signals for wireline exchange with the wired communication medium 34 and/or a device associated with the device-side signal 706. The components are shown for exemplary non-limiting purposes with respect to being arranged into three basic components: a baseband processor unit 708, a radio frequency integrated circuit (RFIC) 710 and a front end 712. The baseband processor 708 unit may be similar to the above described baseband processors and include various devices (e.g., the devices 52, 62, 64, 66, 68, 70, 72, 74, 76 and/or 116) to facilitate similar processing of uplink signaling and the facilitate equivalent, inverse processing for downlink signaling. The baseband processor unit 708 may be configured to consolidate downlink signal traveling over individual data paths as a digitally modulated RF signal for output and to process uplink signaling for frequency modulation with the RFIC 710. Rather than having the baseband processor 708 in a different location than the RFIC 710 and the front end 712, one non-limiting aspect of the present invention contemplates having them co-located, optionally with a Joint Electron Device Engineering Council (JEDEC) specification (JESD207) interface 716 or an equivalent or otherwise sufficient interface as a connection piece to a transmit/ receive (Tx/Rx) digital interface 718. The JESD207 interface 158 may eliminate the need for connecting the baseband processor using a fiber optic link for carrying the digitized RF therebetween.

At least in the downlink direction, the RFIC 710 may be the component that uses the digital data paths signals and directs them through an appropriate analog-to-digital (ADC) converter 722, 724, 726, 728 to be subsequently converted to desired frequencies. The RFIC 710 may be configured in accordance with the present invention to employ independent local oscillators (LO) 730, 732 and receive synthesizers 734, 736 for each path (h11, h22). The use of separate oscillators may be beneficial in allowing for multiple independently placed data paths at different frequencies to enhance frequency orthogonality, e.g., the data path output from the OFDM signal 70 may be converted from a frequency (F1) that is different from a frequency (F2) of the data path output from the OFDM signal 72. (An oscillator common to both paths (h11, h22), at least when connected in the illustrated manner, would be unable to generated the separate frequencies F1, F2.) Filters 742, 744, 746, 748 may be included for an in-phase portion (h11(in), h22(in)) and a quadrature portion (h11(quad), h22(quad)) to filter signals before transmission to the baseband processor 708, such as to facilitate removing noise, interferences or other signal components after the in-band and quadrature portions pass through RF mixers operating in cooperation with the oscillators 730, 732. Optionally, the filters 742, 744, 746, 748 may be tunable, e.g., according to the frequency of the signaling from the OFDM signals 70, 72 as the OFDM frequency may vary. The RFIC 710 may be configured with 90 degree phase shifters 750,752 to generate signals that are in-phase and in-quadrature to maximize total capacity. The phase shifter 750,752 receive the local oscillator signal as input and generate two local oscillator signal outputs that are 90 degrees out of phase.

The front end device 712 may be configured to aggregate and drive the signals h11 the coaxial medium in the uplink direction and receive signals h11, h22 from the coaxial medium in the downlink direction. With the front end 712 connecting to the wired communication medium 34, the preset invention contemplates delivering/receiving signals from the UE 700 at relatively lower power levels than the signals would otherwise need to be delivered if being transmitted wirelessly. In particular, the contemplated cable implementation may employ amplifiers 188 (see FIG. 1) within the fiber and/or trunks to maintain the signaling power within certain levels, i.e., to amplify signaling output (h11, h22) from the RF distribution and combining network at relatively lower power levels and/or to ensure the signal power as emitted from the RF combining network remains approximately constant. The power level, for example, of a 20 MHz signal (h11, h22) output from the RF distribution and combining network to the optical transmitter may be approximately −25 dBm whereas similar wireless signaling outputted to an antenna, such as from a macro cell, may need to as high as, e.g., approximately 40 dBm. This contemplated capability of the present invention to leverage existing amplifiers and capabilities of existing HFC plants 34 may be employed to minimize the output signaling power requirements, and thereby improve design implications (i.e. lower gain) and provide lower implementation costs.

The UE 700 may be configured to process uplink signals from a device (not shown), which is shown for exemplary purposes as a signal h11, which may be different than the h11 signal transmitted on the downlink. The UE 700 is shown to support 2×2 MIMO on the downlink and 1×1, or SISO (or 1×1 MIMO), on the uplink for exemplary, non-limiting purposes as similar MIMO capabilities may be provided on the uplink. Digital-to-analog converters (DAC) 760, 762 may be used to generate the upstream RF signals and subsequently upconvert them such that the front end device 712 may be configured to aggregate and drive the signal h11 to the coaxial medium in the uplink direction. As opposed to the separate oscillators and synthesizers in the downlink, the uplink may be configured to operate in a SISO (or 1×1 MIMO) configuration may include a single oscillator and synthesizer 764, 766 to facilitate commonly converting in-band portion h11(in) and quadrature portion h11(quad) generated with the interface 718 to the frequency desired for transport of the uplink signal h11 over the wired communication medium 34. In case of an uplink configuration of 2×2 MIMO or greater MIMO order in medium 34 which requires frequency diversity, multiple local oscillators may be used. The uplink signal (h11) may be processed with amplifiers 780, 782 and filters 784, 786. The amplifiers/filters 780, 782, 784, 786 may be controllable and/or tunable in order to facilitate proper signal recovery and to adjust amplification according to characteristics of a traversed portion of the wired communication medium 34. As multiple tunings may occur over time for the downstream signaling, the upstream tunings may be similarly dynamic. State information may be kept to track and control the specific tuning parameters and/or data or other information may be include in the received signaling to facilitate the desired tuning of the third and further amplifiers/filters.

A diplexer 790 may be included to facilitate splitting uplink and downlink signaling within the UE 702 facilitate interfacing the network-side signal 702 with the wired communication medium 34. An RF splitter 792 may be configured to separate the downlink signal into two. Downlink amplifiers 794, 796, 798, 800 and/or filters 802, 804, 806, 808, may be controllable to facilitate processing the corresponding signaling at different power levels, e.g., the amplification of a first amplifier 794 may be different from a second amplifier 798 and the filters 802, 804, 806, 808 may be used to control passage of h11, h22 or other frequency selected frequency ranges. The amplification of the first and second amplifiers 794, 798, for example, may be set according to a signaling frequency and path being traversed as the signal travels from the signal processor 30 and/or remote antenna unit 40, 42. In the medium 34, the channel frequency used to carry signals h11 to the UE 700 may be more attenuated than the channel frequency carrying the signals h22, which may be compensated for with corresponding control of the amplifiers 802, 804. The ability to control the amplification on a per path basis may be beneficial in setting a slope of the corresponding signaling to account for losses, attenuation and/or other signaling characteristics of the corresponding path within the wired communication medium 34 so as to insure the signals are approximately flat when further processed by the UE 700. The amplifiers 794, 796, 798, 800 and/or filters 802, 804, 806, 808 may be controllable in order to facilitate downstream synchronization, elimination of sidelobes, unwanted adjacent channel energy and/or to compensate for signal distortions and/or other characteristics of the particular data paths to be traversed by the corresponding signaling.

The UE 700 is shown to include a plurality of components arranged into the baseband processor 708, the RFIC 710 and the front end 712. The components of the baseband processor 708 utilized for uplink signaling may be similar to those described above in FIGS. 2, 4 and 5 and those utilized for downlink signaling may be equivalent inverses to those described above in FIGS. 2, 4 and 5. These components, however, are shown for illustrative purposes as the baseband processor may include other components and arrangements of the components in order to facilitate operations contemplated herein. The RFIC 710 includes components configured to facilitate converting received and transmitted signals to desired frequencies, such as with an upconversion or downconversion. The operation of the RFIC 710 may cooperate with the upstream signal processor 30 to facilitate adjusting frequency orthogonality and performing other frequency adjustments necessary to convert the frequency divers, downlink signals 702 transmitted therefrom and to facilitate modulating baseband or other input signals received from the baseband processor 708 uplink transmission. The RFIC 710 may be considered as a frequency converting device having one or more downlink frequency conversion units 810 and one or more uplink frequency conversion units 812.

The uplink and downlink frequency conversion units 810, 812 may be generally similar insofar as each includes an oscillator, synthesizer and phase shifter operable with ADCs or DACs, filters and/or RF mixers whereby each are independently controllable. The individual controllability of the components may be beneficial in enabling converting non-frequency diverse signaling to frequency diverse signal transmissions and processing of frequency diverse signaling to non-frequency diverse signaling, such as to facilitate processing in-band and quadrature band portions of transported signaling in order to facilitate the frequency operations contemplated herein. The uplink and downlink frequency conversion units 810, 812, may be considered for exemplary purposes as modular type components at least in so far as additional units can be added essentially as modules to one or both of the uplink and downlink paths in order to facilitate additional signal processing, such as to enable 4×4 MIMO, etc. The number of uplink and downlink frequency conversion units 810, 812 included within the RFIC 710 may be based on the number of inputs and outputs of the front end 712, i.e. one downlink frequency conversion unit 810 may be required for each output of the front end to the RFIC 710 and one uplink frequency conversion unit 812 may be required for each input from the RFIC 710 to the front end 712.

The front end 712 may be configured to facilitate interfacing the network-side signaling 702 (uplink and downlink signaling) with the wired network 34 or other connected to network (interfacing to wireless networks is described below). The front end 712 may be configured with capabilities sufficient to enable separation, filtering, amplification and other adjustments to each signal part transmitted from the signal processor 30 (downlink signaling) and similar capabilities to facilitate driving signaling to the wired communication medium 34 (uplink signaling). The amplifiers, filters and/or other components may be individually controllable to facilitate desired processing of the uplink and downlink signaling, similarly to the baseband processor 708 and the RFIC 710, such as based on MAP transmission information or other data carried over the wired network and/or other instructions provided thereto in the described in U.S. patent application Ser. No. 12/954,079, entitled Method and System Operable to Facilitate Signal Transport Over a Network, the disclosure of which is hereby Incorporated by reference in its entirety. The UE 700 may be configured to sniff location and other pertinent information to calculate antenna illumination parameters or other included instruction sufficient to facilitate signal processing. The ability to individually process uplink and downlink signaling paths at the front end 712 may be beneficial in enabling signaling a standard or common front end 712 to be deployed throughout the system 10 and thereafter be individually adjusted to compensate for noise, attenuation and other signaling path characteristics of a corresponding portion of the system 10, e.g., the front end 712 at end station 22 may be controlled differently than the front end 712 at another location due to signal characteristics of the corresponding portions of the wired communication medium 34 at each location.

Figure 16:
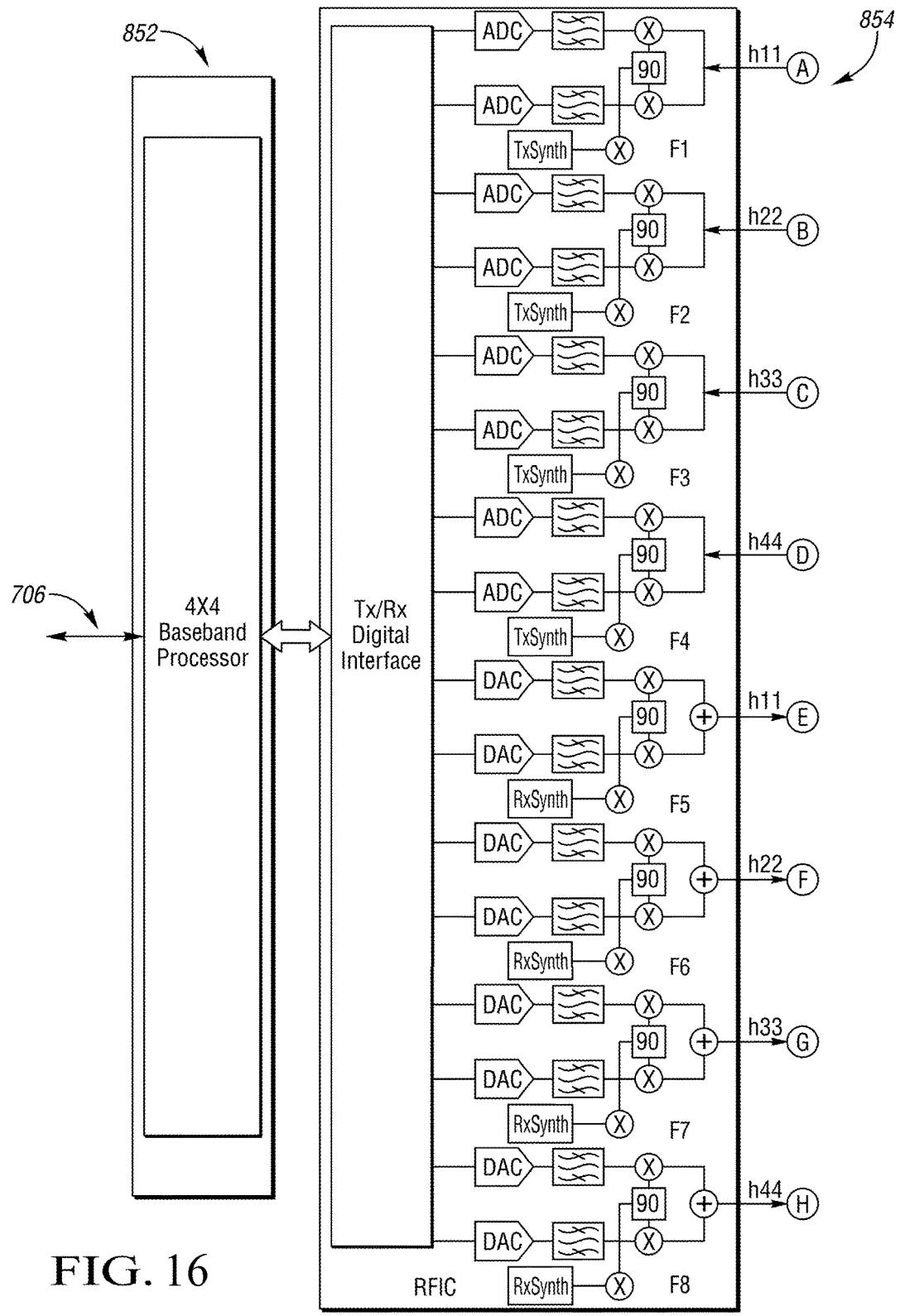
FIG. 16 illustrates a user equipment (UE) in accordance with one non-limiting aspect of the present invention.
Figure 16:
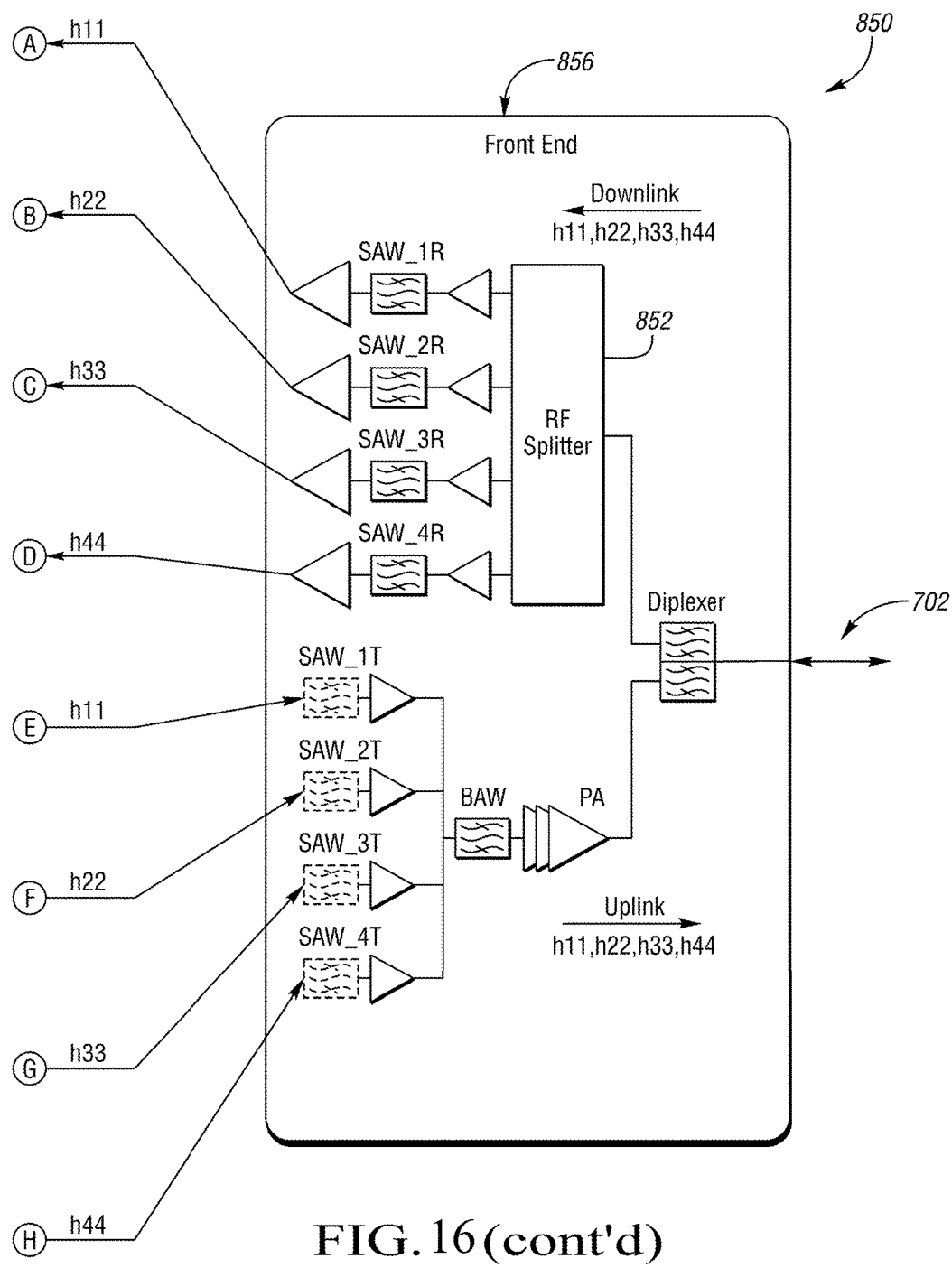

FIG. 16 illustrates a 4×4 MIMO, wireline UE 850 in accordance with one non-limiting aspect of the present invention. The UE 850 may be considered as a 4×4, MIMO signal processor at least in that singular signals input to and output from the baseband processor may be processed into a first signal (h11), a second signal (h22), a third signal (h33) and a fourth signal (h44) during uplink and downlink transport over the wire communication medium 34 (e.g., signal processor 48 in FIG. 2b). The signal processor 850 may be configured similarly to the signaling processor 150 shown in FIG. 15, particularly with respect to the use of amplifiers, filters, combiners, digital and analog converters and oscillators/synthesizers (reference numerals have been omitted however the operation of the components may be controlled in the manner described above and the associated operation may be understood according to the corresponding circuit designation known to those skilled in the art). The signal processor 850 may be similarly configured with a baseband processor 852, an RFIC 854 and a front end 856. The baseband processor may be similar to the baseband processor 708 and the RFIC 854 may be similar to the RFIC 710 with the exception of including additional uplink and downlink conversion units 810, 812 to facilitate frequency processing of additional uplink and downlink channels. The corresponding uplink and downlink conversion units are references as F1, F2, F3, F4, F5, F6, F7 and F8 where each includes independently controllable oscillators and related components operation in the manner described above.

The front end 856 may be similarly configured to the front end 712 with additional filters, amplifiers, etc. to facilitate processing of the additional uplink and downlink signaling. The front end 856 is shown to include such components to facilitate four downlink outputs to the RFIC and four uplink inputs from the RFIC 854, one for each of the uplink and downlink signals h11, h22, h33 and h44. An RF splitter 852 may be included in the downlink to facilitate separating incoming (downstream) signaling into the equivalent parts h11, h22, h33, h44. (Note that unlike FIG. 15 that shows a SISO configuration in uplink, this example shows a 4×4 MIMO in the uplink.) The RFIC 856 is shown to be configured to facilitate interfacing the network-side signaling 702 and the device-side signaling 706 described above. The UE 850 may optionally be used in place of the UE 700 within the network to facilitate the 2×2 MIMO downlink and SISO uplink signaling associate with the UE 700, i.e., the UE 850 may be a replacement for the UE 700. Of course, corresponding controls may be implemented to facilitate turning "off" unused portions of the UE 850 if used in that manner and/or the unused portions may be re-used to support additional signal processing, such as to double or otherwise facilitate simultaneously processing signaling as if it were operating as the UE 700.

Figure 17:
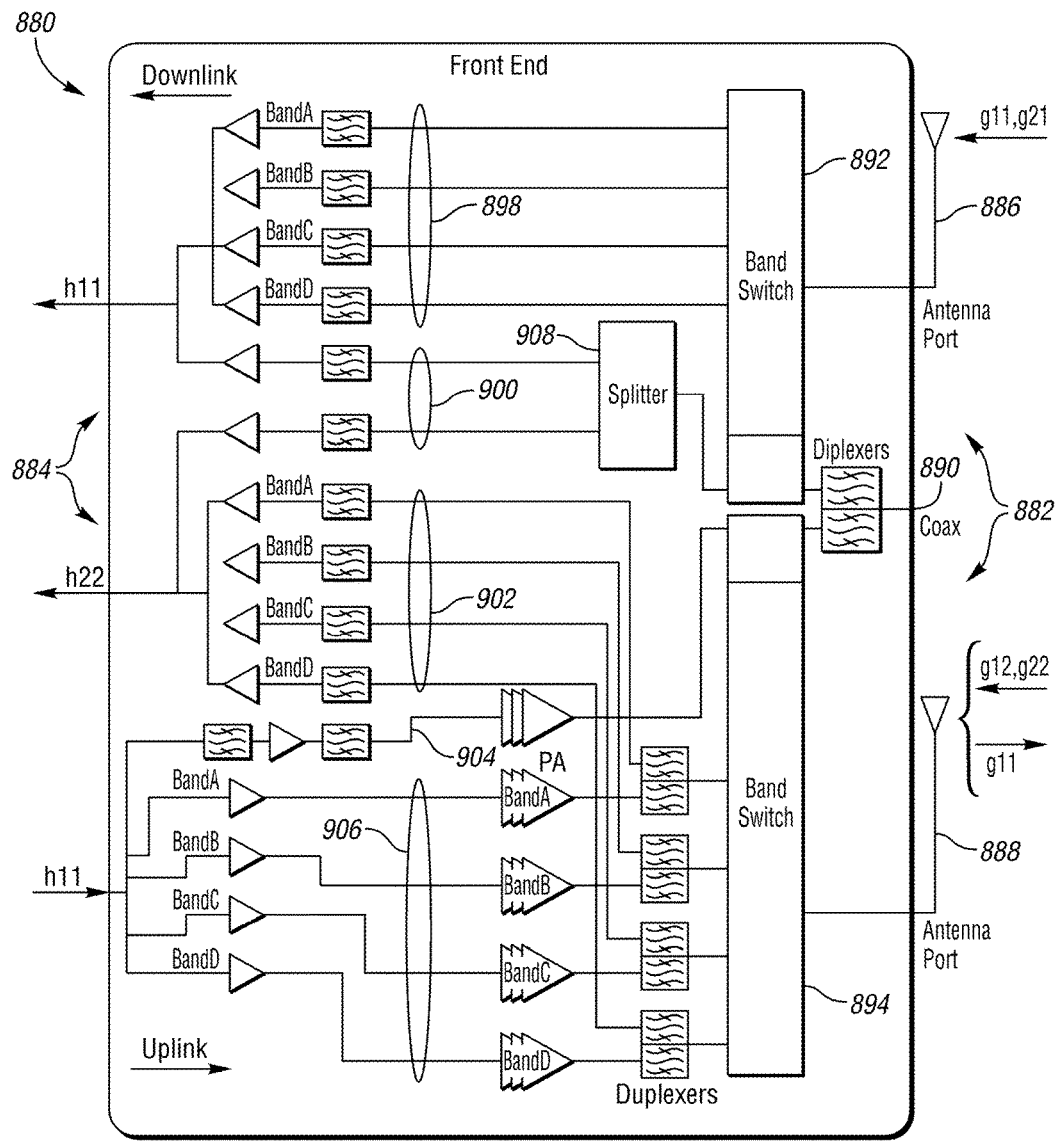
FIG. 17 illustrates a user equipment (UE) in accordance with one non-limiting aspect of the present invention.

FIG. 17 illustrates a universal front end 880 in accordance with one non-limiting aspect of the present invention. The front end 880 may be considered as universal due to an ability to process wireline and/or wireless network-side signaling 882 for interfacing with RFIC-side signaling 884. The illustrated configuration of the front end 880 is shown as configured to facilitate interfacing RFIC-side signaling 884 with the RFIC 710 illustrated in FIG. 15, i.e., two downlink outputs to the RFIC 710 and one uplink input from the RFIC 710. The front end 880 is shown to include a first antenna port 886 and a second antenna port 888 configured to facilitate exchanging network-side wireless signaling 882 and a coax or other wired interface 890 configured to exchange network-side wireline signaling 882. In this configuration, the front end 880 may be use in cooperation with the above-described baseband processors and RFICs to facilitate interfacing wireless signaling with one of the wireless end stations and wireline signaling with one of the wired end stations. The front end 880 shown to include a plurality of amplifiers and filters to facilitate adjusting gain and frequency filtering for a plurality of frequency bands A, B, C, D. The frequency bands A, B, C, D may correspond with license wireless spectrum (see FIG. 3) over which wireless signaling maybe exchanged with the front end 880.

The multiple frequency bands A, B, C, D are shown for example a non-limiting purposes to demonstrate one aspect of the front end 880 having capabilities sufficient to facilitate exchanging wireless signaling at various frequency bands. The frequency bands A, B, C, D may occupy frequencies other than those associated with the wired communication medium 34 but the frequency bands need not be different. First and second band switches 892, 894 may be included to facilitate directing signaling at particular frequencies to various signal pass within the front end 880 and/or to allow for the integration of wireless/wireline switching. As shown, a first plurality of downlink paths 898 may be used to facilitate processing and communicating downlink wireless signaling to the RFIC from the first and second antenna ports 886, 888, a second plurality of downlink paths 900 may be used to facilitate processing and communicating downlink wireline signaling to the RFIC, and uplink paths 904 may be used to facilitate processing and communicating uplink wireline signaling to the interface 890 and a plurality of uplink signaling paths 906 may be used to facilitate processing computer dictating uplink wireless signaling to the second antenna port 898. A splitter 908 may be included to facilitate separating the downlink wireline signaling, e.g., separating each part of the wireline signaling into separate signals four output to the RFIC (h11, h22). The amplifiers and filters and the band switches 892, 894 may be independently and separately controllable to facilitate directing signals to certain portions of the front end 888 according to frequency and/or a direction of travel and the corresponding amplifiers and filters may be similarly controlled to facilitate processing signaling according to the medium being traversed, such as in the manner described above.

The wireline signals being exchanged through the interface 890 may correspond with those associated with facilitating wireline signaling according to the manner described in FIG. 2. The wireless signals being exchanged through the first and second antenna ports 886, 888 may correspond with those associated with facilitating wireless signaling according to the manner described in FIGS. 4, 5 and 6. The illustrated wireless signaling corresponds with 2×2 MIMO signaling where two antenna ports transmit downlink wireless signals to the front end 880 from separate antenna ports, e.g., two ports included on one of the end stations (remote antenna units) 40, 42 or separate ports included on each of the end stations 40, 42. As described above, the wireless signaling may be transmitted such that single signal part (e.g. h11) is transmitted from a signal antenna port and effective received at both of the first and second antenna ports 886, 888 (e.g., g11 is received at the first port 886 and g12 is received at the second port). In a 2×2 downlink MIMO, h11=g11+g21 and in a 4×4 downlink MIMO, h11=g11+g21+g31+g41. Similarly, in a 2×2 downlink MIMO, h22=g12+g22 and in a 4×4 downlink MIMO, h22=g12+g22+g32+g42. The front end 880 may be configured to facilitate processing the downlink wireless signals (g11, etc.) for processing to the RFIC, including similar processing for facilitating wireless signaling having beamforming, e.g., processing of g'11, g'22, etc. The front end 880 may also facilitate uplink wireless signaling, which is shown as SISO due to only the second antenna port 888 being used for uplink wireless signaling.

Figure 18:
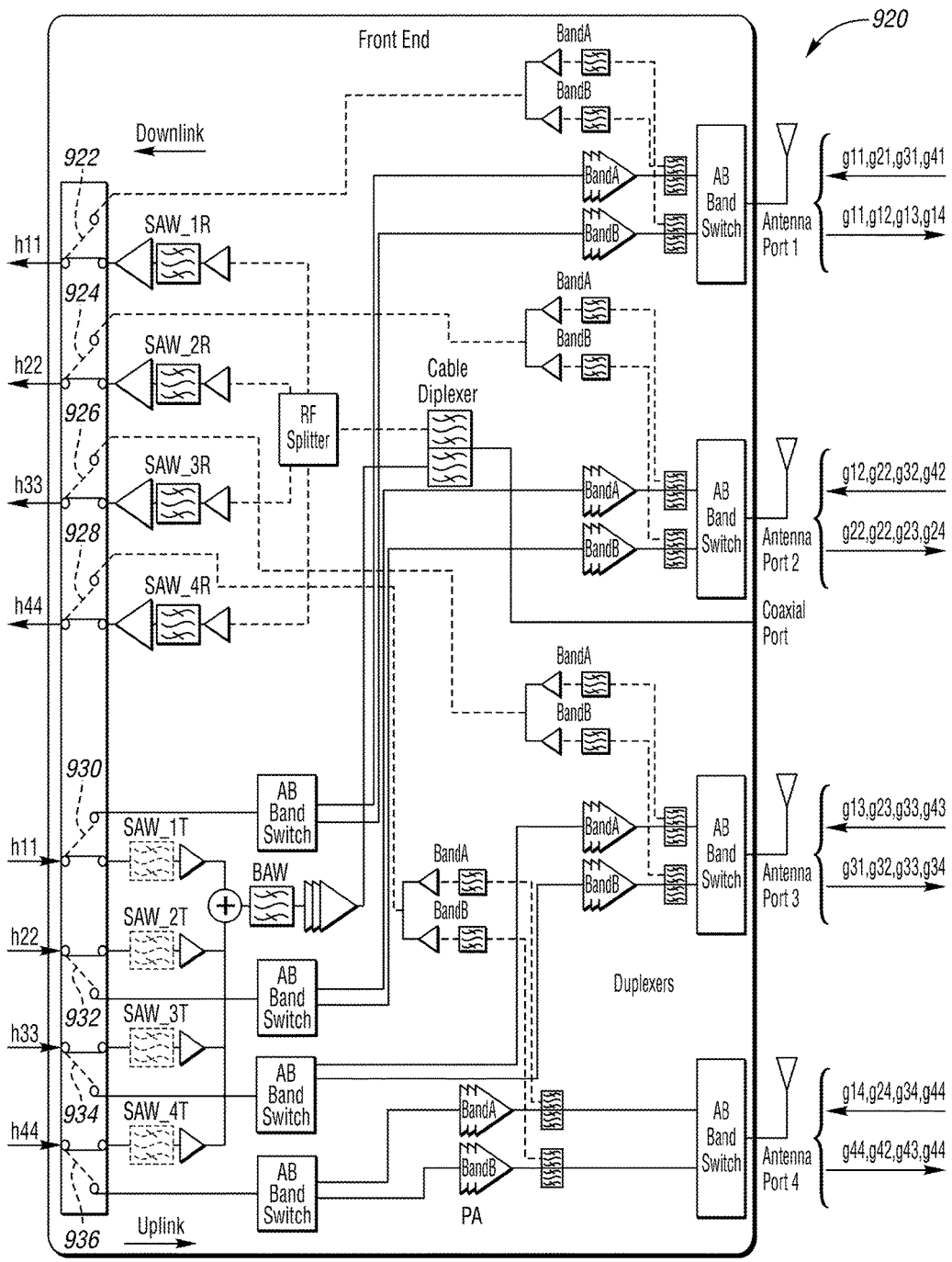
FIG. 18 illustrates a user equipment (UE) in accordance with one non-limiting aspect of the present invention.

FIG. 18 illustrates a universal, 4×4 MIMO front end 920 in accordance with one non-limiting aspect of the present invention. The front end 920 may operate similarly to the front end 880 at least in so far as supporting multiple frequency bands (A, B) for wireless signaling and any frequency band for wireline signaling using the above described band switches, amplifiers, filters, etc. The front end 920 may be configured to facilitate interfacing signaling with the RFIC 854 show in FIG. 16 due to the four uplink and downlink input and output ports associated therewith. The front end 920 is shown to be configured to facilitate dual-band wireless signal in order to facilitate use with more limited UEs, i.e., those only required or enable to support two bands. Unlike the front end 880, the front end 920 may support 4×4, wireless uplink signaling over four antenna ports (the effective wireless signaling (g11, etc.) are illustrated for the corresponding uplink and downlink wireless signaling with respective arrows). The front end 920 is shown to include a plurality of individually controllable switches 922, 924, 926, 928, 930, 932, 934, 936 to facilitate selectively directing wireless and wireline signaling between the appropriate on of the antenna ports (labeled ports 1, 2, 3, 4) and the coaxial or wired port (labeled).

Figure 19:
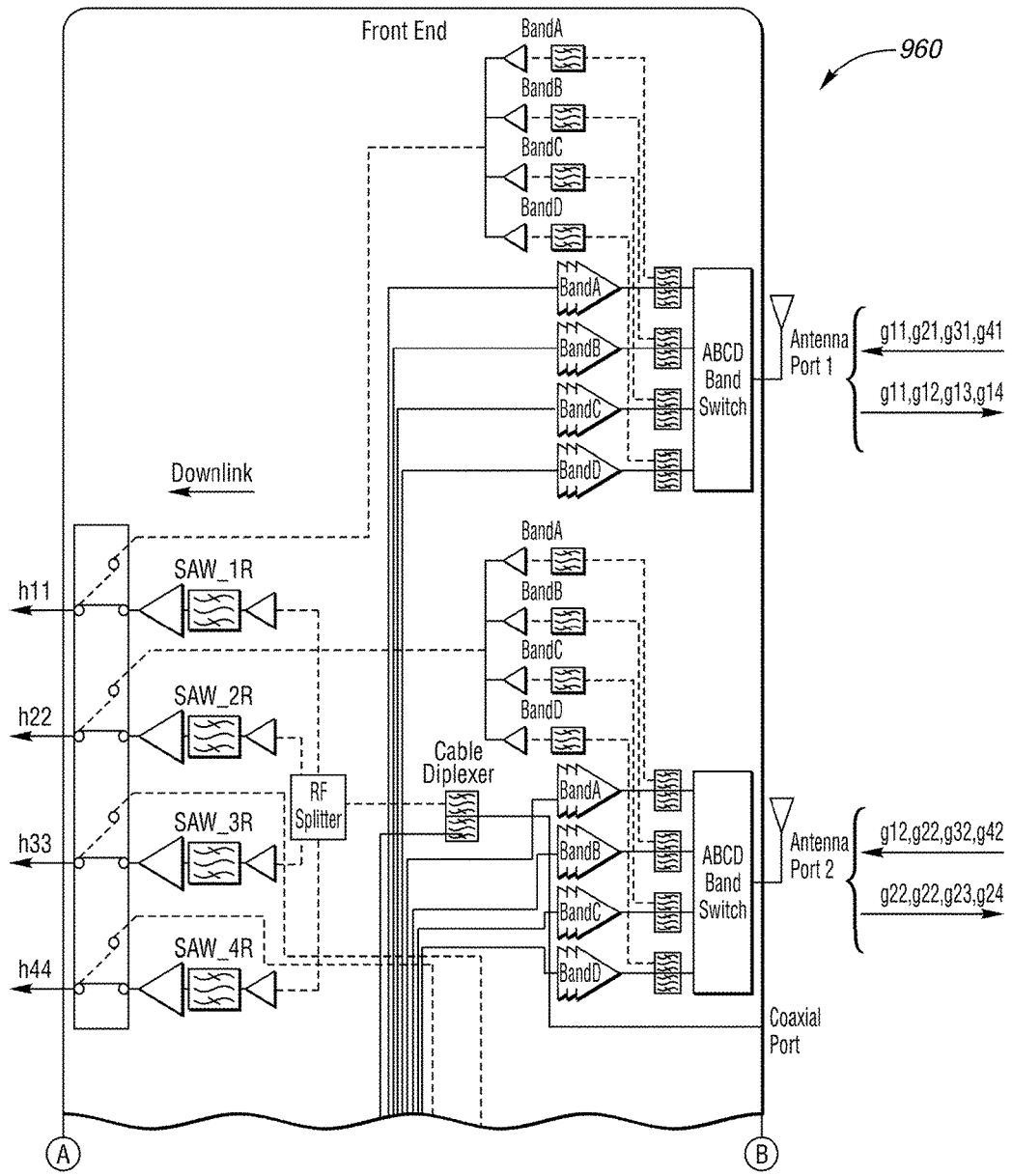
FIG. 19 illustrates a user equipment (UE) in accordance with one non-limiting aspect of the present invention.
Figure 19:
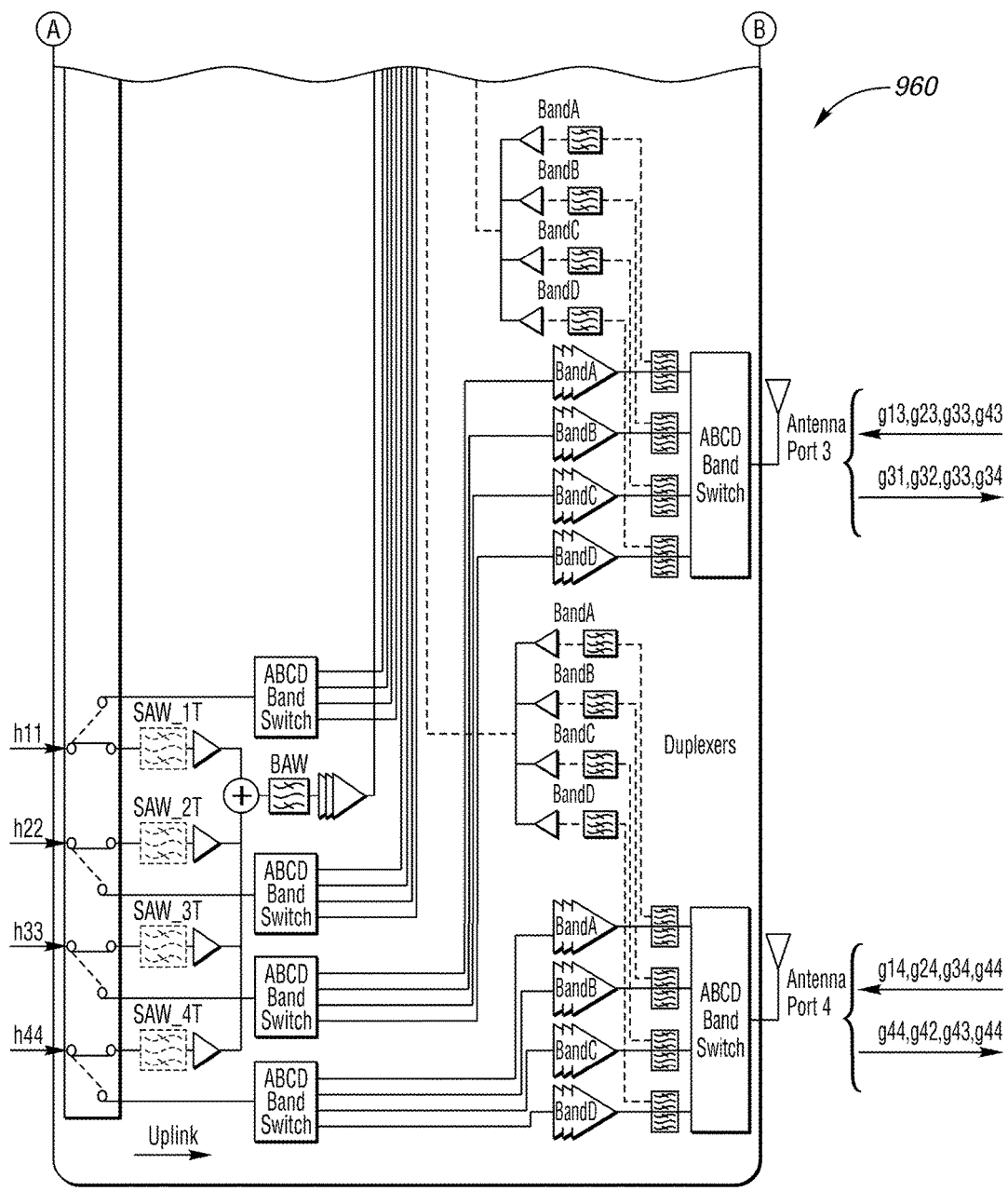

FIG. 19 illustrates a universal, 4×4 MIMO front end 960 in accordance with one non-limiting aspect of the present invention. The front end 960 is similar to the front end 920 and shown to include additional components to facilitate four-band (A, B, C, D) wireless signaling. The front end 960 may be universal and so far is including capabilities sufficient to facilitate wireline and/or wireless receipt of signal parts (h11, h22, h33, h44) transmitted directly thereto from the signal processor 30 and/or wirelessly thereto from one of the remote antenna units (the signal parts h11, h22, h33, h44 may be effective received that each of the antenna ports (signals g11, g12, etc.). As with the front end 920, the front end 960 may be operable as a wireless-only device, such as is so wireline are removed and/or the corresponding switches are driven to facilitate the connections only associated with wireless signaling paths. Optionally, the front end 920 and the front end 960 may have the wireline signaling paths and related components removed in order to be configured as a dedicated wireless front end.

Figure 20:
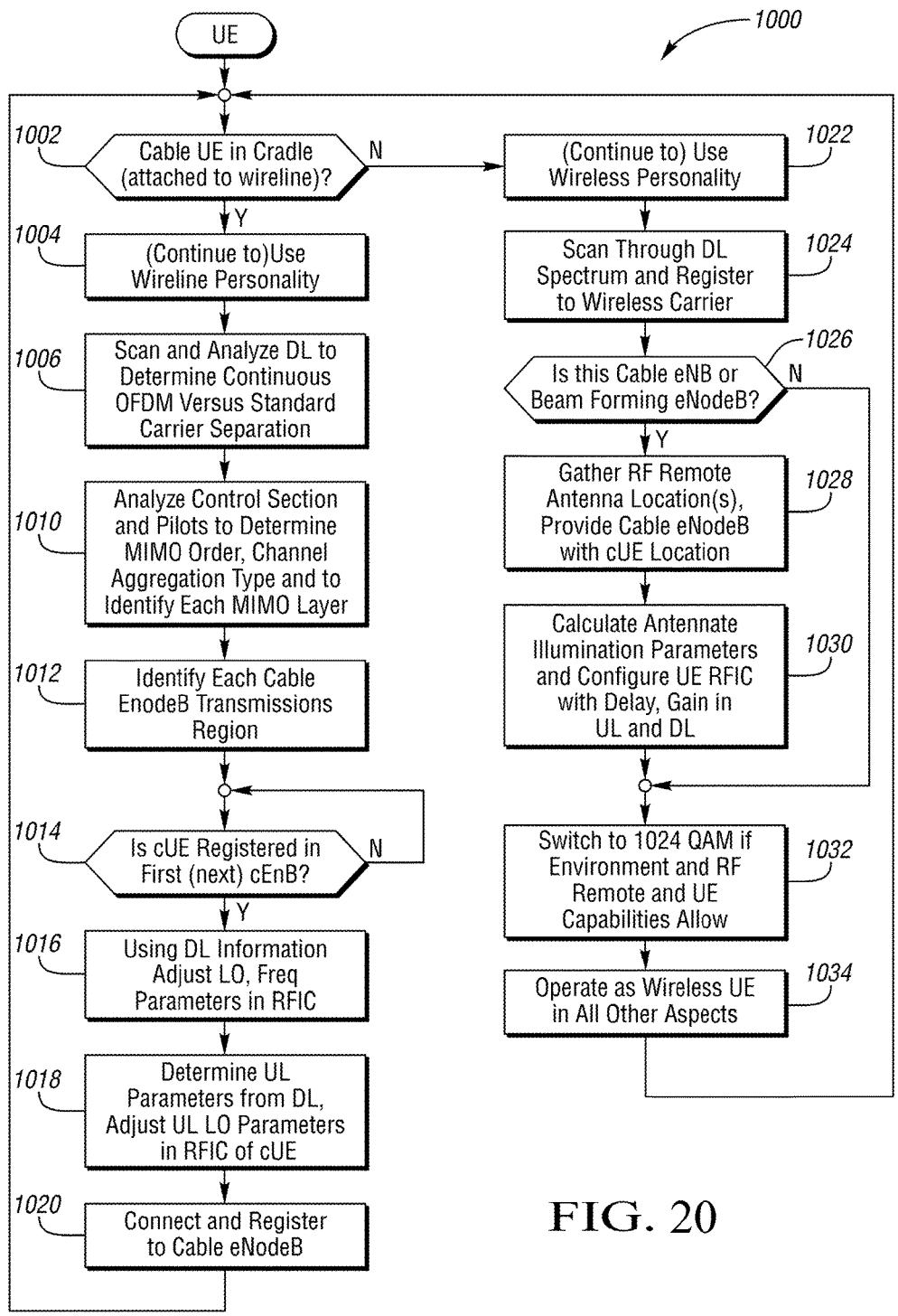
FIG. 20 illustrates a flowchart of a method for controlling a user equipment (UE) in accordance with one non-limiting aspect of the present invention.

FIG. 20 illustrates a flowchart of a method for controlling a UE to facilitate signaling in accordance with one non-limiting aspect of the present invention. The method may be embodied in a non-transitory computer-readable medium, computer program product or other construct having computer-readable instructions, code, software, logic and the like. The instructions may be operable with a processor or other logically executing device of the UE and/or another one or more of the devices/components described herein to facilitate controlling the signaling processing and/or the other devices/components in the manner contemplated by the present invention to facilitate delivering wireless signaling. The method is predominately described for exemplary non-limiting purpose with respect to at least a portion of the wireless signaling, or corresponding intermediary signaling, being long-hauled carried over a wired and/or wireline communication medium, such as but not necessarily limited to cable or hybrid-fiber coax (hfc) network. The long-haul or intermediary signaling may be facilitated with processing or other controls performed with the UE sufficient to provide wired transport over a greater distance than the eventual wireless signaling transport, thereby leverage off of the economies associated with wired transport while also facilitating final interaction with wireless devices.

Block 1002 relates to determining whether the UE, noted as a cable UE (cUE), is connected to the wired communication medium 34 or the wireless communication medium 110. The connection may be determined based on whether the UE is within a cradle, a docking-station or another removable receptacle (not shown) having an interface to the wired communication medium 34 as one non-limiting aspect of the present invention contemplates the UE having capabilities to automatically switch between a wireline and wireless personality based on location, connection or use. Block 1004 relates to determining the wireline personality, i.e., the UE being optimized or having capabilities sufficient to facilitate wireline signaling. In the event the UE is a mobile phone or other predominantly wireless device, use of the wireline personality may be beneficial in enabling wireline communications with the UE over the system without having to convert back to wireless signaling, e.g., the wireless signals associated with a phone call may be received and transported over the system 10 the recipient UE without having to be converted back to the wireless signals or spectrum licensed to the recipient UE. Of course, the present invention is not limited to this use case and fully contemplates desiring the wireline personality for various reasons, such as to enable disablement of the wireless signaling related components to save UE energy life, reduce costs of wireless charges from wireless operator and/or to free the wireless signaling related components for use in processing other wireless signaling that the UE would otherwise not be able to process or to process simultaneously.

Block 1006 relates to the UE scanning and analyzing the downlink (DL) signaling, MAP information and other signaling being carried over the wired communication medium 34 to facilities automatically controlling, programming or otherwise implementing state for the various controllable UE components described above. The scanning and analysis may include determining whether continuous OFDM versus standard carrier separation is being used to facilitate wireline signaling with the UE (optionally including uplink and downlink). Block 1010 to analyzing control section and pilots to determine MIMO order, channel aggregation type and to identify each MIMO layer, such as to determine whether 2×2, 4×4 or other MIMO orders are to be employed. Block 1012 relates to identifying each cable eNodeB (e.g., signal processor 30) transmission region in the event the UE is reachable by multiple eNodeBs and/or if a single processor 30 effectively constructs multiple eNodeBs to service the system 10. Block 1014 relates to determining whether cUE registered in first (next) eNodeB or another, such as to determine whether the parameters and other information collected in the preceding blocks are intended for its use or whether such information should be continued to be processed until more relevant information is determined. Block 1016 relates to using DL information to adjust local oscillator (LO) frequency parameters and/or other parameters (amplifier settings, band switching, etc.) in the RFIC. The frequency parameters may be individually adjusted for each uplink and/or downlink frequency conversion unit operable within the UE and/or the one or more units tasked with facilitating the specified wireline signaling.

Block 1018 relates to determining UL parameters (LO frequency, amplifier settings, band switching, etc.) from DL information and facilitating corresponding adjustments, such as by adjusting UL LO parameters in the RFIC. Block 1020 relates to connecting and registering with a eNodeB (e.g, signal processor 30). The UE may notify the registered eNodeB of a capability to facilitate receiving wireline signaling and/or a capability to facilitate transmitting wireline signaling thereto, e.g., to indicate acceptance of parameters necessary to facilitate uplink and downlink directed signaling associated with facilitate the phone call. Block 1002 may be returned to following the registration in order to re-assess whether additional wireless and/or wireline signaling is desired and/or whether the UE has been removed from the cradle or otherwise switch to a wireless personality, such as in the event a user switches a setting. Block 1022 relates to determining a wireless personality, i.e., the UE being optimized or having capabilities sufficient to facilitate wireless signaling. In the event the UE is a mobile phone or other predominantly wireless device, use of the wireless personality may be beneficial in enabling wireless communications with the UE following transmission of at least a portion of the signals as wireline signals.

Block 1024 relates to scanning through DL spectrum and registering for wireless signaling, such as by performing a handshake or other operation with a wireless end station to gain access to the corresponding wireless communication medium and to announce presence and availability for wireless signaling. Block 1026 relates to determining whether the eNodeB tasked with supporting signaling thereto intends to rely upon an end station having beamforming capabilities to facilitate the wireless signaling with the UE. Block 1028 relates to determining beamforming to be enabled and gathering RF remote antenna location(s) and providing the eNodeB with a location of the UE. The location information may be used to determine one or more remote antenna suitable to facilitate wireless signaling with the UD, such as to spatially distant remote antenna units suitable to providing enhanced MIMO. Block 1030 relates to calculating antenna illumination parameters and configuring the UE RFIC with delay, gain and UL/DL communication parameters, i.e., setting the various controllable states of the RFIC components to facilitate beamforming signaling. Block 1032 relates to switching to 1024 QAM if environment in RF remote in unique capabilities allow. Block 1034 relates to operating UE to facilitate the contemplated wireless signaling.

As supported non-limiting aspect of the present invention relates to a cable UE configured to implement data transport with the flexibility to place each data path generated for MIMO into independent frequency channels to maintain orthogonality among data paths while in the coaxial cable medium. The UE may include a baseband processor unit remaining the same as its wireless counterpart or it may have support for higher modulation orders and shorter cyclic prefix lengths, leveraging the more benign environment of the HFC network. In the RFIC, frequency independence for the different data paths may be achieved by adding a separate independent local oscillator and frequency synthesizer. To support higher order modulations intended in the wireline environment, ADC and DAC components with higher number of bits per sample may be used. In the cable implementation (Cable UE), no antennas may be needed, only modest amplification in addition to uplink combining and downlink signal distribution is needed. A diplexer may be used to separate downlink from uplink data paths. Flexibility of independent frequency selection of data paths can also be leveraged to incorporate carrier aggregation.

One non-limiting aspect of the present invention relates to a Wireline/Wireless Universal UE (FIGS. 9-11). This UE/cable UE dual function implementation enables the use of the same end device for wireless and wireline purposes. An example use case leveraging this implementation is an LTE wireless handset that becomes a wireline modem (cUE) when it is placed in a cradle connected to the wireline network. This implementation uses the same "Universal" RFIC depicted in FIG. 15 and uses a modified front end that still has significant similarity to the front end depicted for the traditional wireless implementation shown in FIG. 15. The front end in FIG. 17 has some additional switching paths in addition to the downstream and upstream wireline data paths that connect to the RFIC. The power amplifier depicted in the wireline path requires less gain than the wireless amplifiers because the HFC network is already an amplified network. Since LTE has optimized handoff mechanisms for switching from one band to another. This "Universal UE" leverages these handoff mechanisms for switching between wireless and wireline.

As supported above, one non-limiting aspect of the present invention contemplates as multiple-input multiple-output (MIMO) communication system including a signal processor configured to: receive an input signal desired for transmission, the input signal being non-diverse; multiplex the input signal into at least a first signal part, a second signal part, a third signal part and a fourth signal part; and transmit the first signal part at a first frequency, the second signal part at a second frequency, the third signal part at a third frequency and the fourth signal part at a fourth frequency, each of the first, second, third and fourth frequencies being diverse.

The communication system may include the signal processor configured to combine the first, second, third and fourth signal parts for transmission over at least one of a wireline communication medium and an optical communication medium The communication system may include an end station configured to: receive the first, second, third and fourth signal parts after being transmitted over the at least one of the wireline communication medium and the optical communication medium; and correlate the first, second, third and fourth signal parts for spatially diverse radio frequency (RF) transmission.

The communication system may include the spatially diverse RF transmission characterized by the first, second, third and fourth signal parts being correlated such that each signal part is transmitted at a common frequency.

The communication system may include the end station having a converter configured to convert the first frequency of the first signal part to the common frequency, to convert the second frequency of the second signal part to the common frequency, to convert the third frequency of the third signal part to the common frequency and to convert the fourth frequency of the four signal part to the common frequency.

The communication system may include the end station having a first antenna, a second antenna, a third antenna and a fourth antenna to respectively transmit the first signal part, the second signal part, the third signal part and the fourth signal part, the first, second, third and fourth antennas being spatially diverse.

The communication system may include the end station configured to select the common frequency from a plurality of available frequencies, the plurality of available frequencies being selected according to an originator such that the common frequency is selected from at least one of the available frequencies associated with the originator of the input signal.

The communication system may include the signal processor configured to delay at least one of the first signal part, the second signal part, the third signal part in the fourth signal part prior to transmission over the at least one of the wireline communication medium and the optical communication medium.

The communication system may include an end station configured to: receive the first, second, third and fourth signal parts after being transmitted over the at least one of the wireline communication medium; and process the first, second, third and fourth signal parts into an output signal representative of the input signal, the output signal being non-diverse.

The communication system may include the signal processor configured to receive the input signal from a cellular communication system, the input signal being derived from a cellular signal transmitted over the cellular communication system.

The communication system may include the signal processor configured to receive the input signal from an Internet Service Provider (ISP), the input signal being derived from data transmitted through the ISP.

The communication system may include the signal processor configured to receive the input signal from a cable television service provider system, the input signal being derived from television transmissions carried over the cable television service provider system.

As supported above, one non-limiting aspect of the present invention contemplates method of facilitating signal transmissions including: receiving an input signal desired for transmission; multiplexing the input signal into at least a plurality of signal parts; modulation mapping each of the plurality of signal parts after the multiplexing; orthogonal frequency division multiplexing (OFDM) processing each of the plurality of signal parts after the modulation mapping; transmitting each of the plurality of signal parts for longhaul transmission over at least one of a wireline communication medium and an optical communication medium after the OFDM processing, including transmitting each of the plurality of signal parts at a different center frequency.

The method may include receiving the input signal in a non-diverse state.

The method may include receiving the input signal in a digital state and wherein the modulation mapping includes mapping the digital state of the input signal to a constellation symbol.

The method may include the OFDM processing relating each of the plurality of signal parts to actual spectrum.

The method may include spatially multiplexing each of the plurality of signal parts after the modulation mapping and before the OFDM processing, the spatially multiplexing including delaying at least one of the plurality of signal parts relative to another one of the plurality of signal parts.

The method may include receiving each of the plurality of signal parts after being transmitted over the at least one of the wireline communication medium; and correlating each of the plurality of signal parts for spatially diverse radio frequency (RF) transmission at a common frequency.

As supported above, one non-limiting aspect of the present invention contemplates method of facilitating a cellular phone call between an originating device and a destination device including: receiving an input signal representative of at least part of the cellular phone call; multiplexing the input signal into at least a plurality of signal parts; transmitting each of the plurality of signal parts for long-haul transmission over at least one of a wireline communication medium and a fiber optic communication medium, including transmitting each of the plurality of signal parts at a different center frequency; receiving each of the plurality of signal parts after being transmitted over the at least one of the wireline communication medium and the fiber optic communication medium; and correlating each of the plurality of signal parts for spatially diverse radio frequency (RF) transmission to the destination device, including transmitting each of the plurality of signal parts at a common frequency.

The method may include identifying a service provider associated with the destination device; and selecting the common frequency based on the identity of the service provider.

As supported above, one non-limiting aspect of the present invention contemplates multiple-input multiple-output (MIMO) signal processor having: a baseband processor configured to multiplex an input signal into at least a first signal part, a second signal part, a third signal part and a fourth signal part; and a radio frequency integrated circuit (RFIC) configured to transmit the first signal part at a first frequency, the second signal part at a second frequency, the third signal part at a third frequency and the fourth signal part at a fourth frequency, each of the first, second, third and fourth frequencies being different.

The signal processor may include a front end configured to combine the first, second, third and fourth signal parts into an output signal for transmission over at least one of a wireline communication medium and an optical communication medium.

The signal processor may include the front end having a combiner for combining the first, second, third and fourth signal parts into the output signal.

The signal processor may include the front end having a first filter for filtering the output signal.

The signal processor may include the front end having a first amplifier for amplifying the output signal.

The signal may include the front end having the first filter and the first amplifier controllable as a function of instructions received from a master controller, the master controller setting a passband for the first filter and an amount of gain and tilt for the first amplifier.

The signal processor may include the RFIC having a digital interface for separating each of the first, second, third and fourth signal parts according to digital in-phase and quadrature phase components such that digital interface outputs first digital in-phase and quadrature phase components for the first signal part, second digital in-phase and quadrature phase components for the second signal part, third digital in-phase and quadrature phase components for the third signal part and fourth digital in-phase and quadrature phase components for the fourth signal part The signal processor may include the RFIC having a separate digital-to-analog converter (DAC) for converting each of the first, second, third and fourth digital in-phase and quadrature phase components into corresponding first, second, third and fourth analog in-phase and quadrature phase components.

The signal processor may include the RFIC having a first oscillator, a second oscillator, a third oscillator and a fourth oscillator, the first oscillator facilitating the first signal part being transmitted at the first frequency, the second oscillator facilitating the second signal part being transmitted at the second frequency, the third oscillator facilitating the third signal part being transmitted at the third frequency and the fourth oscillator facilitating the fourth signal part being transmitted at the fourth frequency.

The signal processor may include the RFIC having a separate mixer for each of the analog first, second, third and fourth in-phase and quadrature phase components, each mixer operating with no more than one of the first, second, third and fourth oscillators to facilitate transmitting the corresponding one of the first, second, third and fourth in-phase and quadrature phase components at the corresponding first, second, third and fourth frequencies, each in-phase and quadrature phase component thereafter being joined to form the first, second, third and fourth signal parts being transmitted at the first, second, third and fourth frequencies.

The signal processor may include the first, second, third and fourth oscillators controllable to the corresponding first, second, third and fourth frequency as a function of instructions received from a master controller.

The signal processor may include the signal processor configured to receive the input signal from a cellular communication system, the input signal being derived from a cellular signal transmitted over the cellular communication system.

The signal processor may include the signal processor configured to receive the input signal from an Internet Service Provider (ISP), an application service provider or an over the top service provider, the input signal being derived from data transmitted through one of the service providers.

The signal processor may include the signal processor configured to receive the input signal from a cable television service provider system, the input signal being derived from television transmissions carried over the cable television service provider system.

As supported above, one non-limiting aspect of the present invention contemplates method of facilitating signal transmissions including: receiving an input signal desired for transmission; multiplexing the input signal into at least a plurality of signal parts; modulation mapping each of the plurality of signal parts after the multiplexing; orthogonal frequency division multiplexing (OFDM) processing each of the plurality of signal parts after the modulation mapping; instructing each of a plurality of local oscillators to facilitate mixing no more than one of the plurality of signal parts after the OFDM processing, including mixing each signal part to have a different center frequency; and transmitting each of the plurality of signal parts for long-haul transmission over at least one of a wireline communication medium and an optical communication medium after the mixing.

The method may include amplifying and combining the plurality of signal parts after the mixing and prior to long-haul transmission.

The method may include dynamically amplifying the plurality of signal parts as a function of instructions received from a master controller, the dynamic amplification characterized by adjusting gain and/or tilt (frequency dependent gain) for one of more of the plurality of signals parts as a function of losses associated with a path intended to be traveled with the corresponding one of the plurality of signals, including adjusting the gain and/or tilt for at least one of the plurality of signal parts after initially setting the corresponding gain and/or tilt when the corresponding signal path changes.

As supported above, one non-limiting aspect of the present invention contemplates multiple-input multiple-output (MIMO) signal processor having: a baseband processor configured to multiplex an input signal into at least a first signal part and a second signal part; a radio frequency integrated circuit (RFIC) configured to transmit the first signal part at a first frequency and the second signal part at a second frequency, RFIC including a first oscillator for mixing the first signal part and a second oscillator for mixing the second signal part; and a front end configured to combine the first signal part and the second signal part into an output signal for output put to a radio frequency (RF) combiner.

The signal processor may include the first and second oscillators mixing the first and second signal parts to have different center frequencies.

The signal processor may include the different center frequencies of the first and second oscillators selectable in response to instructions received from a master controller such that different center frequencies are dynamically and individually selectable.

As supported above, one non-limiting aspect of the present invention contemplates multiple-input multiple-output (MIMO) remote antenna unit having: a splitter configured to separate an input signal into at least a first signal part, a second signal part, a third signal part and a fourth signal part, the first signal part being at a first frequency, the second signal part being at a second frequency, the third signal part being at a third frequency and the fourth signal part being at a fourth frequency, each of the first, second, third and fourth frequencies being different; a first converter, a second converter, a third converter and a fourth converter, each of the first, second, third and fourth converters being configured to convert a respective one of the first, second, third and fourth signal parts to a fifth frequency for subsequent wireless transport; and an engine configured to determine the fifth frequency as a function of frequency information transmitted over a wired communication medium carrying the input signal, the engine instructing each of the first, second, third and fourth converters to respectively convert the first, second, third and fourth signal parts to the fifth frequency.

The remote antenna unit may include the first, second, third and fourth converters having one of a first oscillator, a second oscillator, a third oscillator and a fourth oscillator, each oscillator being independently controllable by the engine to operate at multiple frequencies.

The remote antenna unit may include the engine controlling each of the first, second, third and fourth oscillators to respectively operate at a sixth, seventh, eight and ninth frequency in order to facilitate converting the first, second, third and fourth signal parts to the fifth frequency.

The remote antenna unit may include a gain mechanism operable to amplify the first, second, third and fourth signal parts following conversion to the fifth frequency.

The remote antenna unit may include the gain mechanism having a first amplifier, a second amplifier, a third amplifier and a fourth amplifier for respectively amplifying the first, second, third and fourth signal parts, each amplifier being independently controllable to provide multiple amounts of amplification.

The remote antenna unit may include the engine controlling the amount of amplification provided by the first, second, third and fourth amplifiers such that the amplification provided by the first, second, third and fourth amplifiers periodically varies depending on instructions received from the engine.

The remote antenna may include a beamforming mechanism operable to facilitate steering a first beam, second beam, third beam and fourth beam transmitted from a respective one of a first antenna port, a second antenna port, a third antenna port and a fourth antenna port, each antenna port facilitating wireless transmission of a respective one of the first, second, third and fourth signal parts following conversion to the fifth frequency.

The remote antenna unit may include a first duplexer, a second duplexer, a third duplexer and a fourth duplexer respectively associated with one of the first, second, third and fourth antenna ports, each duplexer being configured to separate uplink and downlink traffic, the first, second, third and fourth signal parts being downlink traffic.

The remote antenna may include a fifth converter, a sixth converter, a seventh converter and an eighth converter, each of the fifth, sixth, seventh and eighth converters being configured to convert a respective one of a fifth, sixth, seventh and eighth signal part to one of a tenth, eleventh, twelfth and thirteenth frequency, the fifth, sixth, seventh and eighth signal parts being uplink traffic transported through a respective one of the first, second, third and fourth duplexers.

The remote antenna unit may include the fifth, sixth, seventh and eighth converters include one of a fifth oscillator, a sixth oscillator, a seventh oscillator and a eighth oscillator, each oscillator being independently controllable by the engine to operate at multiple frequencies.

The remote antenna unit may include the engine controlling each of the fifth, sixth, seventh and eighth oscillators to respectively operate at the tenth, eleventh, twelfth and thirteenth frequencies in order to facilitate converting the first, second, third and fourth signal parts to a fourteenth frequency.

The remote antenna unit may include a fifth amplifier, a sixth amplifier, a seventh amplifier and a eighth amplifier for respectively amplifying the fifth, sixth, seventh and eighth signal parts following conversion to the fourteenth frequency, each amplifier being independently controllable by the engine to provide multiple amounts of amplification.

The remote antenna unit may include a combiner configured for combining the fifth, sixth, seventh and eighth signal parts following conversion to the fourteenth frequency.

The remote antenna unit may include the engine sniffing a transmission MAP transmitted over the wired communication medium carrying the input signal, the transmission MAP including the frequency information.

As supported above, one non-limiting aspect of the present invention contemplates non-transitory computer-readable medium having a plurality of instructions operable with a processor to facilitate controlling a remote antenna unit to facilitate multiple-input multiple-output (MIMO) wireless signaling, the non-transitory computer-readable medium comprising instructions sufficient for: determining a transmission MAP being transmitted over a wired communication medium to facilitate transporting an input signal, the input signaling being carried over the wired communication as at least a first signal part, a second signal part, a third signal part and a fourth signal part, the first signal part being at a first frequency, the second signal part being at a second frequency, the third signal part being at a third frequency and the fourth signal part being at a fourth frequency, each of the first, second, third and fourth frequencies being different; and controlling a first converter, a second converter, a third converter and a fourth converter included as part of the remote antenna unit to convert a respective one of the first, second, third and fourth signal parts to a fifth frequency for subsequent MIMO wireless transport over a wireless communication medium according to parameters specified within the transmission MAP.

The non-transitory computer-readable medium may include instructions sufficient for independently controlling each of a first, a second, a third and a fourth oscillator to respectively operate at a sixth, seventh, eight and ninth frequency in order to facilitate converting the first, second, third and fourth signal parts to the fifth frequency according to the parameters specified in the transmission MAP.

The non-transitory computer-readable medium may include instructions sufficient for independently controlling amplification provided by each of a first, a second, a third and a fourth amplifier to respectively adjust gain of a corresponding one of the first, second, third and fourth signal parts following conversion to the fifth frequency according to parameters specified within the transmission MAP.

The non-transitory computer-readable may include instructions sufficient for controlling a beamforming mechanism operable to facilitate steering a first beam, second beam, third beam and fourth beam transmitted from a respective one of a first antenna port, a second antenna port, a third antenna port and a fourth antenna port, each antenna port facilitating wireless transmission of a respective one of the first, second, third and fourth signal parts following conversion to the fifth frequency.

As supported above, one non-limiting aspect of the present invention contemplates multiple-input multiple-output (MIMO) system having: a signal processor configured to separate an input signal into at least a first signal part and a second signal part for transport over a wired communication medium, the first signal part being at a first frequency and the second signal part being at a second frequency different than the first frequency; and a remote antenna unit configure to wireless transmit the at least first and second signal parts to a device over a wireless communication medium, the remote antenna unit including an engine configured to control a first converter and a second converter configured to convert a respective one of the first and second signal parts to a fifth frequency prior to transmission over the wireless communication medium according to parameters specified within a transmission MAP carried over the wired communication medium.

The system may include the first and second converters having one of a first oscillator and a second oscillator, wherein the engine controls each of the first, second, third and fourth oscillators to respectively operate at a sixth, seventh, eighth and ninth frequency in order to facilitate converting the first, second, third and fourth signal parts to the fifth frequency.

As supported above, one non-limiting aspect of the present invention contemplates multiple-input multiple-output (MIMO) user equipment (UE) having: a front end configured to process at least a first signal part, a second signal part, a third signal part and a fourth signal part; a radio integrated circuit (RFIC) configured to convert the first signal part at a first frequency, the second signal part at a second frequency, the third signal part at a third frequency and the fourth signal part at a fourth frequency to a common fifth frequency; and a baseband processor configured to combine the first, second, third and fourth signal parts into an output signal.

The UE may include the front end having a wired interface for receiving the first, second, third and fourth signal parts as frequency diverse signals carried over a wired communication medium.

The UE may include the front end having a plurality of wireless ports, including a first port, a second port, a third port and a fourth port for receiving the first, second, third and fourth signal parts as spatially diverse signals carried over a wireless communication medium, each of the ports receiving an effective portion of the first, second, third and fourth signal parts as wirelessly transmitted thereto.

The UE may include: the front end having a wired interface for receiving the first, second, third and fourth signal parts as frequency diverse signals when carried over a wired communication medium; and the front end having a plurality of wireless ports, including a first port, a second port, a third port and a fourth port for receiving the first, second, third and fourth signal parts as spatially diverse signals when carried over a wireless communication medium, each of the ports receiving an effective portion of the first, second, third and fourth signal parts as wirelessly transmitted thereto.

The UE may include the front end having one more switches operable to switch signal paths through the front end from wireline paths to wireless paths depending on whether the first, second, third and fourth signal parts are received at the wired interface or the wireless ports.

The UE may include the switches are automatically operable to switch to the wireline paths when connection to a cradle is determined and to switch to the wireless paths when connection to cradle is not determined.

The UE may include the front end having an output to the RFIC for each of the first, second, third and fourth signal parts.

The UE may include the RFIC having a frequency conversion unit for each of the outputs, each of the frequency conversion units including an independently controllable local oscillator to facilitate frequency conversion of the first, second, third and fourth signal parts to the fifth frequency.

As supported above, one non-limiting aspect of the present invention contemplates multiple-input multiple-output (MIMO) user equipment (UE) operable with a hybrid fiber coaxial (HFC) network to facilitate wireless and wireline signaling, the UE having: a front end having a wireline interface for interfacing wireline signals with the HFC network and a wireless interface for interfacing wireless signals with the HFC network, the front end including wireless and wireline signal paths for the interfaced wireless and wireline signals; a radio frequency integrated circuit (RFIC) configured to generated frequency converted signals for the wireline and wireless signal paths; and a baseband processor configured to interface the frequency converted signals with a device connected thereto.

The UE may include the wireless interface comprising a plurality of wireless ports.

The UE may include the front end having a frequency band switch for each of the wireless ports, each frequency band switch being operable between at least a first and second frequency band to facilitate interfacing wireless signals within the corresponding frequency band.

The UE may include the front end having at least one uplink port and at least one downlink port for respectively interfacing uplink and downlink signals traversing the wireline and wireless signaling paths.

The UE may include the font end having a switch associated with each uplink port and each downlink port, the switches operable between a wireless position and a wireline position, the wireless position connecting the corresponding one of the uplink and downlink ports to one of the wireless paths and the wireline position connecting the corresponding one of the uplink and downlink ports to one of the wireline paths.

The UE may include the front end is operable to automatically set the switches to the wireline position when connection to a cradle is determine and to automatically set the switches to the wireless position when connection to the cradle is not determined.

The UE may include the RFIC having a frequency conversion unit for each of the ports, each of the frequency conversion units including an independently controllable local oscillator to facilitate frequency conversion.

As supported above, one non-limiting aspect of the present invention contemplates multiple-input multiple-output (MIMO) user equipment (UE) operable with a hybrid fiber coaxial (HFC) network to facilitate processing downlink spatial diverse wireless signaling generated from frequency diverse wireline signal transmitted over a wired communication medium of the HFC network, the UE having: a front end having a plurality of wireless ports for receiving the spatially diverse wireless signals; a radio frequency integrated circuit (RFIC) configured to frequency convert signals output from the front end as a function of the received wireless signals received to a common frequency; and a baseband processor configured to interface the frequency converted signal with a device connected thereto.

The UE may include the front end having a frequency band switch for each of the wireless ports, each frequency band switch being operable between at least a first and second frequency band to facilitate interfacing wireless signals within the corresponding frequency band.

The UE may include the front end having at least one output for respectively interfacing signals associated with each of the wireless ports signals with the RFIC.

The UE may include the RFIC having a frequency conversion unit for each of the outputs, each of the frequency conversion units including an independently controllable local oscillator to facilitate frequency conversion.

The UE may include the front end having a diplex filter for each of the wireless ports, the diplex filter enabling the received wireless signals to be directed toward the RFIC and to direct uplink wireless signals received from the RFIC to be transmitted from the corresponding port.

As supported above, one non-limiting aspect of the present invention contemplates method of facilitating wireless signaling comprising: determining a first signal desired for transport to a first device; separating the first signal into at least a first part, a second part, a third part and a fourth part, each of the first, second, third and fourth parts being frequency diverse at least in that each is modulated at a different frequency; and facilitating transmission of the first, second, third and fourth parts over a wireline communication medium such that at least one of the first, second, third and fourth parts are received at a first remote antenna unit and at least one of the first, second, third and fourth parts are received at the second remote antenna unit, the first and second remote antenna units being configured to wirelessly transmit the received one or more of the first, second, third and fourth parts to the first device over a wireless communication medium.

The method may include facilitating transmission such that the first, second, third and fourth parts travel a greater distance over the wireline communication medium than when subsequently transmitted over the wireless communication medium.

The method may include selecting the first and second remote antenna units from a plurality of remote antenna units available to facilitate wirelessly transmitting the first, second, third and fourth parts to the first device.

The method may include determining spatial diversity for each of the plurality of remote antenna units relative to a first location of the first device and selecting the first and second remote antenna units from the plurality of remote antenna units based at least in part on spatial diversity.

The method may include determining spatial diversity by calculating an angular position of each of the plurality of remote antenna units relative to the first location.

The method may include selecting the first and second remote antenna units based at least in part on having related angular positions greater than an angular threshold.

The method may include selecting the first and second remote antenna units from a plurality of remote antenna units available to facilitate wirelessly transmitting the first, second, third and fourth parts to the first device, including determining beamforming capabilities for each of the plurality of remote antenna units relative to a first location of the first device such that the first and second remote antenna units are selected based at least in part on beamforming capabilities.

The method may include selecting the first and second remote antenna units from at least two of the plurality of remote antenna units having beamforming capabilities sufficient to facilitate directing wireless signaling toward the first location.

The method may include providing beamforming instructions to each of the first and second remote antenna units, the beamforming instructions controlling amplitude and phase or delay of wireless signaling emitted therefrom in a manner sufficient to facilitate directing wireless signaling toward the first location.

The method claim may include providing updated beamforming instructions to each of the first and second remote antenna units in order to adjust the amplitude and phase or delay of the wireless signaling based upon movement of the first device from the first location to a second location such that the wireless signaling becomes directed toward the second location more so than the first location.

The method may include instructing the first and second remote antenna units to transmit the first, second, third and fourth parts at a first frequency.

The method may include: determining a second signal desired for wireless receipt at a second device; separating the second signal into at least a fifth part, a sixth part, a seventh part and an eighth part, each of the fifth, sixth, seventh and eighth parts being frequency diverse at least in that each is modulated at a different frequency; and facilitating transmission of the fifth, sixth, seventh and eighth parts over the wireline communication medium such that at least one of the fifth, sixth, seventh and eighth parts are received at the first remote antenna unit and at least one of the fifth, sixth, seventh and eighth parts are received at the second remote antenna unit, the first and second remote antenna units being configured to wirelessly transmit the received one or more of the fifth, sixth, seventh and eighth parts to the second device over the wireless communication medium at a second frequency, the second frequency being different from the first frequency used to wirelessly transmit the first, second, third and fourth parts.

As supported above, one non-limiting aspect of the present invention contemplates method of facilitating wireless signaling including: determining a first signal desired for transport to a first device, the first signaling being separated into at least a first part, a second part, a third part and a fourth part for transmission to a first device partially over a wireline communication medium; determining a plurality of remote antenna units connected to the wireline communication medium having capabilities sufficient to facilitate wirelessly transmitting one or more of the first, second, third and fourth parts to the first device; and determining at least a first remote antenna unit and a second remote antenna unit of the plurality of remote antennas units to wirelessly transmit one or more of the first, second, third and fourth parts to the first device based on relative wireless communications capabilities, the relative wireless communication capabilities representing capabilities of each of the plurality of remote antenna units to wireless communicate with the first device relative.

The method may include determining spatial diversity for each of the plurality of remote antenna units relative to a first location of the first device and selecting the first and second remote antenna units from the plurality of remote antenna units based at least in part on spatial diversity.

The method may include determining spatial diversity by calculating an angular position of each of the plurality of remote antenna units relative to the first location.

The method may include determining the first and second remote antenna units based at least in part on having related angular positions greater than an angular threshold.

The method may include determining beamforming capabilities for each of the plurality of remote antenna units relative to a first location of the first device such that the first and second remote antenna units are selected based at least in part on beamforming capabilities.

The method may include selecting the first and second remote antenna units from at least two of the plurality of remote antenna units having beamforming capabilities sufficient to facilitate directing wireless signaling toward the first location.

The method may include transmitting each of the first, second, third and fourth parts from the at least first and second remote antenna units at a first frequency, the first frequency being different from frequencies of the first, second, third and fourth parts as transmitted over the wireline communication medium, wherein each of the first, second, third and fourth parts are frequency diverse when transmitted over the wireline communication medium.

As supported above, one non-limiting aspect of the present invention contemplates system for facilitating wireless signaling including: a signal processor configured for separating a first signal desired for transport to a first device partially over a wireline communication medium into at least first and second parts, the at least first and second parts being frequency diverse; and a plurality of remote antenna units having capabilities sufficient to facilitate wirelessly communicating the at least first and second parts to the first device, including capability sufficient to convert the at least first and second parts to non-frequency diverse wireless signals; and wherein the signal processor determines at least a first remote antenna unit and a second remote antenna unit of the plurality of remote antennas units to wirelessly transmit a respective one of the first and second parts based on relative wireless communications capabilities of the plurality of remote antenna units.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method comprising:
    determining a first signal desired for transport to a first device;
    separating the first signal into at least a first part and a second part;
    adding delay to one or more of the at least first and second parts according to related angular positions of a first remote antenna device and second remote antenna device and prior to transmission over a wireline communication medium to facilitate spatially separating the at least first and second parts when transmitted over a wireless communication medium; and
    facilitating transmission of the at least first and second parts over the wireline communication medium such that at least one of the at least first and second parts are received at the first remote antenna device and at least one of the at least first and second parts other than the at least one of the at least first and second parts received at the first remote antenna device are received at the second remote antenna device, the first and second remote antenna devices being configured to wirelessly transmit the respectively received one or more of the at least first and second parts to the first device over the wireless communication medium.

2. The method of claim 1 further comprising separating the first signal such that each of the at least first and second parts include a different portion of the first signal, thereby requiring the first device to combine the at least first and second parts in order to reconstruct the first signal.

3. The method of claim 2 further comprising:
    simultaneously transmitting each of the at least first and second parts over the wireline communication medium in a non-spatially diverse manner; and
    subsequently simultaneously transmitting each of the at least first and second parts over the wireless communication medium in a spatially diverse manner.

4. The method of claim 2 further comprising:
    simultaneously transmitting each of the at least first and second parts over the wireline communication medium in a non-spatially diverse manner by transmitting each at a different center frequency; and
    subsequently simultaneously transmitting each of the at least first and second parts over the wireless communication medium in a spatially diverse manner by transmitting each at a common frequency from geographically spaced apart locations associated with the first and second remote antenna devices.

5. The method of claim 2 further comprising:
    determining the first signal as a non-diverse signal;
    simultaneously transmitting each of the at least first and second parts over the wireline communication medium as frequency diverse and non-spatially diverse signals; and
    subsequently simultaneously transmitting each of the at least first and second parts over the wireless communication medium as non-frequency diverse and spatially diverse signals.

6. The method of claim 1 further comprising transmitting the first and second parts over the wireline communication medium at different frequencies.

7. The method of claim 6 further comprising:
    instructing the first and second remote antenna devices to transmit the at least first and second parts at a first frequency, the first frequency being different than the different frequencies used for transmitting the first and second parts over the wireline communication medium;
    determining a second signal desired for wireless receipt at a second device; separating the second signal into at least a third part and a fourth part; and facilitating transmission of the at least third and fourth parts over the wireline communication medium such that at least one of the at least third and fourth parts are received at the first remote antenna device and at least one of the at least third and fourth parts other than the at least one of the at least third and fourth parts received at the first remote antenna device are received at the second remote antenna device, the first and second remote antenna devices being configured to wirelessly transmit the respectively received one or more of the at least third and fourth parts to the second device over the wireless communication medium at a second frequency, the second frequency being different from the first frequency used to wirelessly transmit the at least first and second parts.

8. The method of claim 1 further comprising:
determining a first location of the first device;
determining three or more remote antenna devices available within the first location to facilitate wirelessly transmitting the first and second parts to the first device; and
selecting the first and second remote antenna devices from the three or more remote antenna devices to facilitate wirelessly transmitting the at least first and second parts to the first device.

9. The method of claim 8 further comprising determining spatial diversity for each of the three or more remote antenna devices relative to the first location of the first device and wherein the selecting of the first and second remote antenna devices from the three or more remote antenna devices is based at least in part on the spatial diversity.

10. The method of claim 9 further comprising:
determining the spatial diversity by calculating the angular position of each of the three or more remote antenna devices relative to the first location; and
wherein the selecting of the first and second remote antenna devices from the three or more remote antenna devices is based at least in part on having the related angular positions greater than an angular threshold.

11. The method of claim 8 further comprising:
determining beamforming capabilities for each of the three or more remote antenna devices relative to the first location; and
wherein the selecting of the first and second remote antenna devices from the three or more remote antenna devices is based at least in part on the beamforming capabilities being sufficient to facilitate directing wireless signaling emitted therefrom toward the first location.

12. The method of claim 1 further comprising providing beamforming instructions to each of the first and second remote antenna devices, the beamforming instructions controlling amplitude and phase or delay of wireless signaling emitted therefrom in a manner sufficient to facilitate directing the wireless signaling toward a first location of the first device, the wireless signaling wirelessly transmitting the correspondingly received one or more of the at least first and second parts to the first device.

13. The method of claim 12 further comprising providing updated beamforming instructions to each of the first and second remote antenna devices in order to adjust the amplitude and phase or delay of the wireless signaling based upon movement of the first device from the first location to a second location such that the wireless signaling becomes directed toward the second location more so than the first location.

14. A system comprising:
a plurality of remote antenna devices configured to wirelessly transmit signaling received over a wireline communications medium; and
a signal processor configured to transmit the signaling over the wireline communication medium to the plurality of remote antenna devices, the signal processor being associated with a non-transitory computer-readable medium having a plurality of non-transitory instructions executable with a processor associated with the signal processor to facilitate controlling the operation thereof, the non-transitory instructions being sufficient for:
determining a first signal desired for transport to a device;
separating the first signal into at least a first part and a second part such that each of the at least first and second parts are different portions of the first signal;
determining a first remote antenna device and second remote antenna device of the plurality of remote antenna devices having capabilities sufficient to facilitate wireless communications with the device;
adding delay to one or more of the at least first and second parts according to related angular positions of the first remote antenna device and the second remote antenna device and prior to transmission over the wireline communication medium to facilitate spatially separating the at least first and second parts when transmitted over a wireless communication medium; and
transmitting the at least first and second parts at different frequencies over the wireline communication medium for receipt at the first and second remote antenna devices respectively.

15. The system of claim 14 wherein the non-transitory instructions are sufficient for transmitting wireless instructions to each of the first and second remote antenna devices respectively receiving the at least first and second signal parts, the wireless instructions instructing the corresponding remote antenna devices to wirelessly transmit the received at least first and second parts to the device at a common frequency.

16. The system of claim 14 wherein the non-transitory instructions are sufficient for:
determining angular position relative to the device for each of the plurality of remote antenna devices;
selecting the first and second remote antenna devices based at least in part on having related angular positions greater than an angular threshold.

17. The system of claim 14 wherein the non-transitory instructions are sufficient for:
determining beamforming capabilities for each of the plurality of remote antenna devices;
selecting the first and second remote antenna devices based at least in part on having beamforming capabilities sufficient for wirelessly directing the signaling toward the device;
providing beamforming instructions to each of the first and second remote antenna devices, the beamforming instructions controlling amplitude and phase or delay of the signaling wirelessly emitted therefrom in a manner sufficient to facilitate wirelessly directing the signaling toward a first location determined for the device at a first instance in time; and
providing updated beamforming instructions to each of the first and second remote antenna devices in order to adjust the amplitude and phase or delay of the signaling wirelessly emitted therefrom based upon movement of the device from the first location to a second location at a second instance in time occurring after the first instance, the updated beamforming instructions wirelessly directing the signaling toward the second location more so than the first location.

18. A non-transitory computer-readable medium having non-transitory instructions operable with a processor, the non-transitory instructions being sufficient to facilitate:

determining a plurality of signaling paths within a wireline communication medium sufficient to facilitate wireline signaling between a signal processor and one or more of a plurality of remote antenna devices;

determining a signal intended for transmission from the signal processor to a wireless device;

determining wireless communication capabilities for the plurality of remote antenna devices, the wireless communication capabilities reflecting capabilities to facilitate wirelessly communicating with the wireless device;

selecting at least a first remote antenna device and a second remote antenna device of the plurality of remote antenna devices to wirelessly communicate with the wireless device based on the wireless communications capabilities;

separating the first signal into at least a first part and a second part such that each of the at least first and second parts includes a different portion of the first signal;

adding delay to one or more of the at least first and second parts according to related angular positions of the first remote antenna device and the second remote antenna device and prior to transmission over the wireline communication medium to facilitate spatially separating the at least first and second parts when transmitted over a wireless communication medium; and transmitting the first part at a first frequency to the first remote antenna device over a corresponding one of the paths and with instructions sufficient for controlling the first remote antenna device to thereafter wirelessly transmit the first part to the device at a second frequency;

transmitting the second part simultaneously with the first part to the second remote antenna device over a different one of the paths at a third frequency different than the first frequency and with instructions sufficient for controlling the second remote antenna device to thereafter wirelessly transmit the second part to the device at the second frequency.

* * * * *